United States Patent [19]

Moorwood et al.

[11] Patent Number: 5,293,375
[45] Date of Patent: Mar. 8, 1994

[54] REPEATER INTERFACE CONTROLLER WITH A PARTITIONING PORT STATE MACHINE

[75] Inventors: Charles A. Moorwood, Sunnyvale; Charan J. Singh, Fairfield; Dennis E. Holland, Morgan Hill; Daniel J. Cimino, Mountain View; Howard Q. Vo, San Jose; Vickie M. Yeung, San Francisco, all of Calif.; David Crosbie, Erskine, Scotland; Haresh K. Shah, Pleasanton, Calif.

[73] Assignee: National Semiconductor Corporation, Santa Clara, Calif.

[21] Appl. No.: 930,751

[22] Filed: Aug. 14, 1992

Related U.S. Application Data

[62] Division of Ser. No. 643,208, Jan. 18, 1991.

[51] Int. Cl.$^5$ .............................................. H04J 3/26
[52] U.S. Cl. ...................... 370/13.1; 370/85.13; 370/94.3; 370/97
[58] Field of Search ................ 370/60, 94.1, 94.3, 370/13.1, 85.6, 85.9, 85.11, 85.12, 85.13, 95.3, 97; 340/825.5, 825.02

[56] References Cited

U.S. PATENT DOCUMENTS 4,825,435  4/1989  Amundsen et al. .................. 370/97

Primary Examiner—Douglas W. Olms
Assistant Examiner—Melvin Marcelo
Attorney, Agent, or Firm—Limbach & Limbach

[57] ABSTRACT

A repeater interface controller receives a data packet at one of a plurality of port nodes from an associated segment of a local area network. The port nodes determine a priority port node, if more than one port node receives a data packet at substantially the same time, and transmit the data packet from the priority port node to a central node. The central node receives the data packet, repeats the data packet from the priority node, and transmits the repeated data packet to the non-priority port nodes. Each non-priority port node receives the repeated data packet and transmits the repeated data onto its associated segment. Each port node further includes a partitioning port state machine which monitors its associated segment and partitions the segment from the repeater interface controller when the partitioning port state machine detects a collision in a predetermined number of consecutive data packets. The partitioning port state machine detects collisions in each packet from a beginning of the data packet until an end of the data packet.

8 Claims, 59 Drawing Sheets

| | 1 | 2 | 3 | 4 | 5 | 6 | 7 | 8 |
|---|---|---|---|---|---|---|---|---|
| S | Vcc 98 | TXO2P- 96 | TXO2+ 95 | RX12+ 91 | Vcc 90 | GND 89 | CD1- 86 | GND 81 |
| R | GND 105 | TXO3- 101 | TXO3P- 99 | TXO2- 94 | RX12- 92 | RX1+ 87 | CD1+ 85 | Vcc 82 |
| P | Vcc 106 | RX13- 104 | TXO3P+ 102 | GND 97 | TXO2P+ 93 | RX1- 88 | TX1- 84 | TX1+ 83 |
| N | TXO4P+ 109 | RX14- 108 | RX13+ 103 | TXO3+ 100 | | | | |
| M | TXO4P- 112 | TXO4- 110 | RX14+ 107 | | | | | |
| L | Vcc 114 | GND 113 | TXO4+ 111 | | | | | |
| K | TXO5- 117 | TXO5P- 115 | TXO5+ 116 | | | | | |
| J | TXO5P+ 118 | RX15- 120 | GND 121 | | | | | |
| H | RX15+ 119 | Vcc 122 | RX16+ 125 | | | | | |
| G | NC 123 | RX16- 126 | TXO6+ 129 | | | | | |
| F | NC 124 | TXO6- 128 | TXO7P- 133 | | | | | |
| E | TXO6P+ 127 | TXO6P- 130 | TXO7+ 134 | | | | | |
| D | GND 131 | TXO7- 135 | GND 139 | TXO6P+ 143 | | | | |
| C | Vcc 132 | RX17- 138 | TXO8- 144 | TXO8P- 146 | TXO9- 151 | TXO9P+ 152 | Vcc 156 | TXO10+ 2 |
| B | TXO7P+ 136 | RX18+ 141 | RX18- 142 | GND 147 | TXO9+ 150 | RX19+ 153 | RXI10+ 157 | RXI10- 158 |
| A | RX17+ 137 | Vcc 140 | TXO8+ 145 | Vcc 148 | TXO9P- 149 | RX19- 154 | GND 155 | TXO10P+ 159 |

| | | | | | | | |
|---|---|---|---|---|---|---|---|
| V<sub>CC</sub> 80 | RA4 77 | RA2 75 | V<sub>CC</sub> 72 | /CDEC 69 | /RD 67 | D5 64 | D1 60 |
| GND 79 | RA3 76 | RA0 73 | GND 71 | /WR 68 | D6 65 | D2 61 | D0 59 |
| CLKIN 78 | RA1 74 | /MLOAD 70 | D7 66 | D4 63 | D3 62 | GND 57 | IRE 55 |
| | | | | V<sub>CC</sub> 58 | IRC 56 | IRD 54 | COLN 53 |
| | | | | | GND 51 | V<sub>CC</sub> 52 | /BUFEN 48 |
| | | | | | PKEN 50 | RXM 49 | /RDY 47 |
| | | | | | /RTI 45 | /STR1 44 | /ELI 46 |
| | | | | | /STR0 41 | GND 42 | V<sub>CC</sub> 43 |
| | | | | | /ACKO 38 | ANYXND 39 | ACTND 40 |
| | | | | | MRXC 37 | MEN 36 | MRXD 35 |
| | | | | | V<sub>CC</sub> 33 | GND 32 | MCRS 34 |
| | | | | | ACTNS 30 | /ACKI 31 | ANYXNS 29 |
| | | | | V<sub>CC</sub> 21 | RXI13+ 26 | RXI13- 27 | /PCOMP 28 |
| TXO10P- 3 | TXO11+ 7 | GND 12 | V<sub>CC</sub> 13 | TXO12P+ 16 | GND 20 | TXO13- 24 | TXO13P+ 25 |
| GND 4 | V<sub>CC</sub> 5 | RXI11+ 10 | RXI11- 11 | RXI12- 15 | TXO12- 17 | TXO13P- 22 | TXO13+ 23 |
| TXO10- 1 | TXO11P- 6 | TXO11- 8 | TXO11P+ 9 | RXI12+ 14 | TXO12+ 18 | TXO12P- 19 | |
| 9 | 0 | 1 | 2 | 3 | 4 | 5 | 6 |

| PIN NO. | PIN NAME | DRIVER TYPE | I/O | DESCRIPTION |
|---|---|---|---|---|
| PROCESSOR BUS PINS | | | | |
| | RA0 - RA4 | TT | I | REGISTER ADDRESS INPUTS: THESE FIVE PINS ARE USED TO SELECT A REGISTER TO BE READ OR WRITTEN. THE STATE OF THESE INPUTS ARE IGNORED WHEN THE READ, WRITE AND MODE LOAD INPUT STROBES ARE HIGH. (EVEN UNDER THESE CONDITIONS THESE INPUTS MUST NOT BE ALLOWED TO FLOAT AT AN UNDEFINED LOGIC STATE.) |
| | /STR0 | C | O | DISPLAY UPDATE STROBE 0<br>MAXIMUM DISPLAY MODE: THIS SIGNAL CONTROLS THE LATCHING OF DISPLAY DATA FOR NETWORK PORTS 1 TO 7 INTO THE OFF CHIP DISPLAY LATCHES.<br>MINIMUM DISPLAY MODE: THIS SIGNAL CONTROLS THE LATCHING OF DISPLAY DATA FOR THE RIC INTO THE OFF CHIP DISPLAY LATCH.<br><br>DURING PROCESSOR ACCESS CYCLES (READ OR WRITE IS ASSERTED) THIS SIGNAL IS INACTIVE (HIGH). |
| | /STR1 | C | O | DISPLAY UPDATE STROBE 1<br>MAXIMUM DISPLAY MODE: THIS SIGNAL CONTROLS THE LATCHING OF DISPLAY DATA FOR NETWORK PORTS 8 TO 13 INTO THE OFF CHIP DISPLAY LATCHES.<br>MINIMUM DISPLAY MODE: NO OPERATION<br><br>DURING PROCESSOR ACCESS CYCLES (READ OR WRITE IS ASSERTED) THIS SIGNAL IS INACTIVE (HIGH). |

FIG. 7A-1

| | | |
|---|---|---|
| D0 - D7 | B, Z | DATA BUS<br>DISPLAY UPDATE CYCLES: THESE PINS BECOME OUTPUTS PROVIDING DISPLAY DATA AND PORT ADDRESS INFORMATION.<br>ADDRESS INFORMATION ONLY AVAILABLE IN MAXIMUM DISPLAY MODE.<br><br>PROCESSOR ACCESS CYCLES: DATA INPUT OR OUTPUT IS PERFORMED VIA THESE PINS. THE READ, WRITE AND MODE LOAD INPUTS CONTROL THE DIRECTION OF THE SIGNALS.<br>NOTE: THE DATA PINS REMAIN IN THEIR DISPLAY UPDATE FUNCTION, i.e., ASSERTED AS OUTPUTS UNLESS EITHER THE READ OR WRITE STROBE IS ASSERTED. |
| /BUFEN | O | BUFFER ENABLE: THIS OUTPUT CONTROLS THE TRISTATE OPERATION OF THE BUS TRANSCEIVER WHICH PROVIDES THE INTERFACE BETWEEN THE RIC'S DATA PINS AND THE PROCESSOR'S DATA BUS.<br>NOTE: THE BUFFER ENABLE OUTPUT INDICATES THE FUNCTION OF THE DATA PINS. WHEN IT IS HIGH THEY ARE PREFORMING DISPLAY UPDATE CYCLES, WHEN IT IS LOW A PROCESSOR ACCESS OR MODE LOAD CYCLE IS OCCURING. |
| /RDY | O | DATA READY STROBE: THE FALLING EDGE OF THIS SIGNAL DURING A READ CYCLE INDICATES THAT DATA IS STABLE AND VALID FOR SAMPLING. IN WRITE CYCLES THE FALLING EDGE OF /RDY DENOTES THAT THE WRITE DATA HAS BEEN LATCHED BY THE RIC. THEREFORE DATA MUST HAVE BEEN AVAILABLE AND STABLE FOR THIS OPERATION TO BE SUCESSFUL. |
| /EU | O | EVENT LOGGING INTERRUPT: A LOW LEVEL ON THE /EU OUTPUT INDICATES THE RIC'S HUB MANAGEMENT LOGIC REQUIRES CPU ATTENTION. THE INTERRUPT IS CLEARED BY ACCESSING THE PORT EVENT RECORDING REGISTER OR EVENT COUNTER THAT PRODUCED IT. ALL INTERRUPT SOURCES MAY BE MASKED. |

FIG. 7A-2

| PIN NO. | PIN NAME | DRIVER TYPE | I/O | DESCRIPTION |
|---|---|---|---|---|
| | PROCESSOR BUS PINS | | | |
| | /RTI | C | O | REAL TIME INTERRUPT: A LOW LEVEL ON THE /RTI OUTPUT INDICATES THE RIC'S REAL TIME (PACKET SPECIFIC) INTERRUPT LOGIC REQUIRES CPU ATTENTION. THE INTERRUPT IS CLEARED BY READING THE REAL TIME INTERRUPT STATUS REGISTER. ALL INTERRUPT SOURCES MAY BE MASKED. |
| | /CDEC | TT | I | COUNTER DECREMENT: A RISING EDGE ON THE /CDEC INPUT STROBE DECREMENTS ALL OF THE RIC'S PORT EVENT COUNTERS BY ONE. THIS INPUT IS INTERNALLY SYNCHRONIZED AND IF NECESSARY THE OPERATION OF THE SIGNAL IS DELAYED IF THERE IS A SIMULTANEOUS INTERNALLY GENERATED COUNTING OPERATION. |
| | /WR | TT | I | WRITE STROBE: STROBE FROM THE CPU USED TO WRITE AN INTERNAL REGISTER DEFINED BY THE RA0 - RA4 INPUTS. |
| | /RD | TT | I | READ STROBE: STROBE FROM THE CPU USED TO READ AN INTERNAL REGISTER DEFINED BY THE RA0 - RA4 INPUTS. |
| | /MLOAD | TT | I | DEVICE RESET AND MODE LOAD: WHEN THIS INPUT IS LOW ALL OF THE RIC'S STATE MACHINES, COUNTERS AND NETWORK PORTS ARE RESET AND HELD INACTIVE. ON THE RISING EDGE OF /MLOAD THE LOGIC LEVELS PRESENT ON THE D0 - 7 PINS AND RA0 - RA4 INPUTS ARE LATCHED INTO THE RIC'S CONFIGURATION REGISTERS. THE RISING EDGE OF /MLOAD ALSO SIGNALS THE BEGINNING OF THE DISPLAY TEST OPERATION. |

FIG. 7B-1

| INTER-RIC BUS PINS | | | |
|---|---|---|---|
| /ACKI | TT | I | ACKNOWLEDGE INPUT: INPUT TO THE NETWORK PORTS' ARBITRATION CHAIN |
| /ACKO | TT | O | ACKNOWLEDGE OUTPUT: OUTPUT TO THE NETWORK PORTS' ARBITRATION CHAIN |
| IRD | TT | B, Z | INTER-RIC DATA: WHEN ASSERTED AS AN OUTPUT THIS SIGNAL PROVIDES A SERIAL DATA STREAM IN NRZ FORMAT. THE SIGNAL IS ASSERTED BY A RIC WHEN IT IS RECEIVING DATA FROM ONE OF ITS NETWORK SEGMENTS. THE DEFAULT CONDITION OF THIS SIGNAL IS TO BE AN INPUT. IN THIS STATE IT MAY BE DRIVEN BY OTHER DEVISES ON THE INTER - RIC BUS. |
| IRE | TT | B, Z | INTER-RIC ENABLE: WHEN ASSERTED AS AN OUTPUT THIS SIGNAL PROVIDES AN ACTIVITY FRAMING ENABLE FOR THE SERIAL DATA STREAM. THE SIGNAL IS ASSERTED BY A RIC WHEN IT IS RECEIVING DATA FROM ONE OF ITS NETWORK SEGMENTS. THE DEFAULT CONDITION OF THIS SIGNAL IS TO BE AN INPUT. IN THIS STATE IT MAY BE DRIVEN BY OTHER DEVICES ON THE INTER - RIC BUS. |
| IRC | TT | B, Z | INTER-RIC CLOCK: WHEN ASSERTED AS AN OUTPUT THIS SIGNAL PROVIDES A CLOCK SIGNAL FOR THE SERIAL DATA STREAM. DATA (IRD) IS CHANGED ON THE FALLING EDGE OF THE CLOCK. THE SIGNAL IS ASSERTED BY A RIC WHEN IT IS RECEIVING DATA FROM ONE OF ITS NETWORK SEGMENTS. THE DEFAULT CONDITION OF THIS SIGNAL IS TO BE AN INPUT. WHEN A INPUT IRD IS SAMPLED ON THE RISING EDGE OF THE CLOCK. IN THIS STATE IT MAY BE DRIVEN BY OTHER DEVISES ON THE INTER - RIC BUS. |
| COLN | TT | B, Z | COLLISION ON PORT N: THIS DENOTES THAT A COLLISION IS OCCURRING ON THE PORT RECEIVING THE DATA PACKET. THE DEFAULT CONDITION OF THIS SIGNAL IS TO BE AN INPUT. IN THIS STATE IT MAY BE DRIVEN BY OTHER DEVICES ON THE INTER - RIC BUS. |

FIG. 7B-2

| PIN NO. | PIN NAME | DRIVER TYPE | I/O | DESCRIPTION |
|---|---|---|---|---|
| | INTER-RIC BUS PINS | | | |
| | PKEN | C | O | PACKET ENABLE: THIS OUTPUT ACTS AS AN ACTIVE HIGH ENABLE FOR AN EXTERNAL BUS TRANSCEIVER (IF REQUIRED) FOR THE /IRE, IRC, IRD AND /COLN SIGNALS. WHEN HIGH THE BUS TRANSCEIVER SHOULD BE TRANSMITTING ON TO THE BUS, i.e. THIS RIC IS DRIVING THE IRD, /IRE, IRC AND COLN BUS LINES. WHEN LOW THE BUS TRANSCEIVER SHOULD RECEIVE FROM THE BUS. |
| | CLKIN | TT | I | 40 MEGAHERTZ CLOCK INPUT: THIS INPUT IS USED TO GENERATE THE RIC'S TIMING REFERENCE FOR THE STATE MACHINES, AND PHASE LOCK LOOP DECODER. |
| | ACTND | OD | O | ACTIVITY ON PORT N DRIVE: THIS OUTPUT IS ACTIVE WHEN THE RIC IS RECEIVING DATA OR COLLISION INFORMATION FROM ONE OF ITS NETWORK SEGMENTS. |
| | ACTNS | TT | I | ACTIVITY ON PORT N SENSE: THIS INPUT SENSES WHEN THIS OR ANOTHER RIC IN A MULTI-RIC SYSTEM IS RECEIVING DATA OR COLLISION INFORMATION. |
| | ANYXND | OD | O | ACTIVITY ON ANY PORT EXCLUDING PORT N DRIVE: THIS OUTPUT IS ACTIVE WHEN A RIC IS EXPERIENCING A TRANSMIT COLLISION OR MULTIPLE PORTS HAVE ACTIVE COLLISIONS ON THEIR NETWORK SEGMENTS. |
| | ANYXNS | TT | I | ACTIVITY ON ANY PORT EXCLUDING PORT N SENSE: THIS INPUT SENSES WHEN THIS RIC OR OTHER RICS IN A MULTI-RIC SYSTEM ARE EXPERIENCING TRANSMIT COLLISIONS OR MULTIPLE PORTS HAVE ACTIVE COLLISIONS ON THEIR NETWORK SEGMENTS. |

TT = TTL COMPATIBLE, B = BI-DIRECTIONAL, C = CMOS COMPATIBLE, OD = OPEN DRAIN, I = INPUT, O = OUTPUT

FIG. 7C

| PIN NO. | PIN NAME | DRIVER TYPE | I/O | DESCRIPTION |
|---|---|---|---|---|
| MANAGEMENT BUS PINS | | | | |
| | MRXC | TT | O,Z | MANAGEMENT RECEIVE CLOCK: WHEN ASSERTED THIS SIGNAL PROVIDES A CLOCK SIGNAL FOR THE MRXD SERIAL DATA STREAM. THE MRXD SIGNAL IS CHANGED ON THE FALLING EDGE OF THIS CLOCK. THE SIGNAL IS ASSERTED WHEN A RIC IS RECEIVING DATA FROM ONE OF ITS NETWORK SEGMENTS. OTHERWISE THE SIGNAL IS INACTIVE. |
| | MCRS | TT | B,Z | MANAGEMENT CARRIER SENSE: WHEN ASSERTED THIS SIGNAL PROVIDES AN ACTIVITY FRAMING ENABLE FOR THE SERIAL DATA STREAM. THE SIGNAL IS ASSERTED WHEN A RIC IS RECEIVING DATA FROM ONE OF ITS NETWORK SEGMENTS. OTHERWISE THE SIGNAL IS AN INPUT. |
| | MRXD | TT | O,Z | MANAGEMENT RECEIVE DATA: WHEN ASSERTED THIS SIGNAL PROVIDES A SERIAL DATA STREAM IN THE NRZ FORMAT. THE DATA STREAM IS MADE UP OF THE DATA PACKET AND RIC STATUS INFORMATION. THE SIGNAL IS ASSERTED WHEN A RIC IS RECEIVING DATA FROM ONE OF ITS NETWORK SEGMENTS. OTHERWISE THE SIGNAL IS INACTIVE. |
| | MEN | C | O | MANAGEMENT BUS OUTPUT ENABLE: THIS OUTPUT ACTS AS AN ACTIVE HIGH ENABLE FOR AN EXTERNAL BUS TRANSCEIVER (IF REQUIRED) FOR THE MRXC, /MCRS AND MRXD SIGNALS. WHEN HIGH THE BUS TRANSCEIVER SHOULD BE TRANSMITTING ON TO THE BUS. |
| | /PCOMP | TT | I | PACKET COMPRESS: THIS INPUT IS USED TO ACTIVATE THE RIC'S PACKET COMPRESS LOGIC. A LOW LEVEL ON THIS SIGNAL WHEN /MCRS IS ACTIVE WILL CAUSE THAT PACKET TO BE COMPRESSED. IF /PCOMP IS TIED LOW ALL PACKETS ARE COMPRESSED, IF /PCOMP IS TIED HIGH PACKET COMPRESSION IS INHIBITED. |

FIG. 7D-1

| POWER AND GROUND PINS | | |
|---|---|---|
| VCC | | POSITIVE SUPPLY |
| GND | | NEGATIVE SUPPLY |

| EXTERNAL DECODER PINS | | |
|---|---|---|
| RXM | O | RECEIVE DATA MANCHESTER FORMAT: THIS OUTPUT MAKES THE DATA, IN MANCHESTER FORMAT, RECEIVED BY PORT N AVAILABLE FOR TEST PURPOSES. IF NOT USED FOR TESTING THIS PIN SHOULD BE LEFT OPEN. |

TT = TTL COMPATIBLE, B = BI-DIRECTIONAL, C = CMOS COMPATIBLE, OD = OPEN DRAIN, I = INPUT, O = OUTPUT

FIG. 7D-2

C1 = MINTERM1 OR MINTERM2 OR MINTERM3
C2 = MINTERM4 OR MINTERM5 OR MINTERM6
C3 = MINTERM7
C4 = MINTERM8 OR MINTERM9
C5 = MINTERM10 OR MINTERM11
C6 = MINTERM12

| INPUT NAME | DESCRIPTION |
|---|---|
| ACTNCZ | ACTIVITY ON PORT N DERIVED FROM ACTNDIZ, i.e., ACTIVITY INSIDE THIS RIC AND ACTNSIZ ACTIVITY ON THE I-R BUS FROM THIS OR OTHER RICS. THIS SIGNAL IS SYNCED IN THIS BLOCK TO PHI1 FALLING EDGES. |
| ANYXNSICZ | ACTIVITY FROM A PORT OTHER THAN PORT N DERIVED FROM PORTS INSIDE THE RIC AND THOSE IN OTHER RICS. THIS SIGNAL IS SYNCED IN THIS BLOCK TO PHI1 FALLING EDGES. |
| BD2 | TRANSMIT TIMER HAS COUNTED TO 2, i.e., 2 BITS DONE. |
| BD62 | TRANSMIT TIMER HAS COUNTED TO 62, i.e., 62 BITS DONE. |
| BD99 | TRANSMIT TIMER HAS COUNTED TO 99, i.e., 99 BITS DONE. |
| COLNCZ | COLLISION ON PORT PORT N. THIS SIGNAL IS SYNCED IN THIS BLOCK TO PHI1 FALLING EDGES. |
| JAB | A JABBER LENGTH PACKET HAS BEEN TRANSMITTED. |
| TWUPL | THE 1 SECOND POWER UP WAIT DELAY HAS BEEN ELAPSED. |
| SFDLATCHC | THE START OF FRAME DELIMITER HAS BEEN DETECTED WHEN THIS SIGNAL GOES HIGH. THIS SIGNAL IS SYNCED IN THIS BLOCK TO PHI1 FALLING EDGES. |
| FFE | THE ON-CHIP ELASTICITY BUFFER (A.K.A. FIFO) IS EMPTY. |
| FFF | THE ON-CHIP ELASTICITY BUFFER (A.K.A. FIFO) IS FULL |

FIG. 10C

| 259 OUTPUT | Q0 | Q1 | Q2 | Q3 | Q4 | Q5 | Q6 | Q7 |
|---|---|---|---|---|---|---|---|---|
| 259 ADDR S0-2 | 000 | 001 | 010 | 011 | 100 | 101 | 110 | 111 |
| RIC PORT NUMBER | | 1(AUI) | 2 | 3 | 4 | 5 | 6 | 7 |
| RIC D0 259 #1 | | | LINK | LINK | LINK | LINK | LINK | LINK |
| RIC D1 259 #2 | ACOL | COL | COL | COL | COL | COL | COL | COL |
| RIC D2 259 #3 | AREC | REC | REC | REC | REC | REC | REC | REC |
| RIC D3 259 #4 | JAB | PART | PART | PART | PART | PART | PART | PART |
| RIC D4 259 #5 | | | BDPOL | BDPOL | BDPOL | BDPOL | BDPOL | BDPOL |

74LS259 LATCH INPUTS = /STR0

| 259 OUTPUTS | Q0 | Q1 | Q2 | Q3 | Q4 | Q5 | Q6 | Q7 |
|---|---|---|---|---|---|---|---|---|
| 259 ADDR S0-2 | 000 | 001 | 010 | 011 | 100 | 101 | 110 | 111 |
| RIC PORT NUMBER | 8 | 9 | 10 | 11 | 12 | 13 | | |
| RIC D0 259 #6 | LINK | LINK | LINK | LINK | LINK | LINK | | |
| RIC D1 259 #7 | COL | COL | COL | COL | COL | COL | | |
| RIC D2 259 #8 | REC | REC | REC | REC | REC | REC | | |
| RIC D3 259 #9 | PART | PART | PART | PART | PART | PART | | |
| RIC D4 259 #10 | BDPOL | BDPOL | BDPOL | BDPOL | BDPOL | BDPOL | | |

74LS259 (OR EQUIV.) LATCH INPUTS = /STR1

FIG. 19

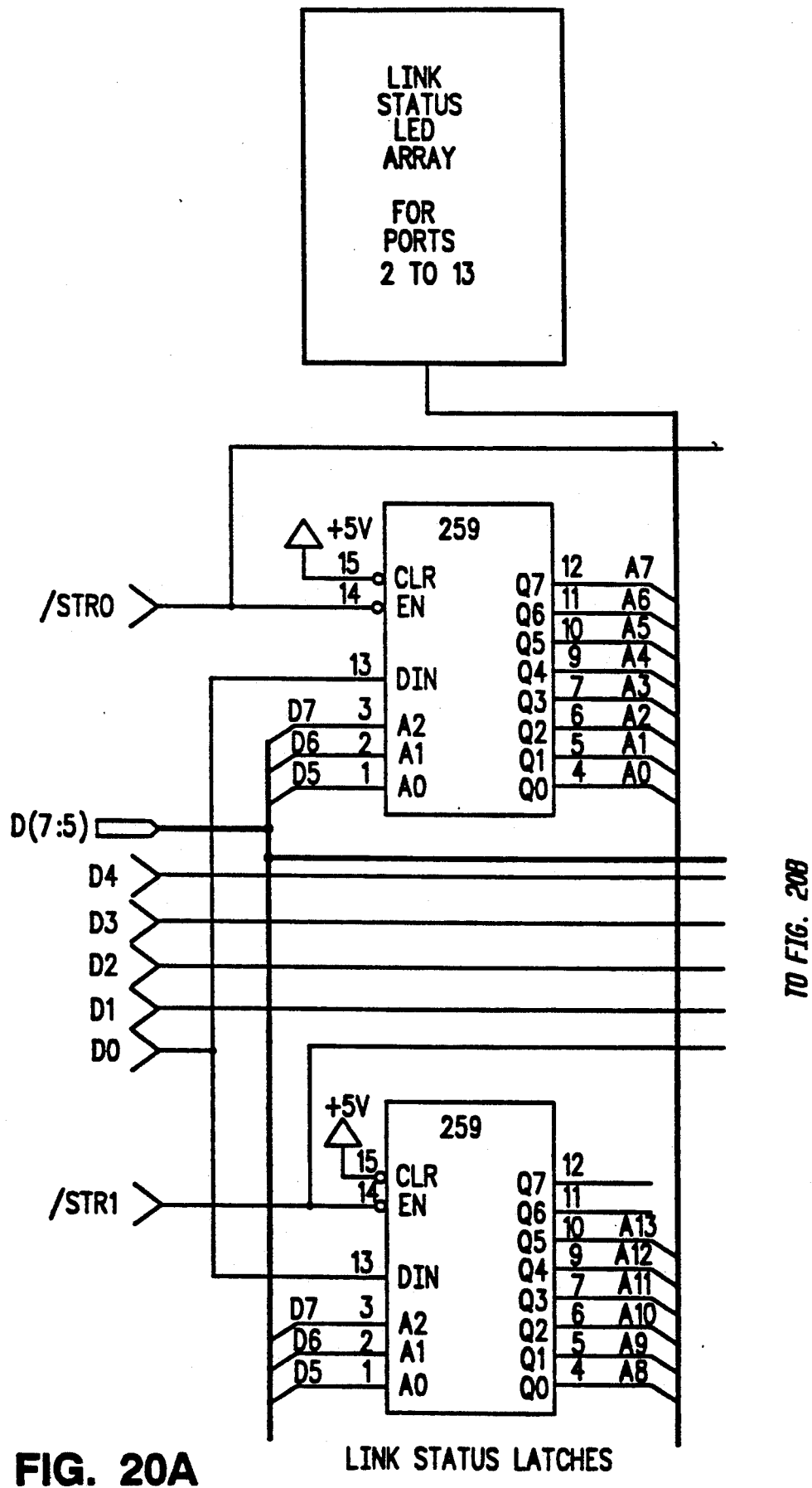
FIG. 20A — LINK STATUS LATCHES

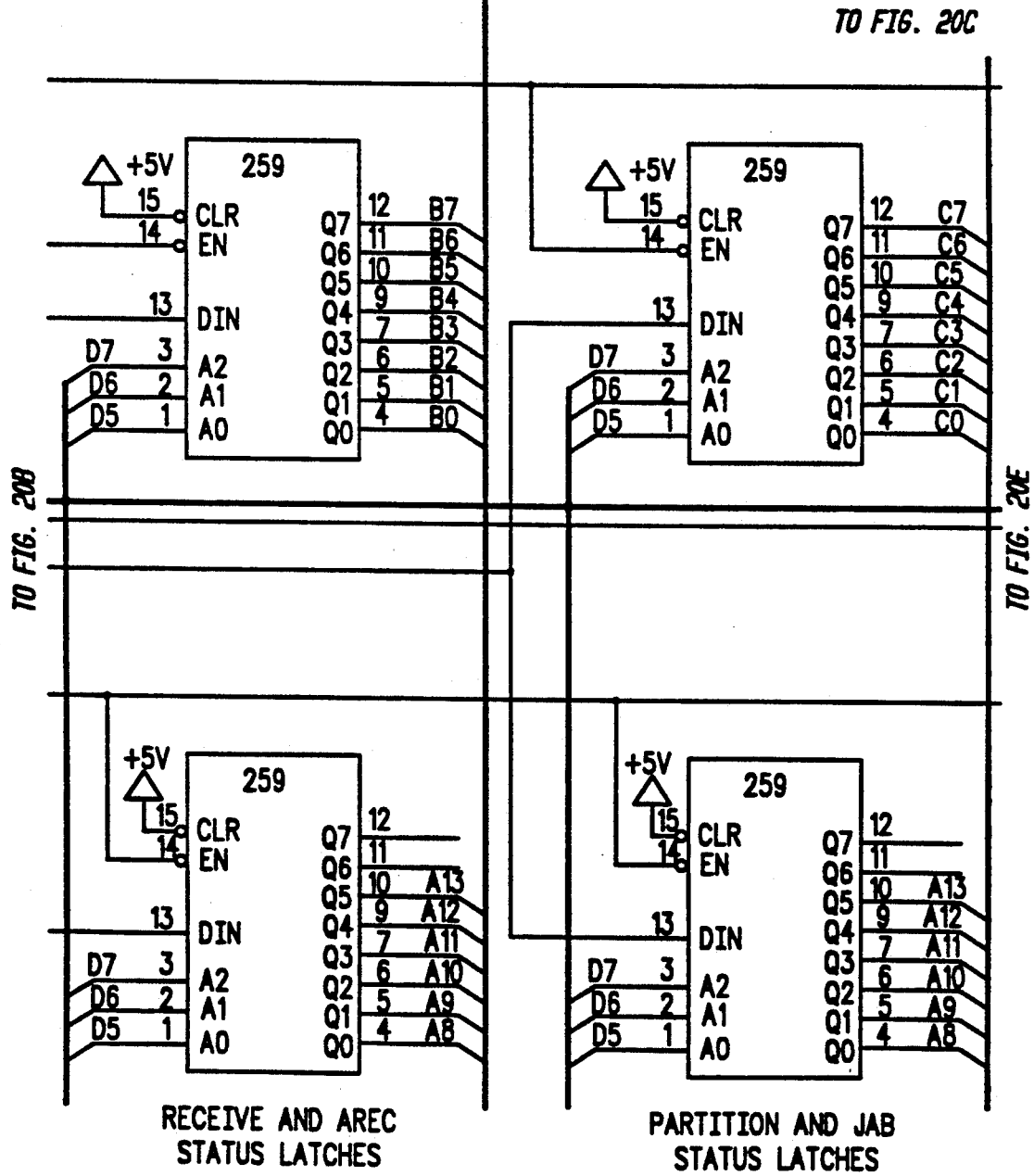

| | D7 | D6 | D5 | D4 | D3 | D2 | D1 | D0 |
|---|---|---|---|---|---|---|---|---|
| PACKET STATUS REGISTER PSR | | | | | | | | |
| PSR(0) | A5 | A4 | A3 | A2 | A1 | A0 | PCOMPD | RESV |
| PSR(1) | CRCER | FAE | COL | CLN | PA3 | PA2 | PA1 | PA0 |
| PSR(2) | PGPK | OWC | NSFD | PLER | ELBER | JAB | CBT9 | CBT8 |
| PSR(3) COLLISION BIT TIMER | CBT7 | CBT6 | CBT5 | CBT4 | CBT3 | CBT2 | CBT1 | CBT0 |
| PSR(4) LOWER REPEAT BYTE COUNT | RBY7 | RBY6 | RBY5 | RBY4 | RBY3 | RBY2 | RBY1 | RBY0 |
| PSR(5) UPPER REPEAT BYTE COUNT | RBY15 | RBY14 | RBY13 | RBY12 | RBY11 | RBY10 | RBY9 | RBY8 |
| PSR(6) INTER FRAME GAP BIT TIMER | IBT7 | IBT6 | IBT5 | IBT4 | IBT3 | IBT2 | IBT1 | IBT0 |

FIG. 22

| D7 | D6 | D5 | D4 | D3 | D2 | D1 | D0 |
|----|----|----|----|----|----|----|----|
| A5 | A4 | A3 | A2 | A1 | A0 | PCOMPD | RESV |

| BIT | SYMBOL | DESCRIPTION |
|-----|--------|-------------|
| D0 | RESV | RESERVED FOR FUTURE USE: THIS BIT IS CURRENTLY UNDEFINED MANAGEMENT SOFTWARE SHOULD NOT EXAMINE THE STATE OF THIS BIT. |
| D1 | PCOMPD | PACKET COMPRESSION DONE: IF PACKET COMPRESSION IS UTILIZED, THIS BIT INFORMS THE USER THAT COMPRESSION WAS PERFORMED, i.e., THE PACKET WAS LONG ENOUGH TO REQUIRE COMPRESSION. |
| D(7:2) | A(5:0) | RIC ADDRESS (5:0): THIS ADDRESS IS DEFINED BY THE USER AND IS SUPPLIED WHEN WRITING TO THE RIC ADDRESS REGISTER. IT IS USED BY HUB MANAGEMENT SOFTWARE TO DISTINGUISH BETWEEN RICS IN A MULTI-RIC SYSTEM. |

FIG. 24

PACKET STATUS REGISTER 1

| D7 | D6 | D5 | D4 | D3 | D2 | D1 | D0 |
|----|----|----|----|----|----|----|----|
| CRCER | FAE | COL | CLN | PA3 | PA2 | PA1 | PA0 |

| BIT | SYMBOL | DESCRIPTION |
|-----|--------|-------------|
| D(3:0) | PA(3:0) | PORT ADDRESS: THIS FIELD DEFINES THE PORT WHICH IS RECEIVING THE PACKET. |
| D4 | CLN | CLEAN RECEIVE: THIS BIT IS ASSERTED PROVIDED NO COLLISION ACTIVITY OCCURS DURING REPETITION OF THE SOURCE AND DESTINATION ADDRESS FIELDS, AND THE PACKET IS OF SUFFICIENT SIZE TO CONTAIN THESE FIELDS. |
| D5 | COL | COLLISION: IF A RECEIVE OR TRANSMIT COLLISION OCCURS DURING PACKET REPETITION THE COLLISION BIT IS ASSERTED. |
| D6 | FAE | FRAME ALIGNMENT ERROR: THIS BIT IS ASSERTED IF A FRAME ALIGNMENT ERROR OCCURRED IN THE REPEATED PACKET. |
| D7 | CRER | CRC ERROR: THIS BIT IS ASSERTED IF A CRC ERROR OCCURRED IN THE REPEATED PACKET. THIS STATUS FLAG SHOULD NOT BE TESTED IF THE COL BIT IS ASSERTED SINCE THE ERROR MAY BE SIMPLY DUE TO THE COLLISION. |

FIG. 25

PACKET STATUS REGISTER 2

| D7 | D6 | D5 | D4 | D3 | D2 | D1 | D0 |
|---|---|---|---|---|---|---|---|
| PGPK | OWC | NSFD | PLER | ELBER | JAB | CBT9 | CBT8 |

| BIT | SYMBOL | DESCRIPTION |
|---|---|---|
| D(1:0) | CT(9:8) | COLLISION TIMER BITS 9 AND 8: THESE TWO BITS ARE THE UPPER BITS OF THE COLLISION BIT TIMER. |
| D2 | JAB | JABBER EVENT: THIS BIT INDICATES THAT THE RECEIVE PACKET WAS SO LONG THE REPEATER WAS FORCED TO GO INTO A JABBER PROTECT CONDITION. |
| D3 | ELBER | ELASTICITY BUFFER ERROR DURING THE PACKET AN ELASTICITY BUFFER UNDER/OVERFLOW OCCURRED. |
| D4 | CRER | CARRIER ERROR EVENT: THE PACKET SUFFERED SUFFICIENT JITTER/NOISE CORRUPTION TO CAUSE THE PHASE LOCK LOOP DECODER TO LOOSE LOCK. |
| D5 | NSFD | NON SFD: THE REPEATED PACKET DID NOT CONTAIN A START OF FRAME DELIMITER. WHEN THIS BIT IS SET THE REPEAT BYTE COUNTER COUNTS THE LENGTH OF THE ENTIRE PACKET. WHEN THIS BIT IS NOT SET THE BYTE COUNTER ONLY COUNTS POST SFD BYTES. NOTE: THE OPERATION OF THIS BIT IS NOT INHIBITED BY THE OCCURRENCE OF A COLLISION DURING PACKET REPETITION. (SEE DESCRIPTION OF THE REPEAT BYTE COUNTER BELOW). |
| D6 | OWC | OUT OF WINDOW COLLISION: THE PACKET SUFFERED AN OUT OF WINDOW COLLISION. |
| D7 | PGPK | PYGMY PACKET EVENT: THE RECEIVED ACTIVITY WAS SO SMALL IT MET THE CRITERIA TO BE CLASSED AS A PYGMY PACKET. |

FIG. 26

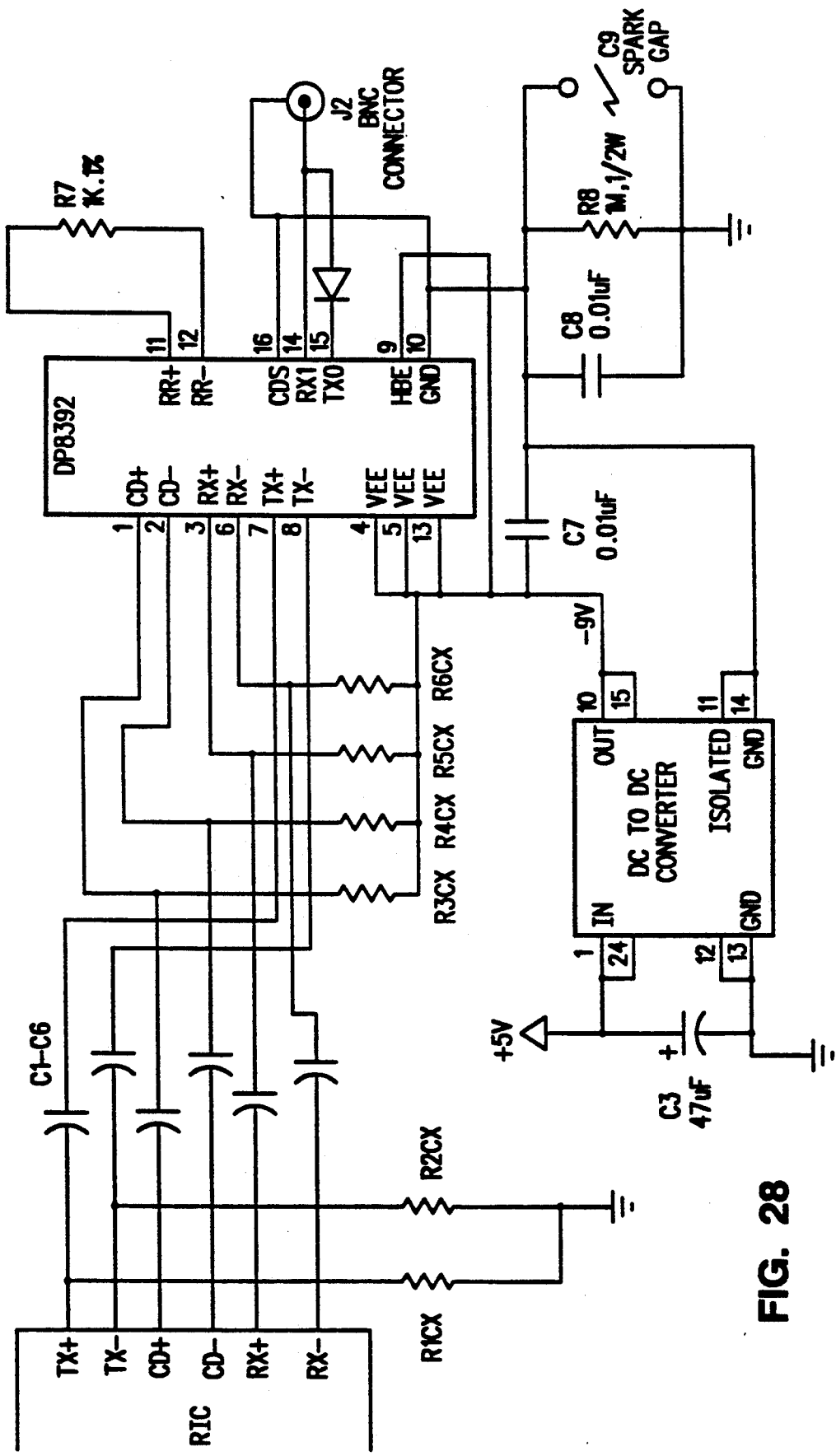
FIG. 28 PORT CONNECTION TO A 10BASE2 SEGMENT (AUI INTERFACE SELECTED)

| D7 | D6 | D5 | D4 | D3 | D2 | D1 | D0 |
|---|---|---|---|---|---|---|---|
| BINV | BYPAS2 | BYPAS1 | /APART | /JAB | /AREC | /ACOL | RESV |

| BIT | R/W | SYMBOL ACCESS | DESCRIPTION |
|---|---|---|---|
| D0 | R | RESV | RESERVED FOR FUTURE USE<br>READS AS A LOGIC 1 |
| D1 | R | /ACOL | ANY COLLISIONS<br>0: A COLLISION IS OCCURRING AT ONE OR MORE OF THE RIC'S PORTS.<br>1: NO COLLISIONS. |
| D2 | R | /AREC | ANY RECEIVE<br>0: ONE OF THE RIC'S PORTS IS THE CURRENT PACKET OR COLLISION RECEIVER.<br>1: NO PACKET OR COLLISION RECEPTION WITH THIS RIC. |
| D3 | R | /JAB | JABBER PROTECT<br>0: THE RIC HAS BEEN FORCED INTO JABBER PROTECT STATE BY ONE OF ITS PORTS OR BY ANOTHER PORT ON THE INTER-RIC BUS, (MULTI-RIC OPERATIONS).<br>1: NO JABBER PROTECT CONDITIONS EXIST. |
| D4 | R | /APART | ANY PARTITION<br>0: ONE OR MORE PORTS ARE PARTITIONED.<br>1: NO PORTS ARE PARTITIONED. |
| D5 | R | BYPAS1 | THESE BITS DEFINE THE CONFIGURATION OF PORTS 2 TO 13, i.e., THEIR USE IF THE INTERNAL 10BASE-T TRANSCEIVERS OR THE EXTERNAL (AUI-LIKE) TRANSCEIVER INTERFACE. |
| D6 | R | BYPAS2 | |
| D7 | R | BINV | BUS INVERT<br>THIS REGISTER BIT INFORMS WHETHER THE INTER-RIC SIGNALS: IRE, ACTN, ANYXN, COLN AND MANAGEMENT BUS SIGNAL MCRS ARE ACTIVE HIGH OR LOW.<br>0: ACTIVE HIGH<br>1: ACTIVE LOW |

FIG. 31

PORT REAL TIME STATUS REGISTERS (ADDRESS 01H TO 0DH)

| D7 | D6 | D5 | D4 | D3 | D2 | D1 | D0 |
|---|---|---|---|---|---|---|---|
| DISPT | EGP | PTYPE1 | PTYPE0 | /PART | /REC | /COL | /GDLNK |

| BIT | R/W | SYMBOL | DESCRIPTION |
|---|---|---|---|
| D0 | R/W | /GDLNK | GOOD LINK<br>0: LINK PULSES ARE BEING RECEIVED BY THE PORT.<br>1: LINK PULSES ARE NOT BEING RECEIVED BY THE PORT LOGIC.<br>NOTE: WRITING A 1 TO THIS BIT WILL CAUSE THE 10BASE-T TRANSCEIVER NOT TO TRANSMIT OR MONITOR THE RECEPTION OF LINK PULSES. IF THE INTERNAL 10BASE-T TRANSCEIVERS ARE NOT SELECTED OR IF PORT 1 (AUI PORT) IS READ, THEN THIS BIT IS UNDEFINED. |
| D1 | R | /COL | COLLISION<br>0: A COLLISION IS HAPPENING OR HAS OCCURRED DURING THE CURRENT PACKET.<br>1: NO COLLISIONS HAVE OCCURRED AS YET DURING THIS PACKET. |
| D2 | R | /REC | RECEIVE<br>0: THIS PORT IS NOW OR HAS BEEN THE RECEIVE SOURCE OF PACKET OR COLLISION INFORMATION FOR THE CURRENT PACKET.<br>1: THIS PORT HAS NOT BEEN THE RECEIVE SOURCE DURING THE CURRENT PACKET. |
| D3 | R/W | /PART | PARTITION<br>0: THIS PORT IS PARTITIONED.<br>1: THIS PORT IS NOT PARTITIONED.<br>WRITING A LOGIC ONE TO THIS BIT FORCES SEGMENT RECONNECTION AND PARTITION STATE MACHINE RESET. WRITING A ZERO TO THIS BIT HAS NO EFFECT. |

FIG. 32A

| | | | |
|---|---|---|---|
| D(5,4) | R | PTYPE0<br>PTYPE1 | PARTITION TYPE 0<br>PARTITION TYPE 1<br>THE PARTITION TYPE BITS PROVIDE INFORMATION SPECIFYING WHY THE PORT IS PARTITIONED.<br><br>| PTYPE1 | PTYPE2 | INFORMATION |<br>\|---\|---\|---\|<br>\| 0 \| 0 \| CONSECUTIVE COLLISION LIMIT REACHED \|<br>\| 0 \| 1 \| EXCESSIVE LENGTH OF COLLISION LIMIT REACHED \|<br>\| 1 \| 0 \| FAILURE TO SEE DATA LOOPBACK FROM TRANSCEIVER IN MONITORED WINDOW \|<br>\| 1 \| 1 \| PROCESSOR FORCED RECONNECTION \| |
| D6 | R/W | EGP | EXTERNALLY GENERATED PACKET TEST<br>0: PORT PERFORMS NORMAL PACKET REPETITION.<br>1: PORT IS SET IN EGP TEST MODE. |
| D7 | R/W | DISPT | DISABLE PORT<br>0: PORT OPERATES AS DEFINED BY REPEATER OPERATIONS.<br>1: ALL PORT ACTIVITY IS PREVENTED. |

FIG. 32B

| D7 | D6 | D5 | D4 | D3 | D2 | D1 | D0 |
|---|---|---|---|---|---|---|---|
| MINMAX | /DPART | /TX ONLY | /OWCE | /LPPART | /CCLIM | TW2 | RESV |

| BIT | R/W | SYMBOL | DESCRIPTION |
|---|---|---|---|
| D0 | R | RESV | RESERVED FOR FUTURE USE<br>VALUE SET AT LOGIC ONE |
| D1 | R | TW2 | CARRIER RECOVERY TIME<br>0: TW2 SET AT 5 BITS.<br>1: TW2 SET AT 3 BITS. |
| D2 | R | /CCLIM | CONSECUTIVE COLLISION LIMIT<br>0: CONSECUTIVE COLLISION LIMIT SET AT 63 COLLISIONS.<br>1: CONSECUTIVE COLLISION LIMIT SET AT 31 COLLISIONS. |
| D3 | R | /LPPART | LOOPBACK PARTITION<br>0: PARTITIONING UPON LACK OF LOOPBACK FROM TRANSCEIVERS IS ENABLED.<br>1: PARTITIONING UPON LACK OF LOOPBACK FROM TRANSCEIVERS IS DISABLED. |
| D4 | R | /OWCE | OUT OF WINDOW COLLISION ENABLE<br>0: OUT OF WINDOW COLLISIONS ARE TREATED AS IN WINDOW COLLISIONS BY THE SEGMENT PARTITION STATE MACHINES.<br>1: OUT OF WINDOW COLLISIONS ARE TREATED AS OUT OF WINDOW COLLISIONS BY THE SEGMENT PARTITION STATE MACHINES. |

FIG. 33A

| | | | |
|---|---|---|---|
| D5 | R | /TXONLY | ONLY RECONNECT UPON SEGMENT TRANSMISSION<br>0: A SEGMENT WILL ONLY BE RECONNECTED TO THE NETWORK IF A PACKET TRANSMITTED BY THE RIC ONTO THAT SEGMENT FULFILS THE REQUIREMENTS OF THE SEGMENT RECONNECTION ALGORITHM.<br>1: A SEGMENT WILL BE RECONNECTED TO THE NETWORK BY ANY PACKET ON THE NETWORK WHICH FULFILLS THE REQUIREMENTS OF THE SEGMENT RECONNECTION ALGORITHM. |
| D6 | R | /DPART | DISABLE PARTITION<br>0: PARTITIONING OF PORTS BY ON-CHIP ALGORITHMS IS PREVENTED.<br>1: PARTITIONING OF PORTS BY ON-CHIP ALGORITHMS IS ENABLED. |
| D7 | R | MINMAX | MINIMUM / MAXIMUM DISPLAY MODE<br>0: LED DISPLAY SET IN MINIMUM DISPLAY MODE.<br>1: LED DISPLAY SET IN MAXIMUM DISPLAY MODE. |

FIG. 33B

| D7 | D6 | D5 | D4 | D3 | D2 | D1 | D0 |
|---|---|---|---|---|---|---|---|
| IVCTR3 | IVCTR2 | IVCTR1 | IVCTR0 | ISRC3 | ISRC2 | ISRC1 | ISRC0 |

| BIT | R/W | SYMBOL | DESCRIPTION |
|---|---|---|---|
| D(3:0) | R | ISCR(3:0) | INTERRUPT SOURCE<br>THESE FOUR BITS INDICATE THE REASON WHY THE INTERRUPT WAS GENERATED. |
| D(7:4) | R | IVCTR(3:0) | INTERRUPT VECTOR<br>THIS FIELD DEFINES THE PORT ADDRESS RESPONSIBLE FOR GENERATING THE INTERRUPT. |

FIG. 34

| D7 | D6 | D5 | D4 | D3 | D2 | D1 | D0 | COMMENTS |
|---|---|---|---|---|---|---|---|---|
| PA3 | PA2 | PA1 | PA0 | 1 | 1 | 0 | 1 | FIRST COLLISION<br>PA(3:0) = COLLISION PORT ADDRESS |
| PA3 | PA2 | PA1 | PA0 | 1 | 0 | 1 | 1 | RECEIVE<br>PA(3:0) = RECEIVE PORT ADDRESS |
| PA3 | PA2 | PA1 | PA0 | 0 | 1 | 1 | 1 | PARTITION<br>RECONNECTION<br>PA(3:0) = PARTITION PORT ADDRESS |
| 1 | 1 | 1 | 1 | 1 | 1 | 1 | 1 | NO VALID INTERRUPT |

FIG. 35

| D7 | D6 | D5 | D4 | D3 | D2 | D1 | D0 |
|----|----|----|----|----|------|------|------|
| FC | HC | LC | FF | RESV | PSEL2 | PSEL1 | PSEL0 |

| BIT | R/W | SYMBOL | DESCRIPTION |
|-----|-----|--------|-------------|
| D(2:0) | R/W | PSEL(2:0) | PAGE SELECT BITS: WHEN READ THESE BITS INDICATE THE CURRENTLY SELECTED UPPER REGISTER ARRAY PAGE. WRITE CYCLES TO THESE LOCATIONS FACILITIES PAGE SWAPPING. THE PAGE SELECT BITS ARE LATCHED ON THE RISING EDGE OF THE READ STROBE. |
| D3 | R | RESV | RESERVED FOR FUTURE USE. |
| D4 | R | FF | FLAG FOUND: THIS INDICATES THAT ONE OF THE UNMASKED EVENT RECORDING LATCHES HAS BEEN SET. |
| D5 | R | LC | LOW COUNT: THIS INDICATES ONE OF THE PORT EVENT COUNTERS HAS A VALUE LESS THAN 00FF HEX. |
| D6 | R | HC | HIGH COUNT: THIS INDICATES ONE OF THE PORT EVENT COUNTERS HAS A VALUE GREATER THAN C000 HEX. |
| D7 | R | FC | FULL COUNTER: THIS INDICATES ONE OF THE PORT EVENT COUNTERS HAS A VALUE EQUAL TO FFFF HEX. |

FIG. 36

LOWER EVENT COUNT MASK REGISTER (PAGE 0H ADDRESS 12H)

| D7 | D6 | D5 | D4 | D3 | D2 | D1 | D0 |
|---|---|---|---|---|---|---|---|
| BDLNKC | PARTC | RECC | PGPKC | NSFDC | PLERC | ELBERC | JABC |

| BIT | R/W | SYMBOL | DESCRIPTION |
|---|---|---|---|
| D0 | R/W | JABC | JABBER COUNT ENABLE: ENABLES RECORDING OF JABBER PROTECT EVENTS. |
| D1 | R/W | ELBERC | ELASTICITY BUFFER ERROR COUNT ENABLE: ENABLES RECORDING OF ELASTICITY BUFFER ERROR EVENTS. |
| D2 | R/W | PLERC | PHASE LOCK ERROR COUNT ENABLE: ENABLES RECORDING OF CARRIER ERROR EVENTS. |
| D3 | R/W | NSFDC | NON SFD COUNT ENABLE: ENABLES RECORDING OF NON SFD PACKET EVENTS. |
| D4 | R/W | PGPKC | PYGMY PACKET COUNT ENABLE: ENABLES RECORDING OF PYGMY PACKET EVENTS. |
| D5 | R/W | RECC | RECEIVE COUNT ENABLE: ENABLES RECORDING OF PACKET RECEIVE (PORT N STATUS) EVENTS THAT DO NOT SUFFER COLLISIONS. |
| D6 | R/W | PARTC | PARTITION COUNT ENABLE: ENABLES RECORDING OF PARTITION EVENTS. |
| D7 | R/W | BDLNKC | BAD LINK COUNT ENABLE: ENABLES RECORDING OF BAD LINK EVENTS. |

FIG. 37

UPPER EVENT COUNT MASK REGISTER (PAGE 0H ADDRESS 13H)

| D7 | D6 | D5 | D4 | D3 | D2 | D1 | D0 |
|---|---|---|---|---|---|---|---|
| RESV | RESV | OWCC | RXCOLC | TXCOLC | RESV | FWF | ROR |

| BIT | R/W | SYMBOL | DESCRIPTION |
|---|---|---|---|
| D0 | R/W | ROR | RESET ON READ: THIS BIT SELECTS THE ACTION A READ OPERATION HAS UPON A PORT'S EVENT COUNTER: 0: NO EFFECT UPON REGISTER CONTENTS. 1: THE COUNTER REGISTER IS RESET. |
| D1 | R/W | FWF | FREEZE WHEN FULL: THIS BIT CONTROLS THE FREEZING OF THE EVENT COUNT REGISTERS WHEN THE COUNTER IF FULL (FFFF HEX). |
| D2 | R | RESV | RESERVED FOR FUTURE USE: THIS BIT SHOULD BE WRITTEN WITH A LOW LOGIC LEVEL |
| D3 | R/W | TXCOLC | TRANSMIT COLLISION COUNT ENABLE: ENABLES RECORDING OF TRANSMIT COLLISION EVENTS ONLY. |
| D4 | R/W | RXCOLC | RECEIVE COLLISION COUNT ENABLE: ENABLES RECORDING OF RECEIVE COLLISION EVENTS ONLY. |
| D5 | R/W | OWCC | OUT OF WINDOW COLLISION COUNT ENABLE: ENABLES RECORDING OF OUT OF WINDOW COLLISION EVENTS ONLY. |
| D(7:6) | R | RESV | RESERVED FOR FUTURE USE: THESE BITS SHOULD BE WRITTEN WITH A LOW LOGIC LEVEL |

NOTE: TO COUNT ALL COLLISIONS THEN BOTH THE TXCOLC AND RXCOLC BITS MUST BE SET. THE OWCC BIT SHOULD NOT BE SET OTHERWISE THE PORT COUNTER WILL BE INCREMENTED TWICE WHEN AN OUT OF COLLISION WINDOW COLLISION OCCURS. THE OWCC BIT ALONE SHOULD BE SET IF ONLY OUT OF WINDOW COLLISIONS ARE TO BE COUNTED.

FIG. 38

EVENT RECORD MASK REGISTER (PAGE 0H ADDRESS 14H)

| D7 | D6 | D5 | D4 | D3 | D2 | D1 | D0 |
|---|---|---|---|---|---|---|---|
| BDLNKE | PARTE | OWCE | PGPKE | NSFDE | PLERE | ELBERE | JABE |

| BIT | R/W | SYMBOL | DESCRIPTION |
|---|---|---|---|
| D0 | R/W | JABE | JABBER ENABLE: ENABLES RECORDING OF JABBER PROTECT EVENTS |
| D1 | R/W | ELBERE | ELASTICITY BUFFER ERROR ENABLE: ENABLES RECORDING OF ELASTICITY BUFFER ERROR EVENTS |
| D2 | R/W | PLERE | PHASE LOCK ERROR ENABLE: ENABLES RECORDING OF CARRIER ERROR EVENTS |
| D3 | R/W | NSFDE | NON SFD ENABLE: ENABLES RECORDING OF NON SFD PACKET EVENTS |
| D4 | R/W | PGPKE | PYGMY PACKET ENABLE: ENABLES RECORDING OF PYGMY PACKET EVENTS |
| D5 | R/W | OWCE | OUT OF WINDOW COLLISION COUNT ENABLE: ENABLES RECORDING OF OUT OF WINDOW COLLISION EVENTS ONLY |
| D6 | R/W | PARTE | PARTITION ENABLE: ENABLES RECORDING OF PARTITION EVENTS |
| D7 | R/W | BDLNKE | BAD LINK ENABLE: ENABLES RECORDING OF BAD LINK EVENTS |

FIG. 39

| D7 | D6 | D5 | D4 | D3 | D2 | D1 | D0 |
|---|---|---|---|---|---|---|---|
| /IFC | /IHC | /ILC | /IFF | /IREC | /ICOL | /IPART | MIFCON |

| BIT | R/W | SYMBOL | DESCRIPTION |
|---|---|---|---|
| D0 | R/W | MIFCON | MANAGEMENT INTERFACE CONFIGURATION<br>0: ALL PACKETS REPEATED ARE TRANSMITTED OVER THE MANAGEMENT BUS.<br>1: PACKETS REPEATED BY THE RIC WHICH DO NOT HAVE A START OF FRAME DELIMITERS ARE NOT TRANSMITTED OVER THE MANAGEMENT BUS. |
| D1 | R/W | /IPART | INTERRUPT ON PARTITION<br>0: INTERRUPTS WILL BE GENERATED IF A PORT BECOMES PARTITIONED.<br>1: NO INTERRUPTS ARE GENERATED BY THIS CONDITION. |
| D2 | R/W | /ICOL | INTERRUPT ON COLLISION<br>0: INTERRUPTS WILL BE GENERATED IF THIS RIC HAS A PORT WHICH EXPERIENCES A COLLISION, SINGLE RIC APPLICATIONS, OR CONTAINS A PORT WHICH EXPERIENCES A RECEIVE COLLISION OR IS THE FIRST PORT TO SUFFER A TRANSMIT COLLISION IN A PACKET IN MULTI-RIC APPLICATIONS.<br>1: NO INTERRUPTS ARE GENERATED BY THIS CONDITION. |
| D3 | R/W | /IREC | INTERRUPT ON RECEIVE<br>0: INTERRUPTS WILL BE GENERATED IF THIS RIC CONTAINS THE RECEIVE PORT FOR PACKET OR COLLISION ACTIVITY.<br>1: NO INTERRUPTS ARE GENERATED BY THIS CONDITION. |
| D4 | R/W | /IFF | INTERRUPT ON FLAG FOUND<br>0: INTERRUPTS WILL BE GENERATED IF ONE OR MORE THAN ONE OF THE FLAGS IN THE FLAG ARRAY IS TRUE.<br>1: NO INTERRUPTS ARE GENERATED BY THIS CONDITION. |

FIG. 40A

| | | |
|---|---|---|
| D5 | R/W ILC | INTERRUPT ON LOW COUNT<br>0: INTERRUPT GENERATED WHEN ONE OR MORE OF THE EVENT COUNTERS HOLDS A VALUE LESS THAN 256 COUNTS.<br>1: NO EFFECT |
| D6 | R/W IHC | INTERRUPT ON HIGH COUNT<br>0: INTERRUPT GENERATED WHEN ONE OR MORE OF THE EVENT COUNTERS HOLDS A VALUE IN EXCESS OF 49152 COUNTS.<br>1: NO EFFECT |
| D7 | R/W IFC | INTERRUPT ON FULL COUNTER<br>0: INTERRUPT GENERATED WHEN ONE OR MORE EVENT COUNTERS HOLDS IS FULL<br>1: NO EFFECT |

FIG. 40B

| D7 | D6 | D5 | D4 | D3 | D2 | D1 | D0 |
|----|----|----|----|----|----|----|----|
| A5 | A4 | A3 | A2 | A1 | A0 | RES | RES |

FIG. 41

| D7 | D6 | D5 | D4 | D3 | D2 | D1 | D0 |
|----|----|----|----|----|----|----|----|
| PCD7 | PCD6 | PCD5 | PCD4 | PCD3 | PCD2 | PCD1 | PCD0 |

FIG. 42

| D7 | D6 | D5 | D4 | D3 | D2 | D1 | D0 |
|----|----|----|----|----|----|----|----|
| IFGT7 | IFGT6 | IFGT5 | IFGT4 | IFGT3 | IFGT2 | IFGT1 | IFGT0 |

FIG. 43

| D7 | D6 | D5 | D4 | D3 | D2 | D1 | D0 |
|----|----|----|----|----|----|----|----|
| RCON | PART | OWC | PGPK | NSFD | PLER | ELBER | JAB |

| BIT | R/W | SYMBOL | DESCRIPTION |
|-----|-----|--------|-------------|
| D0 | R | JAB | JABBER: A JABBER PROTECT EVENT HAS OCCURRED |
| D1 | R | ELBER | ELASTICITY BUFFER ERROR: A ELASTICITY BUFFER ERROR HAS OCCURRED |
| D2 | R | PLER | PHASE LOCK ERROR: A PHASE LOCK ERROR EVENT HAS OCCURRED |
| D3 | R | NSFD | NON SFD: A NON SFD PACKET EVENT HAS OCCURRED |
| D4 | R | PGPK | PYGMY PACKET: A PYGMY PACKET EVENT HAS OCCURRED |
| D5 | R | OWC | OUT OF WINDOW COLLISION: AN OUT OF WINDOW COLLISION EVENT HAS OCCURRED |
| D6 | R | PART | PARTITION: A PARTITION EVENT HAS OCCURRED |
| D7 | R | BDLNK | BAD LINK: A LINK FAILURE EVENT HAS OCCURRED |

FIG. 44

LOWER BYTE

| D7 | D6 | D5 | D4 | D3 | D2 | D1 | D0 |
|----|----|----|----|----|----|----|----|
| EC7 | EC6 | EC5 | EC4 | EC3 | EC2 | EC1 | EC0 |

UPPER BYTE

| D7 | D6 | D5 | D4 | D3 | D2 | D1 | D0 |
|----|----|----|----|----|----|----|----|
| EC15 | EC14 | EC13 | EC12 | EC11 | EC10 | EC9 | EC8 |

FIG. 45

REPEATER INTERFACE CONTROLLER WITH A PARTITIONING PORT STATE MACHINE

This is a divisional of application Ser. No. 643,208, filed Jan. 18, 1991.

BACKGROUND OF THE INVENTION

1. Field of the Invention

The present invention relates to local area networks and, in particular, to a partitioning port state machine for a repeater interface controller that connects segments of a bus/tree network.

2. Discussion of the Prior Art

A local area network, or LAN, is a communications system that provides interconnection among a number of independent computing stations within a small area, such as a single building or a group of adjacent buildings.

William Stallings' overview of local area network concepts and technology, as set forth in (1) *Local Area Networks*, Third Edition, MacMillan Publishing Co., and (2) *Handbook of Computer-Communications Standards*, Volume 2, Howard W. Sams Publishing, provides the basis for the following background discussion.

As discussed by Stallings, in the context of a communications network, the term "topology" refers to the way in which the stations comprising the network are interconnected.

The most-commonly implemented local area network topology is the so-called "bus/tree" topology.

In a "bus" network, all stations attach directly to a linear transmission medium, or bus, through appropriate hardware interfacing. A transmission from any station in the network propagates the length of the medium and can be received by all other stations.

A "tree" topology is a generalization of the bus topology. In a tree network, the transmission medium is a branching cable with no closed loops. Each branch defines a network "segment". As in a bus network, a transmission from any station in the network propagates through the medium on all segments and can be received by all other stations.

Data are transmitted in a bus/tree network in units that are usually referred to as "frames" or "packets". In addition to data to be transmitted, each packet includes control information such as the address of the packet source (transmit station) and the address of the packet destination (receive station).

Because all stations of a bus/tree network share a common transmission medium, only one station may transmit at a time. A transmitted packet propagates through the medium, is received by all stations on the network and is copied by the destination station to which it is addressed.

Bus/tree networks utilize one of two types of data transmission techniques: baseband or broadband. Baseband transmission uses digital signalling and can be implemented with either twisted pair or coaxial cable. Broadband transmission uses analog signalling in the radio-frequency (RF) range and is implemented with coaxial cable.

In a baseband LAN, digital signals are transmitted onto the medium as voltage pulses, usually utilizing Manchester encoding. Transmission is bidirectional; that is, a signal inserted at any point on the medium propagates in both directions to the ends of the medium where it is absorbed. Baseband systems can extend only a limited distance, usually about 1 km. maximum, because of attenuation of the digital signal.

Because of the wide variety of physical, electrical and procedural characteristics available to designers of equipment for local area networks, it has become widely acknowledged that certain standards must be observed. For example, the International Organization for Standardization (ISO) has developed a voluntary Open Systems Interconnection (OSI) model which defines a general computer system architecture. An "open" system may be implemented in any way provided that it conforms to a minimal set of OSI standards that allow it to communicate with other "open" systems.

A number of local area network protocol standards have been developed by the Institute of Electrical and Electronics Engineers (IEEE) 802 committee One of these standards, the IEEE 802.3 standard, defines a protocol for a bus/tree local area network. As discussed below, the IEEE 802.3 standard defines a bus/tree protocol that implements the carrier sense multiple access with a collision detection (CSMA/CD. The standard also defines a media access control (MAC) function for transmitting packets to and receiving packets from the transmission medium as well as packet structure and the interaction that takes place between MAC entities in the network.

The IEEE 802.3 standard anticipates that stations will be located only a short distance from the physical transmission medium. Thus, the standard specifies a medium attachment unit (MAU) that connects directly to the physical medium and an attachment unit interface (AUI) which serves as the transmission medium between a station and an associated MAU.

As stated above, in a bus/tree network, a transmission from any station in the network propagates through the medium on all segments and can be received by all other stations. Thus, the 802.3 CSMA/CD protocol defines a "random access" or "contention" technique for addressing the problem of how multiple stations will share a common transmission medium when all stations transmit randomly and contend with one another for transmission time on the network.

According to the well-known carrier sense multiple access (CSMA) technique, a station wishing to transmit first listens to the medium to determine if another transmission is occurring. If the medium is in use, then the station idles for some pseudorandom time and then re-attempts the transmission. If the medium is idle, then the station transmits. If two or more stations transmit at the same time, then a collision occurs. To account for collisions, the transmitting station waits a period of time after transmitting for an acknowledgment that its transmission has been received by the destination station. If no acknowledgement is received, then the station assumes that a collision has occurred and retransmits.

Although the CSMA technique is an efficient method for managing transmission in a bus/tree network, it does have deficiencies. For example, when two packets collide, the medium remains unstable for the duration of transmission of both packets. For long packets, the amount of bandwidth wasted before re-transmission is permitted can be considerable.

This bandwidth waste can be reduced if a station continues to listen to the medium while it is transmitting. The rules for this procedure, known as carrier sense multiple access with collision detection (CSMA/CD) are as follows. If a station wishing to transmit senses that the medium is idle, then it transmits. If the station senses that the medium is busy, it continues to listen to the medium until it senses that the medium is idle and then immediately transmits. If the station detects a collision during transmission, then it transmits a brief jamming signal to assure that all stations on the network know that there has been a collision; then it ceases transmission. After transmitting the jamming signal, the station waits a pseudo-random period of time and then re-attempts the transmission.

The length of a bus/tree network can be extended by connecting together a number of medium "segments" using "repeaters". A "repeater" comprises two or more MAUs and associated logic joined together and connected to two or more different segments of the network medium by corresponding AUIs. The repeater passes retimed digital signals in both directions between the two segments, amplifying and regenerating the signals as they pass through.

A conventional repeater is transparent to the rest of the network system. It does no buffering and does not isolate one segment from the rest of the network. Thus, if two stations on different segments attempt transmission at the same time, their transmissions will collide.

The IEEE 802.3 standard provides for a variety of medium and data-rate options within the protocol. To distinguish implementations using different alternatives, the following notation has been adopted:

(data rate,Mbps)(medium type)(max. segment lgth*100 m)

Thus, an IEEE 802.3 network with a data rate of 10-Mbps, a baseband medium and a maximum segment length of 500 meters is referred to as a 10BASE5 network.

The IEEE 802.3 10BASE5 standard specifies use of a 50-ohm coaxial cable as the transmission medium and a data rate of 10 Mbps using digital signalling with Manchester encoding. These parameters define the maximum cable length at 500 m./segment.

The IEEE 802.3 10BASE2 standard provides a lower-cost network configuration well suited for personal computer networks and commonly-referred to as "Cheapernet". As with a 10BASE5 network, a 10BASE2 network uses 50-ohm coaxial cable and Manchester encoding at a data rate of 10 Mbps.

The difference between a 10BASE5 and a 10BASE2 Cheapernet network is the use in a Cheapernet network of a thinner, more flexible cable which enables expended, simpler installation options. However, the thinner cable suffers greater signal attenuation and lower noise resistance and, thus, supports fewer stations over shorter segment lengths.

One of the best known local area networks is Ethernet, which was developed by Xerox Corporation in the mid-1970s. The Ethernet architecture was used as the basis for an IEEE 802.3 network which includes several features worthy of notation. The IEEE 802.3 network includes a "heartbeat" function. This is a signal sent from the MAU to the station that confirms that the MAU collision signal circuitry is working and connected to the station. Without this signal, which is referred to as the signal-quality-error signal, the station is unsure whether the frame was actually sent without a collision or whether a defective MAU failed to properly report a collision. IEEE 802.3 also includes a jabber function. This is a self-interrupt capability that allows a MAU to inhibit transmitted data from reaching the medium if the transmission occurs for longer than a predetermined time period.

One version of an IEEE 802.3 network, 10BASE-T Ethernet, uses installed twisted pair "telephone wiring" to provide point-to-point links, compared to the bus based architecture of other Ethernet baseband networks. While providing a relatively cheap medium, a 10BASE-T network requires separate transmit and receive pairs. This gives rise to installations problems which, as discussed below, may be partially solved by the specification's link detection function.

FIG. 1 shows an example of an Ethernet 802.3 network topology that implements a number of the LAN concepts discussed above. FIG. 1 shows a repeater A that connects two "Thick Ethernet" 10BASE5 segments. Repeater B connects the left-hand 10BASE5 segment with three 10BASE2 Cheapernet segments. Repeater C connects the right-hand 1 10BASE5 segment to two 10BASE2 Cheapernet segments. Repeater D connects the 10BASE5 segment to two 10BASE-T Ethernet stations in a point-to-point configuration.

As stated above, use of "dual" twisted pair telephone wire in a 10BASE-T Ethernet system increases the likelihood of stations being improperly connected to the network.

FIG. 2 shows a proper twisted pair link. That is, a "cross-over" is utilized to connect the transmit port of the left-hand MAU to the receive port of the right-hand MAU. Similarly, the cross-over connects the transmit port of the right-hand MAU to the receive port of the left-hand MAU.

As shown in FIG. 3, the 10BASE-T Ethernet standard defines a mechanism for confirming a proper twisted pair link. During the IDLE state, each MAU in the network transmits a series of "link pulses" and monitors its receive pair of cables for reception of link pulses which are fed back to the transmitting station by its repeater. If the transmitting station detects seven consecutive link pulses at its receive port, then a proper twisted pair link is confirmed and the station transmits the data packet.

Chapter 9 of the IEEE 802.3 specification defines the standard for a repeater utilizable in 10 Mbps baseband networks. As stated in the specification, network segments may be connected directly by repeater combinations as long as only one signal path is operative between any two points on the network and the number of repeaters in that signal path is not greater than four. The 802.3 repeater must be designed to receive and decode data from any network segment under defined jitter conditions and to retransmit data to all other network segments attached to it with timing and amplitude restored. Retransmission of data occurs simultaneously with reception. If a collision occurs, the repeater propagates the collision event throughout the network by transmitting a jam signal. The repeater also detects and isolates faulty network segments.

FIG. 4 shows an example of an 802.3 multi-port repeater system 1. A Manchester encoded data packet received by one of multiple transceivers (XCVR) 2 of the system 1 is processed by the associated port logic 3 and then provided via a multiplexor 4 to a decoder 5. The decoder 5 recovers NRZ data and a clock signal from the Manchester encoded input. Data is placed on a CONTROL BUS for processing by a central state machine 6, which implements the repeater's protocol facilities, aided by a set of central counters 7. Information generated by the port state machine 6 may be provided to a set of display devices and drivers 8. Recovered data from the decoder 5 is entered via an RX DATA PATH BUS to an elasticity buffer FIFO 9 from which it is read, Manchester encoded and retransmitted to all network segments via transceivers 2.

The IEEE 802.3 committee's Hub Management Task Force currently has under consideration a Draft Supplement to the IEEE 802.3 standard relating to hub management. The goal of the hub management standard is to provide Management Information Service (MIS) capability over the network. Since repeaters enjoy a "privileged" view of transmissions on an 802.3 network, they are a logical place to implement the MIS function.

The draft standard describes management of repeater hubs in terms of a general model of management of resources within the OSI environment.

SUMMARY OF THE INVENTION

The present invention is directed to a partitioning port state machine of a repeater interface controller (RIC) that connects segments of a bus/tree local area network. In the described embodiment of the invention, the RIC implements the IEEE 802.3 repeater specification.

In accordance with the present invention, each of the RICs ports includes a dedicated port state machine for performing the functions of the IEEE segment partition algorithm. A number of partition algorithm options are available.

A better understanding of the features and advantages of the present invention may be obtained by reference to the detailed description of the invention and the accompanying drawings which set forth an illustrative embodiment in which the principles of the invention are utilized.

DESCRIPTION OF THE DRAWINGS

FIG. I illustrates an Ethernet local area network that implements different medium/data-rate options within the IEEE 802.3 standard.

FIGS. 6A and 6B illustrate the organization of the input/output pins of the RIC shown in FIG. 5.

FIGS. 7A-1, 7A-2, 7B-1, 7B-2, 7C, 7D-1, and 7D-2 provide a description of the input/output pins identified in FIGS. 6A and 6B.

FIG. 10C is a table identifying and describing inputs to the main state machine shown in FIG. 10B.

FIG. 19 is a table showing each RIC port's status information when maximum mode is selected.

FIG. 19 shows the LED output functions for the LED drivers when 74LS259s are used. The top table refers to the bank of 4 74LS259s latched with /STR0, and the lower table refers to the bank of 4 74LS259s latched with /STR1. For example, the RIC's DO data signal goes to 259 #1 and #5. These two 74LS259s then drive the LINK LEDs. ACOL equals any port collision, AREC equals any prt reception. JAB equals any port jabbening, LINK equals port link, COL equals port collision, REC equals port reception, PART equals port partitioned, BDPOL equals bad (inverse) polarity of received data.

FIGS. 20A-20E are a schematic diagram illustrating a maximum mode LED display.

FIG. 22 is a table illustrating the organization of the RIC status field.

FIG. 24 shows the organization of Packet Status Register 0.

FIG. 25 shows the organization of Packet Status Register 1.

FIG. 26 shows the organization of Packet Status Register 2.

FIG. 28 is a schematic diagram illustrating the connection between a PIC port and a coaxial transceiver using an AUI interface.

FIG. 31 illustrates the organization of the RIC Status and Configuration Register.

FIGS. 32A-32B illustrate the organization of the RIC Port Real Time Status Register.

FIG. 33A-33B illustrate the organization of the RIC Configuration Register.

FIG. 34 illustrates the organization of the RIC Real Time Interrupt (RTI) Register.

FIG. 35 illustrates the mapping of the RIC interrupt sources to the D3-D0 pins of the RTI register.

FIG. 36 illustrates the organization of the RIC Page Select Register.

FIG. 37 illustrates the organization of the lower Event Count Mask Register.

FIG. 38 illustrates the organization of the RIC upper Event Count Mask Register.

FIG. 39 illustrates the organization of the RIC Event Record Mask Register.

FIGS. 40A-40B illustrate the organization of the RIC Interrupt and Management Configuration Register.

FIG. 41 illustrates the organization of the RIC Address Register.

FIG. 42 illustrates the organization of the RIC Packet Compress Decode Register.

FIG. 43 illustrates the organization of the RIC Inter Frame Gap Threshold Register.

FIG. 44 illustrates the organization of a RIC Port Event Record Register.

FIG. 45 illustrates the organization of a RIC Port Event Count Register.

DETAILED DESCRIPTION OF THE INVENTION GENERAL DESCRIPTION

Figure 1:
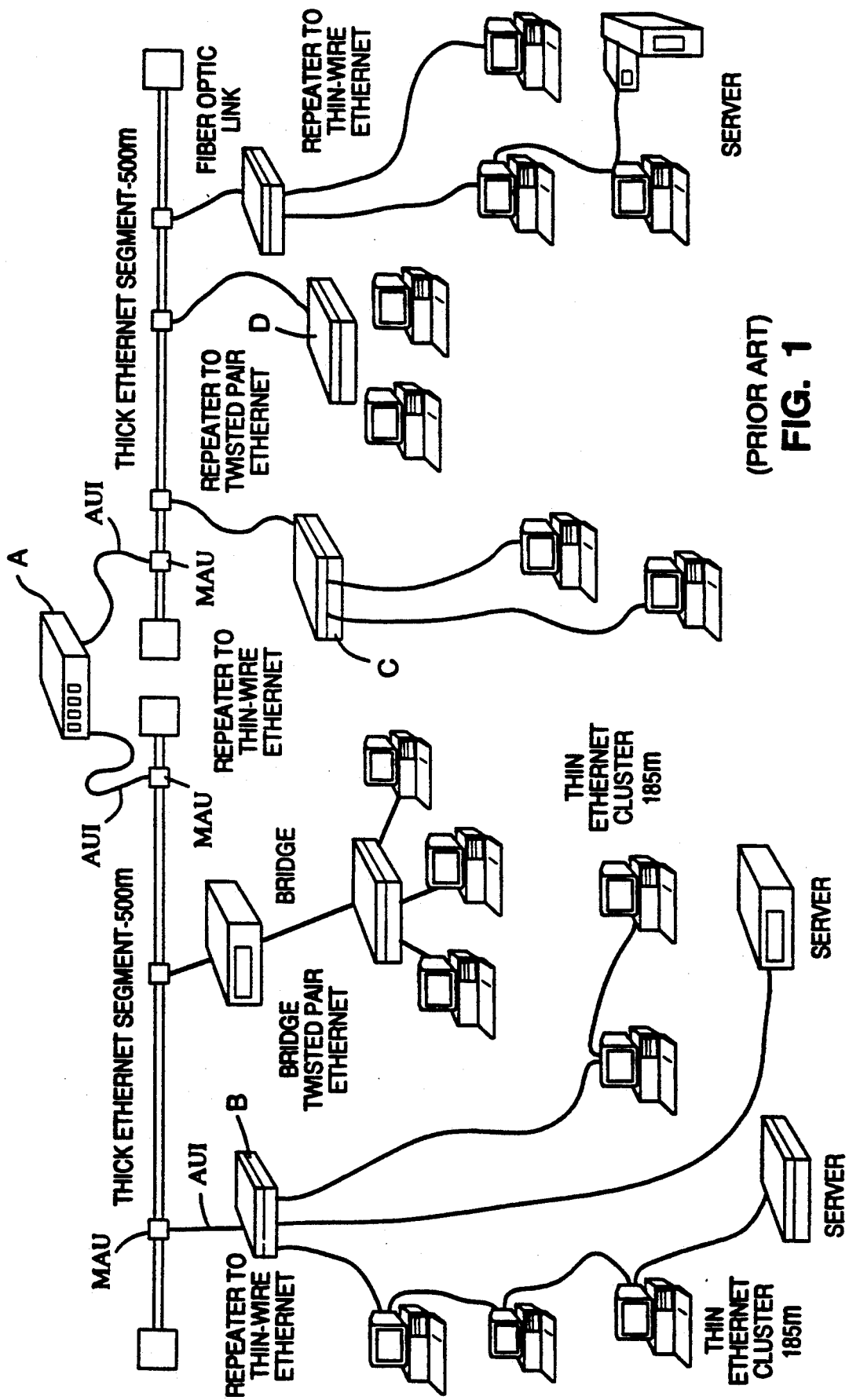
Figure 2:
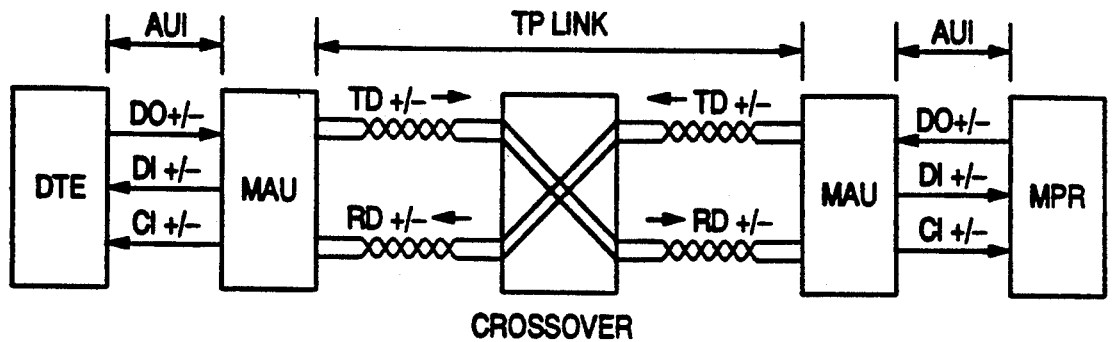
FIG. 2 illustrates a twisted pair link in a 10BASE-T Ethernet network.
Figure 3:
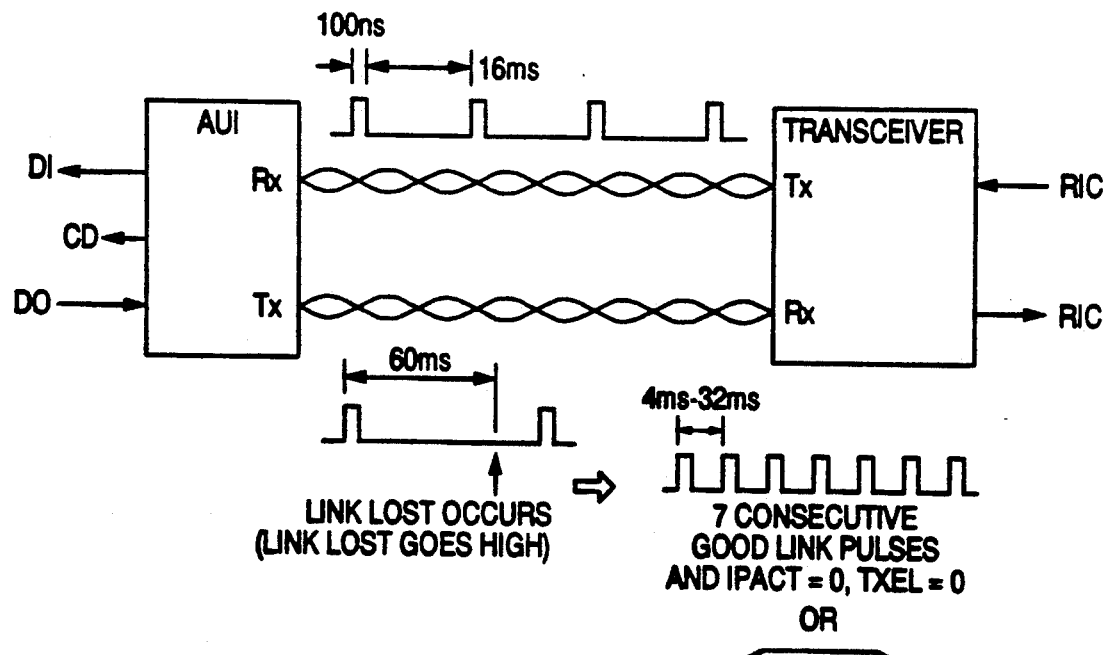
FIG. 3 illustrates link confirmation in a 10BASE-T Ethernet network.
Figure 4:
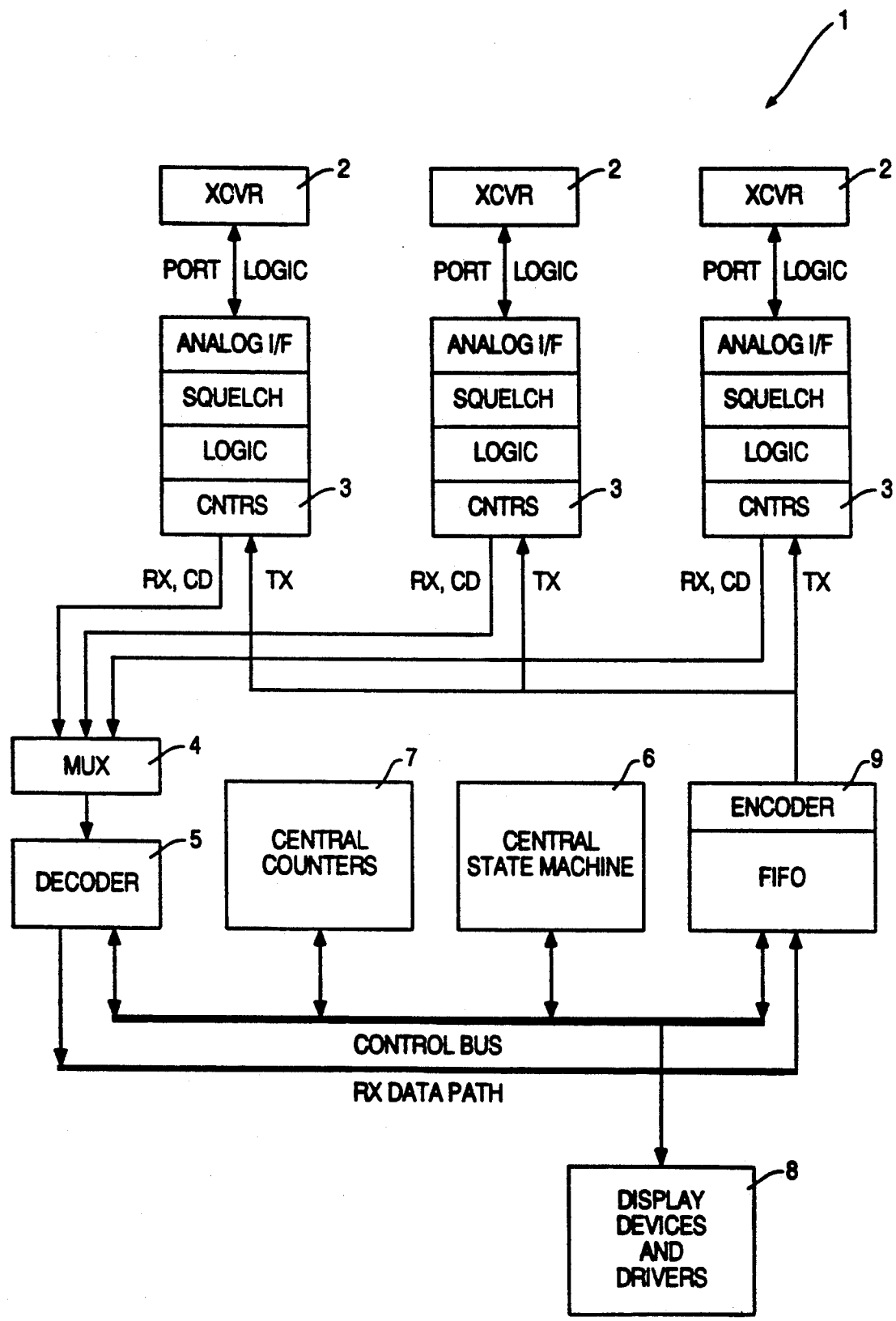
FIG. 4 is a block diagram illustrating an example of an 802.3 repeater.
Figure 5:
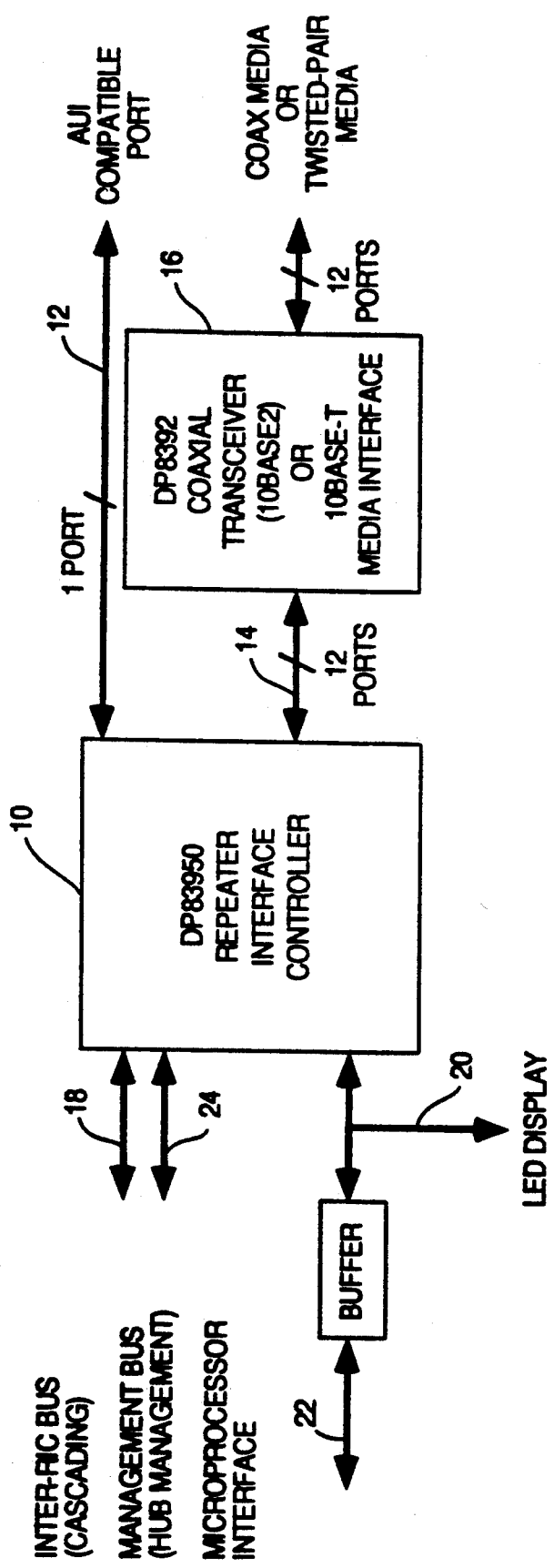
FIG. 5 is a block diagram illustrating a repeater interface controller (RIC) in accordance with the present invention.

FIG. 5 shows repeater controller interface ("RIC") 10 that satisfies the IEEE 802.3 repeater specification. The RIC 10 includes repeater segment partition and jabber lockup protection functions. The RIC 10 includes an on-chip phase-locked-loop (PLL) for Manchester data decoding, a Manchester encoder and an elasticity buffer for frame preamble regeneration.

As shown in FIG. 5, each RIC 10 can connect to thirteen physical transmission medium segments via its network interface ports. One port 12 is fully attachment unit interface (AUI) compatible and able to connect to an external medium attachment unit (MAU) using the maximum length of AUI cable. The other 12 ports, collectively identified as "14" in FIG. 5, have integrated 10BASE-T transceivers 16. These transceiver functions may be bypassed so that the RIC 10 may be used with external transceivers 16, illustrated in FIG. 5 as National Semiconductor DP8392 coaxial transceivers.

Large repeater units, containing several hundred ports, may be constructed by cascading RICs 10 together with an Inter-RIC bus 18.

The RIC 10 is configurable for specific applications. It provides port status information 20 via LED array displays and a simple interface for system processors. The RIC 10 possess multi-function counter and status flag arrays to facilitate networks statistics gathering. A serial management interface 24 is available for the collection of data in managed hub applications.

Each of the above-described features of the RIC 10 will be described in greater detail below.

FIGS. 6A and 6B illustrate the organization of the input and output pins of the RIC. A description of individual I/O pins is provided in FIGS. 7A-1, 7A-2, 7B-1, 7C, 7D-1, and 7D2.

The IEEE 802.3 repeater specification details a number of functions that a repeater system in compliance with the specification must perform. These requirements, together with a need for the repeater implementation to be multi-port, strongly favors the choice of a modular repeater design style. In a modular design, functionality is split between those tasks common to all data channels and those tasks exclusive to each individual channel.

The RIC 10 follows this modular design approach. That is, certain functional blocks are replicated for each network attachment (also known as a repeater port) and others are shared.

OVERVIEW OF RIC FUNCTIONS

1. Segment Specific Block: Network Port

Figure 8:
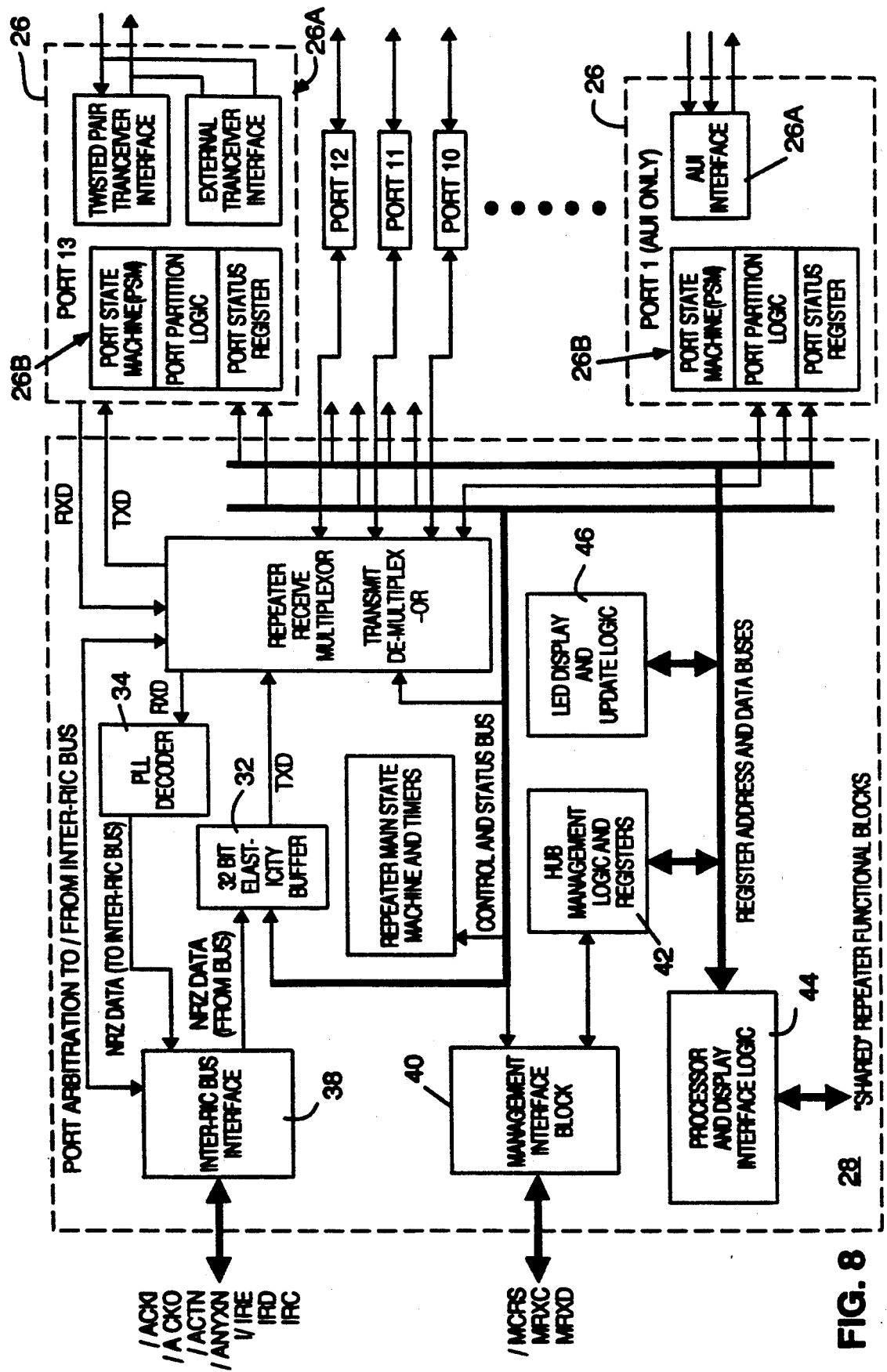
FIG. 8 is a block diagram illustrating the architecture of an embodiment of an RIC in accordance with the present invention.

FIG. 8 provides a block diagram of the RIC 10. As shown in FIG. 8, the segment-specific blocks 26, i.e., Ports 1-13, consist of one or more physical layer interfaces 26a and a logic block 26b required for performing repeater operations upon that particular segment. The logic block 26b is known as the "port" logic since it is the access "port" the repeater uses to access a segment on the rest of the network.

To perform the tasks defined by the IEEE 802.3 repeater specification and to enable a large repeater system to be built using multiple RIC integrated circuits, a distributed architecture of functional entities is utilized in the RIC 10.

Figure 12A:
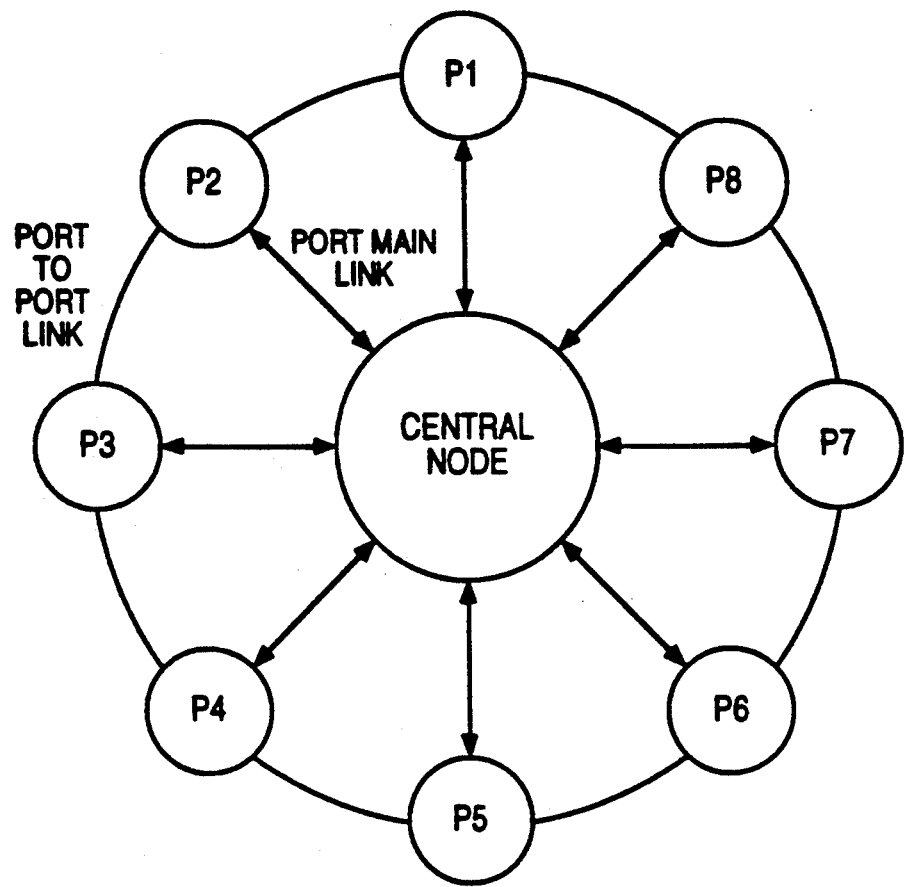
FIG. 12A is a conceptual diagram illustrating a distributed architecture of a repeater interface controller in accordance with the present invention.

As shown in FIG. 12A, the RIC architecture is a spoke wheel containing nodes of two types. A central node performs the majority of the operations defined in the repeater specification: preamble regeneration, data decoding, fragment extension, jam packet generation, jabber protection and collision handling. A port node resides at the end of each spoke and is the connection between a network segment and the repeater system. In the disclosed embodiment of the RIC 10, thirteen (13) port nodes are utilized. However, this number is purely an implementation restriction rather than an architectural restriction.

Being the connection to the network segment, the port node controls the transmit operations upon that segment and arbitrates with other port nodes whenever there is contention during packet reception or collision.

Other port node functions include physical media interfacing (to either 10BASE-T or AUI) and segment partitioning operations.

In order for the repeater system to function, two types of communications channels are required. Referring again to FIG. 12A, the first is a unidirectional channel between ports, where this connection may be visualized as the rim of the wheel. This link is used to resolve contention between ports when multiple data packets or collision signals are received. The second channel is a bidirectional handshake between the central and port nodes. By this means, information concerning a packet is conveyed from the receiving port into the main unit for processing and then out to the other ports for transmission.

The combination of the functional units and their communications links gives rise to the spoked wheel shape of the FIG. 12A communications links. The manifestation of these communication links outside the device is known as the Inter-RIC bus. This allows large repeater systems using many RIC 10 devices may be built.

The type of physical layer interface provided depends upon the port under examination. As stated above, and in accordance with an aspect of the present invention Port 1 has an AUI-compliant interface for use with AUI compatible transceivers and cable. Ports 2-13 may be configured for use with one of two interfaces: twisted pair or an external transceiver. A twisted-pair interface utilizes the RICs on-chip 10BASE-T transceivers; the later allows connection to external transceivers. When using the external transceiver mode, the interface is AUI-compatible. Although AUI-compatible transceivers are supported, the interface is not designed for use with an interface cable. Thus, the transceivers are necessarily internal to the repeater equipment enclosure.

The port logic 26b includes three distinct functions. A port state machine (PSM) is required to perform data and collision repetition, as described by the IEEE 802.3 repeater specification. For example, the PSM determines whether this particular port should be receiving from or transmitting to its network segment. In accordance with an aspect of the present invention, the port partition logic implements an improved version of the IEEE 802.3 repeater port partition state machine to control port partitioning. The port status register reflects the current status of the port. It may be accessed by a system processor to obtain this status or to perform certain port configuration operations, such as port disable.

2. Shared Functional Blocks: Repeater Core Logic

The shared functional blocks 28 include a repeater main state machine (MSM) and timers 30, a 32-bit elasticity buffer 32, a PLL decoder 34 and receive and transmit multiplexors 36. These blocks perform the majority of the operations needed to fulfill the requirements of the IEEE 802.3 repeater specification.

When a packet is received by a port from the transmission medium, it is sent via the receive multiplexor 36 to the PLL decoder 34. Notification of the data and collision status is sent to the main state machine MSM 30 via receive multiplexor 36 and collision activity status signals are forwarded on a control and status bus. This enables the main state machine 30 to determine the source of the data to be repeated and the type of data to be transmitted. The transmit data may be either the received packet's data field or a preamble/jam pattern consisting of a 1010 . . . bit pattern.

Associated with the main state machine MSM 30 are a series of timers. These timers ensure that various IEEE 802.3 specification times (referred to in the specification as the TW1-TW6 times) are fulfilled.

A repeater unit in compliance with the 802.3 specification is required to meet the same signal jitter performance as any receiving node attached to a network segment. Consequently, a phased-locked-loop Manchester decoder 34 is required so that the received packet may be decoded and the jitter accumulated over the receiving segment eliminated. The decoder 34 outputs data in NRZ format with an associated clock and enable signal. The packet is thus in a convenient format for transfer to other devices, such as network controllers and other RICs, via the Inter-RIC bus interface 38. The data may then be re-encoded into Manchester data and transmitted.

Reception and transmission via physical layer transceiver units causes a loss of bits in the preamble field of a data packet. The 802.3 repeater specification requires compensation for this loss. To accomplish this, elasticity buffer 32 is used to temporarily store bits in the data field of the received packet while the preamble is being regenerated.

3. Inter-RIC Bus Interface

The sequence of operation for data transmission by the RIC 10 is as follows. Soon after the network segment receiving the data packet has been identified, the RIC 10 begins to transmit the packet preamble pattern (1010 . . . ) onto the other network segments. While the preamble is being transmitted, the elasticity buffer 32 monitors the decoded received clock and data signals via the Inter-RIC bus, as described in greater detail below. When a start-up frame delimiter "SFD" is detected, the received data stream is written into the elasticity buffer 32. Removal of data from the elasticity buffer 32 for retransmission is not permitted until a valid length preamble pattern has been transmitted.

Using the RIC 10 in a repeater system allows the topology to be constructed with many more network attachments than can be supported by a single chip. The split of repeater functions described above allows data packets and collision status to be transferred between the multiple RICs. At the same time, the multiple RICs still behave as a single logical repeater. Since all RICs in the repeater system are identical and capable of performing any of the repetition operations, the failure of one RIC will not cause the failure of the entire system. This is an important issue in large multi-port repeaters.

As stated above, cascaded RICs communicate via a specialized interface known as the Inter-RIC bus 18 (FIG. 5). This bus 18 allows the data packet to be transferred from the receiving RIC to other RICs in the system without the need for additional external logic circuits. The Inter-RIC bus 18 includes a set of status lines capable of conveying collision information between RICs to ensure that their main state machines (MSM) 30 operate in the appropriate manner.

4. LED Interface and Hub Management Function

Repeater systems usually possess optical displays indicating network activity and the status of specific repeater operations. Referring to FIG. 8, the LED display and update logic block of the RIC 10 provides a variety of indicators. The display updates are completely autonomous and merely require SSI logic devices to drive the display devices, usually made up of light emitting diodes (LEDs). The status display is very flexible, allowing a choice of those indicators appropriate for the specification of the equipment.

The RIC 10 provides special features for large repeaters possessing hub management capabilities. As stated above, hub management uses the unique position of repeaters in a network to gather statistics about the network segments to which they are attached. The RIC 10 provides hub management statistical data as follows. Important events are gathered by the management interface block 40 from the various other logic blocks throughout the RIC 10. These events may be stored in on-chip latches or counted in on-chip counters according to user supplied of latching and counting masks.

The fundamental task of any hub management system is to associate the current frame and any management status information with the network segment (i.e., repeater port) from which the frame was received. An ideal system would place this combined data frame and status field in system memory for examination by hub management software. The ultimate function of the hub management support logic 42 of the RIC 10 is to provide this function.

Figure 9:
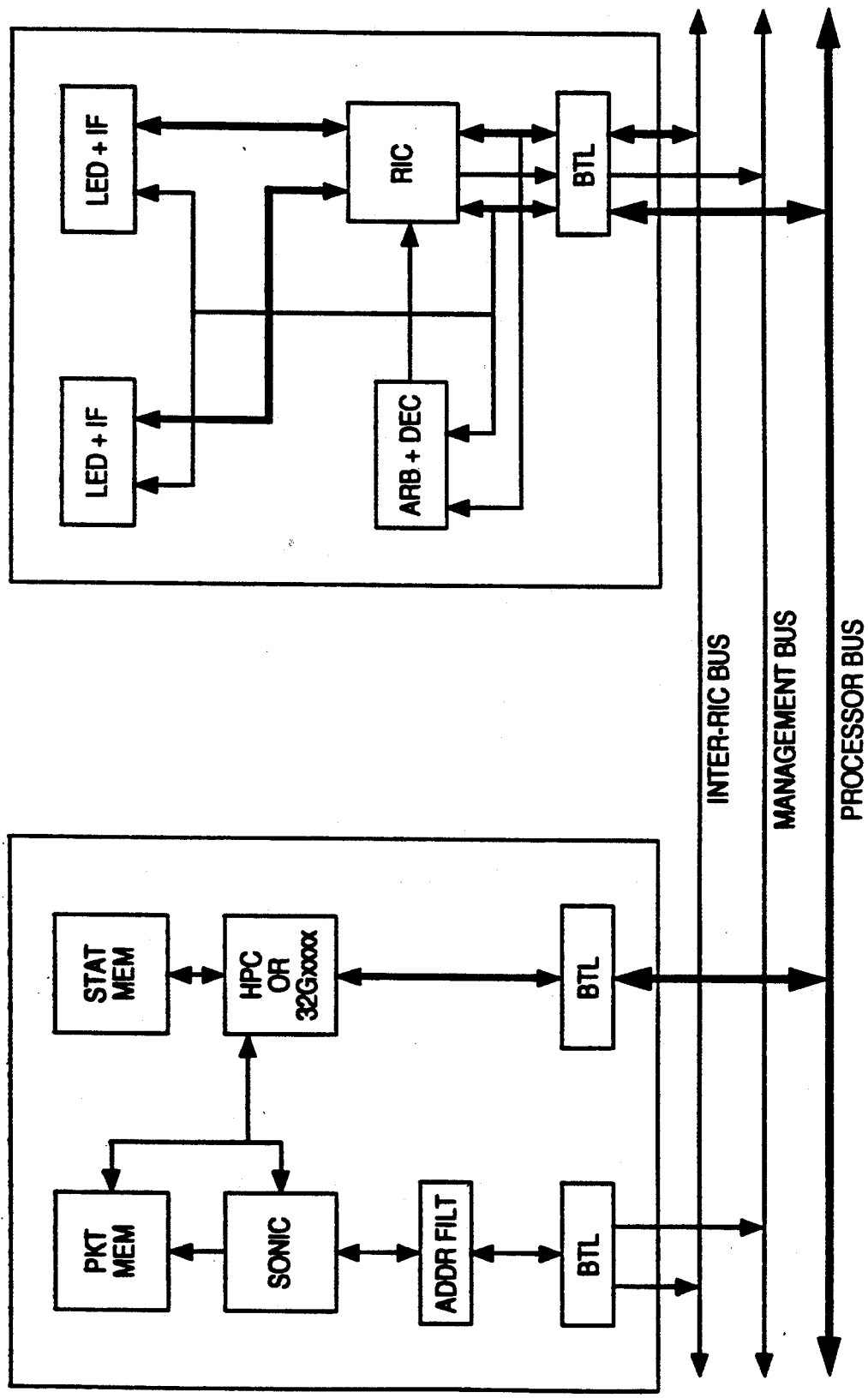
FIG. 9 is a block diagram illustrating a repeater hub management interface in accordance with the present invention.

To accomplish this, the RIC 10 utilizes a dedicated hub management interface 90. This is similar to the Inter-RIC bus 18 since it allows the data packet to be recovered from the receiving RIC. As shown in FIG. 9, unlike the Inter-RIC bus 18, however, the intended recipient is not another RIC, but a controller device (e.g., a National Semiconductor Corporation DP83932 "SONIC" network controller). The use of a dedicated management bus 24 (FIG. 5) allows a management status field to be appended at the end of the frame. This can be done without affecting the operation of the RIC 10.

5. Processor Interface

The processor interface 22 (FIG. 5) of the RIC 10 allows connection to a system processor. Data transfer occurs via an octal bi-directional data bus. The RIC 10 has a number of on-chip registers indicating the status of the hub management functions, chip configuration and port status. These may be accessed by providing the selected address at the RIC's register address input pins (RA4-RA0).

Display update cycles and processor accesses occur utilizing the same data bus. An arbiter in the processor/display block 44 schedules and arbitrates the processor accesses and display updates to ensure that the correct information is written into the display latches. During the display update cycles, the RIC 10 behaves as a master of the data bus. This is the default state of the data bus. Consequently, as shown in FIG. 5, a TRI-STATE ™ buffer must be placed between the RIC 10 and the system processor's data bus. This buffer ensures that bus contention is avoided during simultaneous display update cycles and processor accesses of other devices on the system bus. When the processor accesses a RIC register, the RIC 10 enables the buffer and selects the operation, either input or output, of the data pins.

DESCRIPTION OF REPEATER OPERATIONS

In order to implement a multi-chip repeater system which behaves as though it were a single logical repeater, special consideration must be paid to the data path used in frame repetition, such as where in the path specific operations, such as Manchester decoding and elasticity buffering, are to be performed. Also, the system's state machines, which utilize available network activity signals, must be able to accommodate the various packet repetition and collision scenarios detailed in the 802.3 repeater specification.

As described generally above, and as shown in FIG. 8, the RIC 10 contains two types of inter-acting state machines: a port state machine (PSM) (each network attachment has its own PSM) and a main state machine MSM 30 that controls the RIC's shared functional blocks.

Figure 10:
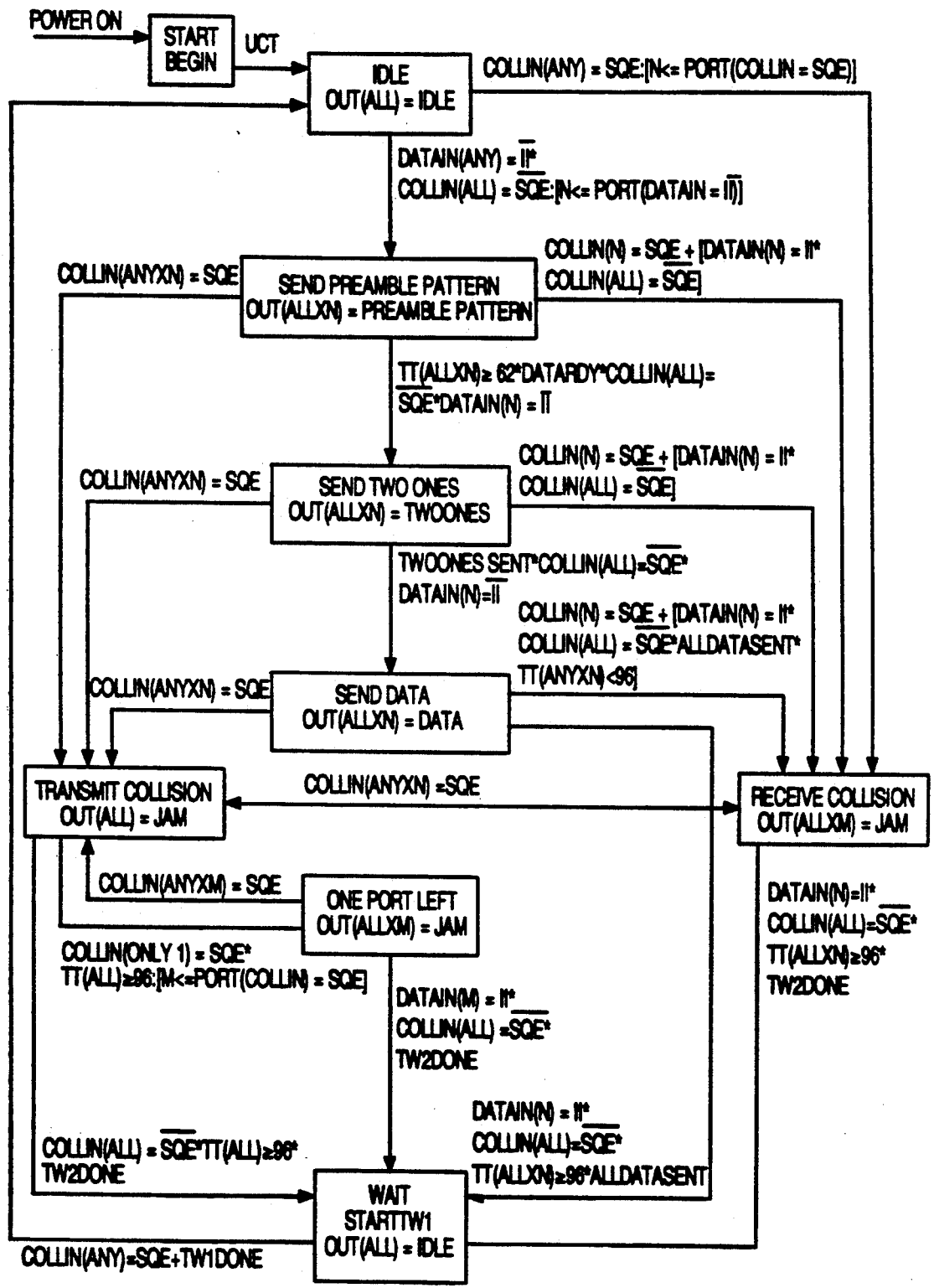
FIG. 10 is a state diagram illustrating an IEEE 802.3 standard state machine.
Figure 11:
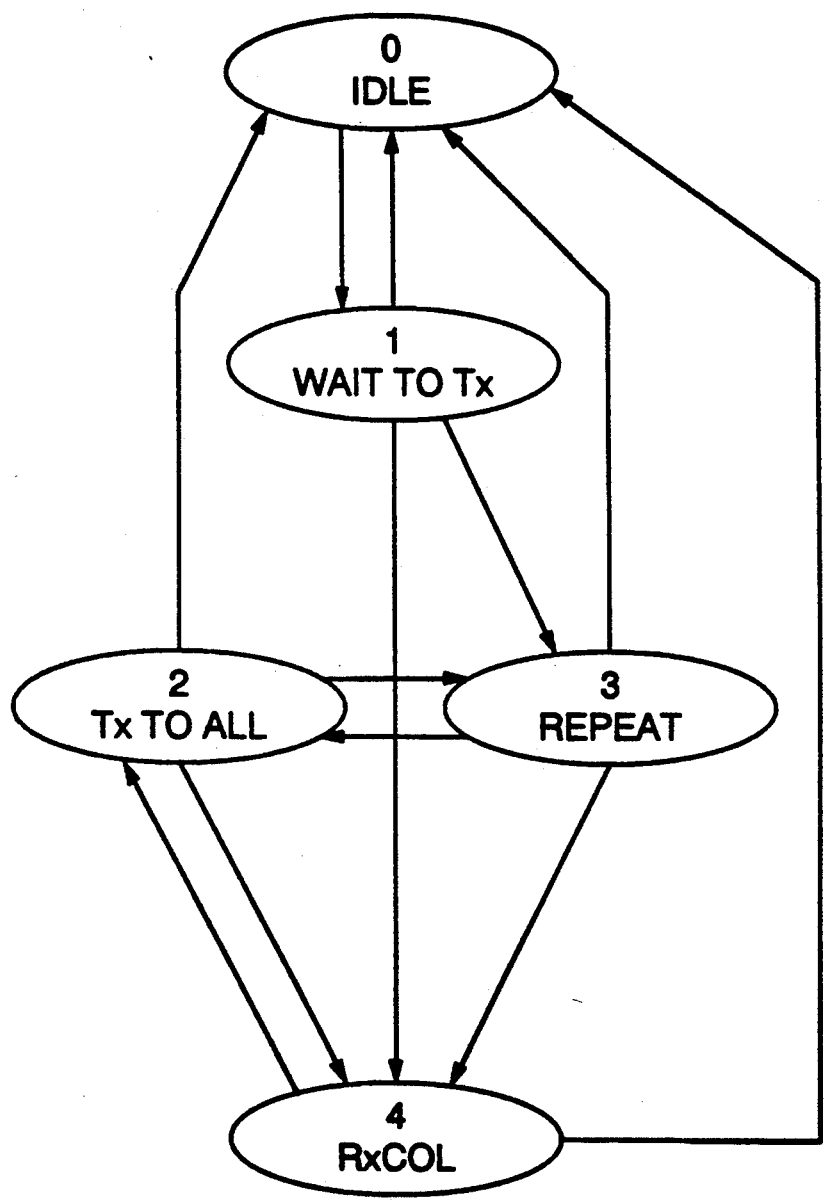
FIG. 11 is a state diagram illustrating the main state machine of a RIC in accordance with the present invention.

The port state machine and the main state machine will now be described in greater detail. Reference will be made to expressions used in the IEEE 802.3 repeater specification. For the precise definition of these terms, reference is made to the IEEE 802.3 specification. To avoid confusion with RIC implementation, where references are made to repeater states or terms as described in the specification, these items are written in italics. The IEEE 802.3 standard state diagram is shown in FIG. 10. The RIC's main state diagram is shown in FIG. 11.

1. Port State Machine

The port state machine PSM has two primary functions. First, it controls the transmission of repeated data and jams signals over the attached segment. Second, it decides whether a port will be designated as the source of data or collision information which will be repeated over the network.

This designated repeater port is known as "PORT N". As shown in FIG. 10, an arbitration process is required to enable the RIC 10 to transition from the IDLE state to the SEND PREAMBLE PATTERN or RECEIVE COLLISION states. This process is used to locate the port which will be PORT N for that particular packet. The data received from this port is directed to the PLL decoder 34 and transmitted over the Inter-RIC bus 18.

If the RIC 10 enters the TRANSMIT COLLISION state (FIG. 10), then a further arbitration operation is performed to determine which port is designated as PORT M. PORT M is differentiated from the RIC's other ports if the RIC enters the ONE PORT LEFT state. In this state, PORT M does not transmit to its segment, whereas all other ports are still required to transmit to their segments.

Figure 10A:
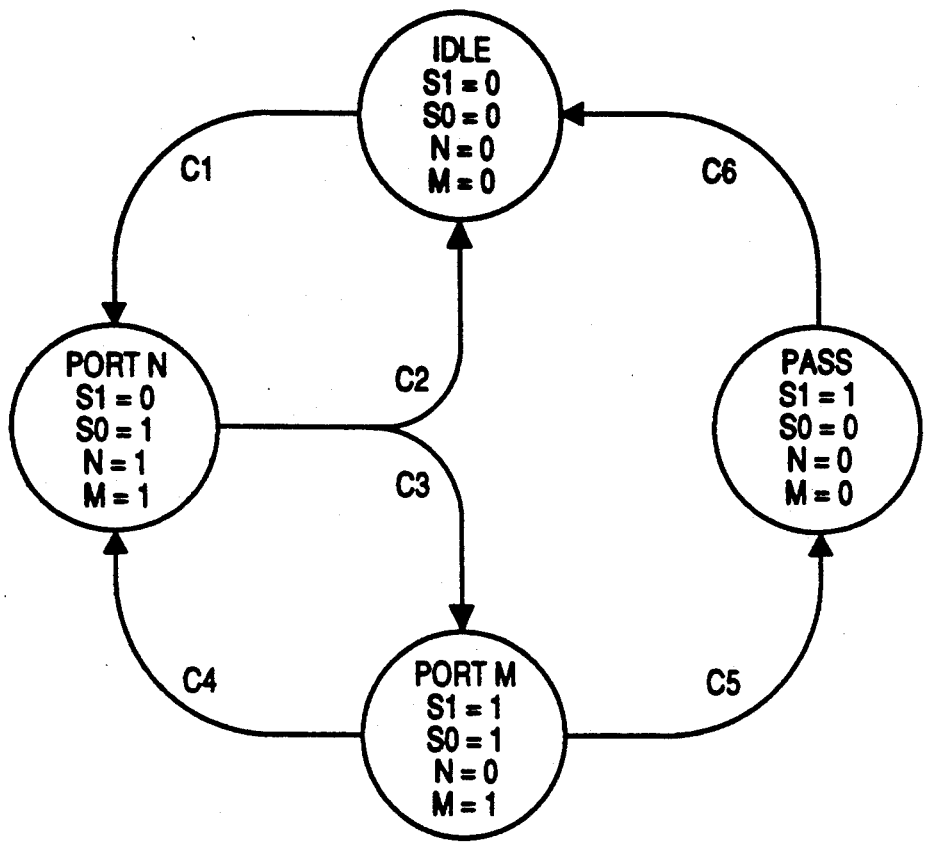
FIG. 10A is a state diagram illustrating a port state machine with power up in the IDLE mode.

FIG. 10A shows the port state machine (PSM). This state machine is an asynchronous machine which powers up in the IDLE state. The minterms of the FIG. 10A state machine are as follows

| | |
|---|---|
| Minterm 1 | ACKI and ACTNSIz and NOT TXEG and COLU<br>no higher port with activity<br>no external activity (inter-ric bus)<br>no current transmission<br>unpartitioned collision |
| Minterm 2 | ACKI and ACTNSIz and NOT TXEGTW1 and CRSU<br>no higher port with activity<br>no external activity (inter-ric bus)<br>no transmission and the TW1 time has counted down<br>unpartitioned carrier |
| Minterm 3 | ACKI and TXEG and COLU and NOT ANYXNSiz<br>no higher port with activity<br>there is a current transmission<br>this segment has a collision<br>there is a transmit collision on the inter-ric bus |
| Minterm 4 | NOT ACKI<br>a higher port on the daisy chain (including multiple rics) has activity |
| Minterm 5 | TXEG and NOT ANYXNSIz and NOT COLU<br>there is a current transmission<br>there is a transmit collision on the inter-ric bus<br>this segment does not have an unpartitioned collision |
| Minterm 6 | NOT TXEG and TXEGTW1 and NOT COLU<br>there is no current transmission<br>the TW1 (transmit recovery time) has not counted down<br>this segment does not have an unpartitioned collision |
| Minterm 7 | ACKI and TXEG and ANYXNSIz and NOT COLU and NOT CRSU<br>no higher port with activity<br>there is a current transmission<br>there is no transmit collision<br>this segment does not have an unpartitioned collision<br>this segment does not have an unpartitioned carrier |
| Minterm 8 | ACKI and TXEG and ANYXNSIz and COLU<br>no higher port with activity |

-continued

|  |  |
|---|---|
| | there is a current transmission |
| | there is no transmit collision |
| | this segment has a collision |
| Minterm 9 | ACKI and TXEG and ANYXNSIz and CRSU |
| | no higher port with activity |
| | there is a current transmission |
| | there is no transmit collision |
| | this segment has an unpartitioned carrier |
| Minterm 10 | NOT TXEG |
| | there is no current transmission |
| Minterm 11 | NOT ANYXNSIz |
| | there is a transmit collision on the inter-ric bus |
| Minterm 12 | PASS THROUGH |
| | this is just a pass through state |
| | it is only to set |
| | it so that only one of the S terms change at one time |

2. Main State Machine

As stated above, the main state machine MSM 30 (FIG. 5) controls the operation of the shared functional blocks in each RIC 10. The main state machine 30 performs the majority of the data and collision propagation operations as defined by the IEEE 802.3 repeater specification. These operations are listed in Table I below.

TABLE I

| Function | Action |
|---|---|
| Preamble Regeneration | Restore the length of the preamble pattern to the defined size |
| Fragment Extension | Extend received data or collision Fragments to the meet minimum fragment length of 96 bits. |
| Elasticity Buffer Control | A portion of the received packet may require storage in an Elasticity Buffer to accommodate preamble regeneration. |
| Jam/Preamble Pattern Generation | In cases of receive or transmit collisions a RIC is required to transmit a jam pattern (1010 . . .). Note: This pattern is the same as that used for preamble regeneration. |
| Transmit Collision Enforcement | Once the TRANSMIT COLLISION state is entered a repeater is required to stay in this state for at least 96 network bit times. |
| Data Encoding Control | NRZ format data from the elasticity buffer must be encoded into Manchester format data prior to re-transmission. |
| Tw1 Enforcement | Enforce the Transmit Recovery Time specification. |
| Tw2 Enforcement | Enforce Carrier Recovery Time specification on all ports with active collisions. |

The interaction of the main state machine MSM 30 and port state machine PSM is visible, in part, by observing the Inter-RIC bus 18.

Figure 10B:
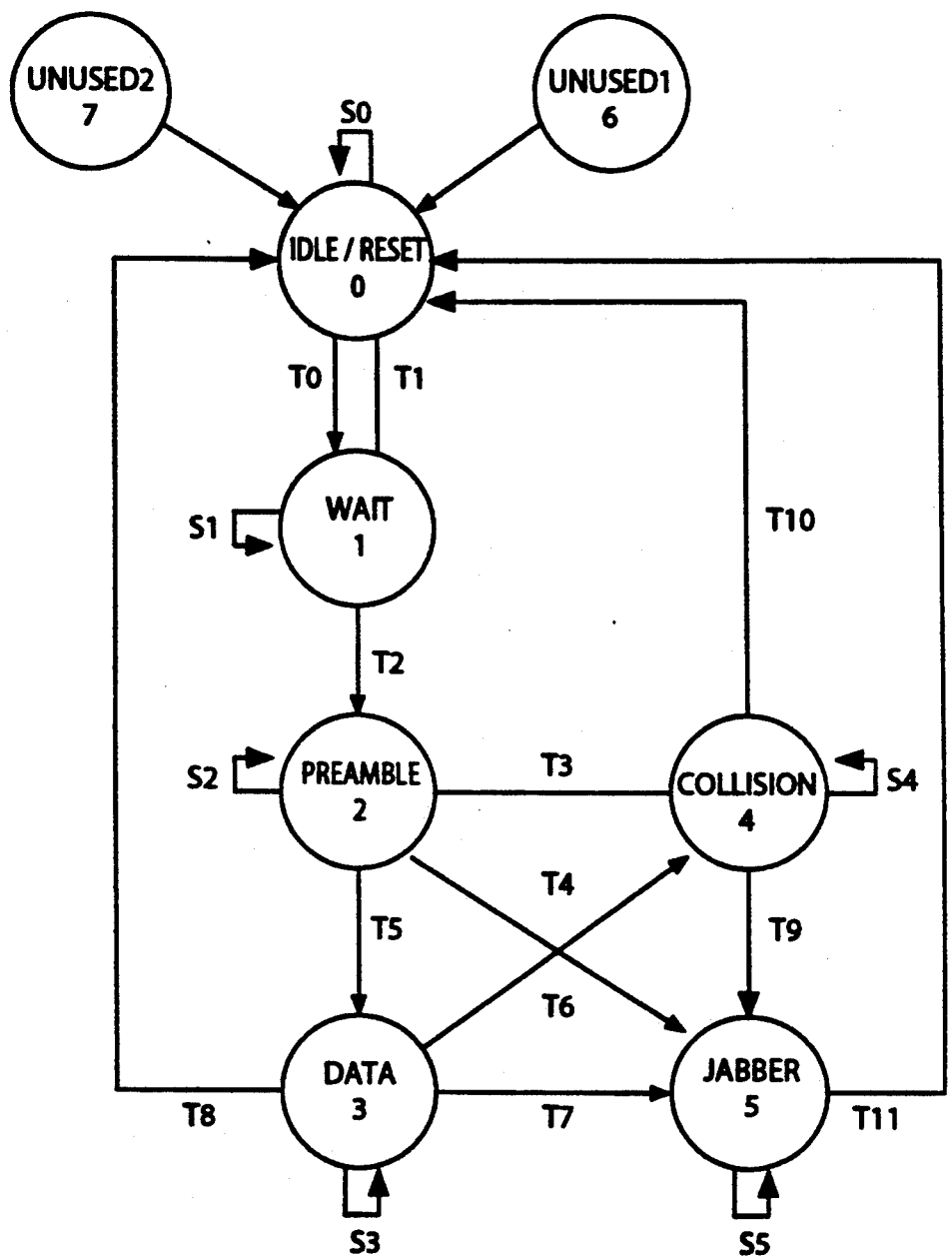
FIG. 10B is a state diagram illustrating a main state machine.

A state diagram of the main state machine (MSM) is provided in FIG. 10B, with a corresponding table of identifying input names and providing a description of these inputs is provided in FIG. 10C. The main state machine is a synchronous machine that is clocked by phil, a 10 megahertz clock.

The state transition terms (Txx) and state spin terms (Sxx) are as follows:

| T0 | twupl * actncz |
|---|---|
| S0 | $\overline{twupl}$ + $\overline{actncz}$ |
| T1 | $\overline{actncz}$ |
| T2 | bd2 * actncz |
| S1 | actncz * $\overline{bd2}$ |
| T3 | $\overline{jab}$*{fff + $\overline{actncz}$ + anyxnsicz + colncz} |
| T4 | jab |
| T5 | $\overline{jab}$ * bd62 * sfdlatchc * $\overline{colncz}$ * $\overline{anyxnsicz}$ * actncz * $\overline{fff}$ |
| S2 | $\overline{jab}$ * actncz * $\overline{fff}$ * $\overline{anyxnsicz}$ * $\overline{colncz}$ * {$\overline{bd62}$ + (bd62 * $\overline{sfdlatchc}$)} |
| T6 | $\overline{jab}$ * {anyxnsicz + colncz + ($\overline{actncz}$ + $\overline{bd99}$ * ffe) + (actncz * ffe)} |
| T7 | jab |
| T8 | $\overline{jab}$ * $\overline{colncz}$ * bd99 * ffe * $\overline{anyxnsicz}$ * actncz |
| S3 | $\overline{jab}$ * $\overline{colncz}$ * $\overline{anyxnsicz}$ * ffe |
| T9 | jab |
| T10 S4 | $\overline{jab}$ * bd99 * $\overline{actncz}$ * $\overline{anyxnsicz}$ * $\overline{jab}$ * {anyxnsicz + actncz + $\overline{bd99}$} |
| T11 | bd99 |
| S5 | $\overline{bd99}$ |

3. Inter-RIC Bus Operation

In accordance with an aspect of the present invention, the Inter-RIC bus 18 implements a protocol for connecting multiple RICs together to maintain the logical function of a single repeater. The resulting multi-RIC system meets the IEEE 802.3 repeater specification and may connect several hundred network segments. The protocol allows the multiple RIC devices to be driven by a central system clock or to operate asynchronously.

The Inter-RIC bus 18 is designed to accommodate the need of large "rack based" repeater systems. Earlier implementations of these systems have used an architecture in which a central re-timing card controls number of port attachment cards. Designs of this type suffer from two major drawbacks. First, they lack modularity; that is, all cards are not identical. Second, all cards are subject to a central point of failure, i.e., the re-timing card.

The Inter-RIC bus 18 avoids these architectural constraints. Additionally, the architecture of the bus 18 allows the system to grow in size, that is, to increase the number of segments attached, without a complete redesign in bus architecture.

The Inter-RIC bus protocol operates using a number of status and data signals to perform the functions defined by the IEEE 802.3 specification: data packet repetition, collision propagation and jabber protection.

The Inter-RIC bus 18 connects multiple RICs to realize the following operations: PORT N identification (which port the repeater receives data from), PORT M identification (which port is the last one experiencing a collision), data transfer, RECEIVE COLLISION identification, TRANSMIT COLLISION identification, and DISABLE OUTPUT (jabber protection).

Table II briefly describes the operation of each bus signal, the conditions required for a RIC 10 to Inter-RIC assert a signal and which RICs (in a multi-RIC system) would monitor a signal.

TABLE II

| /ACKI | |
|---|---|
| Function | Input signal to The PSM |

TABLE II-continued

| | |
|---|---|
| Conditions required for a RIC to drive | arbitration chain. This chain is employed to identify PORT N and PORT M.<br>Note: A RIC which contains PORT N or PORT M may be identified by its /ACKO signal being low when its /ACKI input is high.<br>This is dependent upon the method used to cascade RICs, described in a following section. |
| RIC Receiving the signal | not applicable |

/ACKO

| | |
|---|---|
| Function | Output signal from the PSM arbitration chain. |
| Conditions required for a RIC to drive | not applicable |
| RIC Receiving the signal | This is dependent upon the method used to cascade RICs, described in a following section |

/ACTN

| | |
|---|---|
| Function | This signal denotes there is activity on PORT N or PORT M. |
| Conditions required for a RIC to drive | A RIC must contain PORT N or PORT M.<br>Note: Although this signal normally has only one source asserting the signal active it is used in a wired-or configuration. |
| RIC Receiving the signal | This signal is monitored by all RICs in the repeater system. |

/ANYXN

| | |
|---|---|
| Function | This signal denotes that a repeater port that is not PORT N or PORT M is experiencing a collision. |
| Conditions required for a RIC to drive | Any RIC which satisfies the above condition.<br>Note: this bus line is used in a wired-or configuration. |
| RIC Receiving the signal | The signal is monitored by all RICs in the repeater system. |

/COLN

| | |
|---|---|
| Function | Denotes PORT N or PORT M is experiencing a collision. |
| Conditions required for a RIC to drive | A RIC must contain PORT N or PORT M. |
| RIC Receiving the signal | The Signal is monitored by all other RICs in the repeater system. |

/IRE

| | |
|---|---|
| Function | This signal acts as an activity framing signal for the IRC and IRD signals. |
| Conditions required for a RIC to drive | A RIC must contain PORT N. |
| RIC Receiving the signal | The Signal is monitored by all other RICs in the repeater system. |

IRD

| | |
|---|---|
| Function | Decoded serial data, in NRZ format, received from the network segment attached to PORT N. |
| Conditions required for a RIC to drive | A RIC must contain PORT N. |
| RIC Receiving the signal | The signal is monitored by all other RICs in the repeater system. |

IRC

| | |
|---|---|
| Function | Clock signal associated with IRD and /IRE. |
| Conditions required for a RIC to drive | A RIC must contain PORT N. |
| RIC Receiving the signal | The signal is monitored by all other RICs in the repeater system. |

4. Methods of RIC Cascading

In order to build multi-RIC repeaters, PORT N and PORT M identification must be performed across all RICs in the system.

Inside each RIC 10, the port state machines PSM are arranged in a logical arbitration chain where Port 1 is the highest and Port 13 is the lowest. The top of the chain, the input to Port 1, is accessible to the user via the RIC's /ACKI input pin. The output from the bottom of the chain becomes the /ACKO output pin. In a single RIC system, PORT N is defined as the highest port in the arbitration chain with receive or collision activity. PORT N identification is performed when the repeater is in the IDLE state. PORT M is defined as the highest port in the chain with a collision when the repeater leaves the TRANSMIT COLLISION state. In order for the arbitration chain to function, all that needs to be done is to tie the /ACKI signal to the logic high state.

In multi-RIC systems, there are two ways to propagate the arbitration chain between RICs. The first and most straight forward way is to extend the arbitration chain by daisy-chaining the /ACKI/ACKO signals between RICs. In this approach, one RIC 10 is placed at the top of the chain (its /ACKI input is tied high), then the /ACKO signal from this RIC 10 is sent to the /ACKI input of the next RIC, and so on.

This arrangement is simple to implement, but places some topological restrictions upon the repeater system, such as, if the repeater is constructed using a back plane with removable printed circuit boards (these boards contain the RICs and their associated components). If one of the boards is removed, then the /ACKI/ACKO chain will be broken and the repeater will not operate correctly.

The second method of PORT N or M identification avoids this problem. This technique relies upon the use of an external parallel arbiter. According to this scheme, each RIC 10 is assigned a priority level also known as an arbitration vector. One method of doing this is to assign a priority number which reflects the position of a RIC board on the repeater back plane (i.e., its slot number). When a RIC 10 experiences receive activity and the repeater system is in the IDLE state, the RIC board will assert the ACKO signal. External arbitration logic recognizes this activity and drives the identification number onto the arbitration bus. There then follows a period of arbitration during which the RIC 10 receiving the packet, and thus containing Port N, is identified.

An identical procedure is used in the TRANSMIT COLLISION state to identify PORT M. This parallel means of arbitration is not subject to the problem caused by missing boards (i.e., empty slots on the back plane). The logic associated with asserting this arbitration vector in the various frame repetition scenarios can be implemented in programmable logic.

To perform PORT N or M arbitration, both of the above methods employ the same signals: /ACKI, /ACKO and /ACTN.

The Inter-RIC bus 18 allows multi-RIC operations to be performed in exactly the same manner as if there is only a single RIC 10 in the system. The simplest way to describe the operation of Inter-RIC bus 18 is to describe its use in a number of common frame repetition scenarios. Throughout the following description, the RICs are presumed to be operating in external transceiver mode. This is advantageous for the explanation, since the receive, transmit and collision signals from each network segment are observable. In the internal transceiver mode, this is not the case, since the collision signal for the non-AUI ports is derived by the transceivers inside the RIC 10.

EXAMPLES OF PACKET REPETITION SCENARIOS

1. Data Repetition

The simplest frame operation performed over the Inter-RIC bus 18 is data repetition. In this operation, a data frame is received at one port and transmitted to all other segments.

The first task to be performed in a data repetition operation is PORT M identification. This is an arbitration process performed by the port state machines PSM in the system. In situations where two or more ports 18 simultaneously receive packets, the Inter-RIC bus 18 operates by choosing one of the active ports and forcing the other ports to transmit data. This is done to faithfully follow the IEEE 802.3 specification's allowed exit path from the IDLE state, i.e., to the SEND PREAMBLE PATTERN or RECEIVE COLLISION states, FIGS. 10 and 11. FIG. 11 shows the states of the Inter-RIC bus which may be observed at the RIC's I/O pins.

The packet begins with the PREAMBLE PATTERN derived from the RIC's on-chip jam/preamble generator. The data received at PORT N is directed through the receive multiplexor 36 to the PLL decoder 34. Once phase lock has been achieved, the decoded data, in NRZ format, with its associated clock and enable signal, are asserted onto the IRD, /IRE and IRC lines of the Inter-RIC bus 18. This serial data stream is xeceived from the bus by all RICs 10 in the repeater system and is directed to their respective elasticity buffer 32.

Logic circuits monitor the data stream and look for the start of frame delimiter SFD. When the SFD has been detected, data is loaded into the elasticity buffer 32 for later transmission. This will occur when sufficient frame preamble has been transmitted and certain state machine operations have been fulfilled.

Figure 12B:
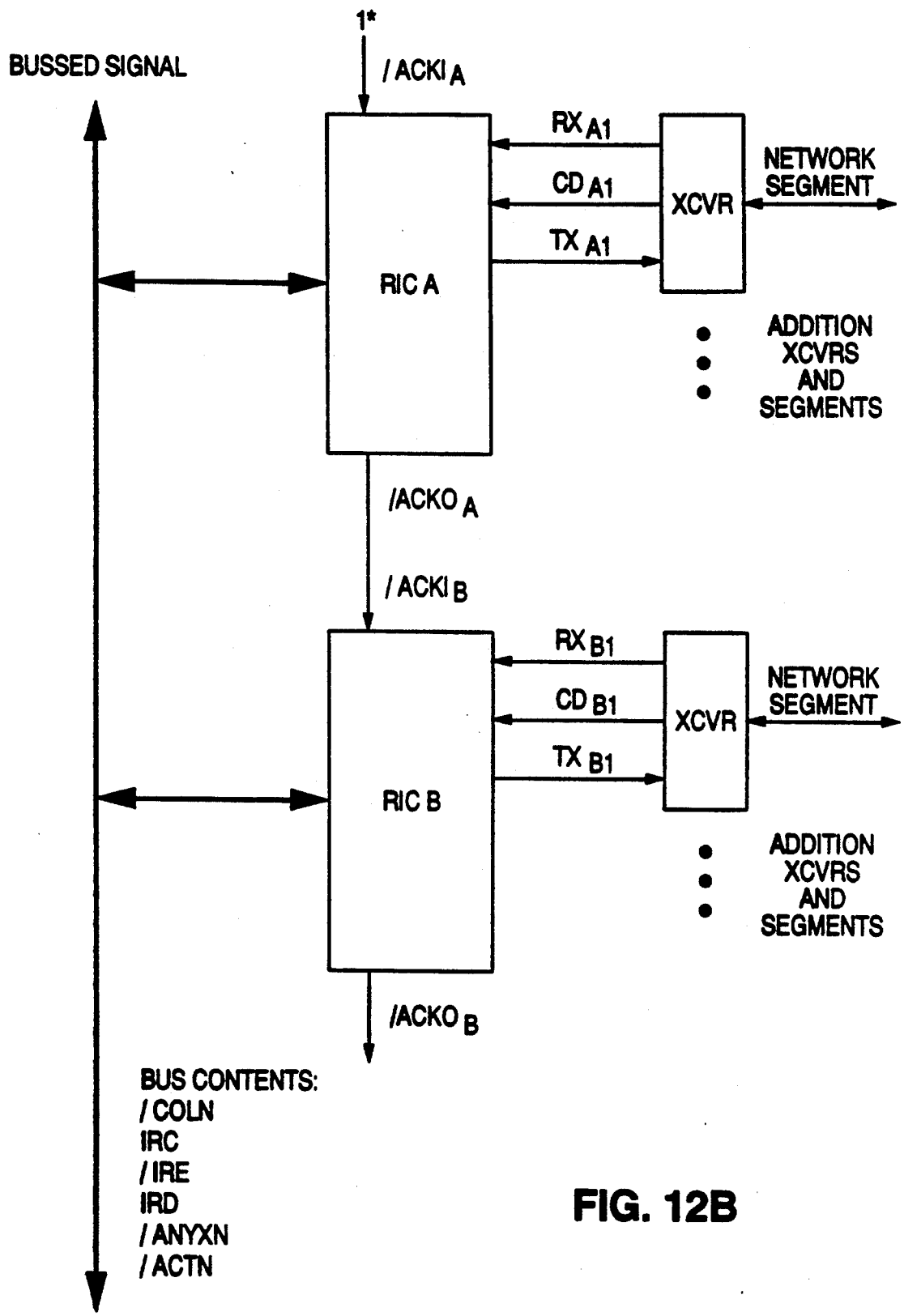
FIG. 12B is a block diagram illustrating two daisy-chained RICs.
Figure 13:
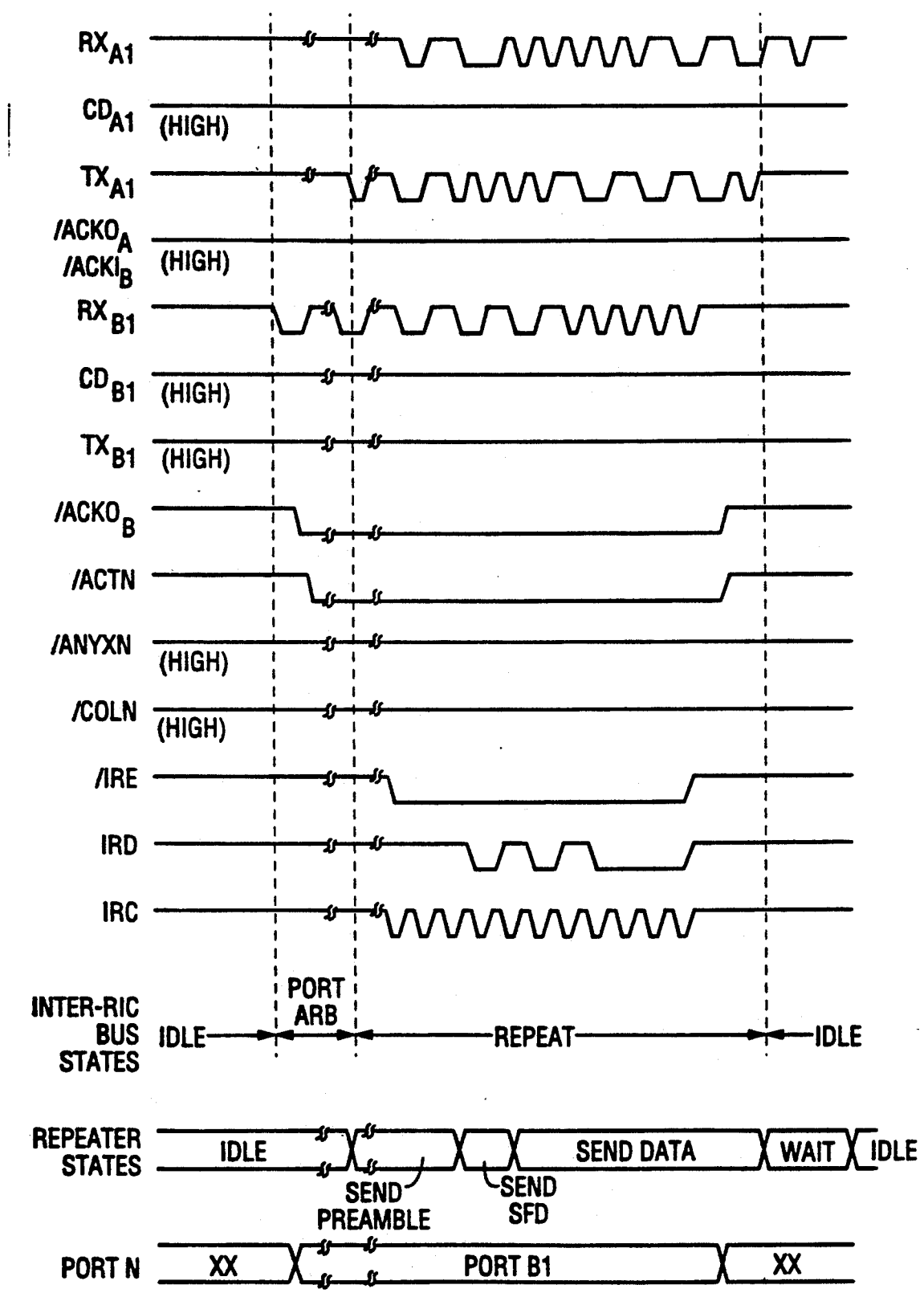
FIG. 13 is a timing diagram illustrating the packet repetition represented by the signals shown in the FIG. 12 block diagram.

FIG. 12 shows two daisy-chained RICs A and B with RIC A positioned at the top of the chain. A packet is received at PORT B1 of RIC B and is then repeated by the other ports in the system. FIG. 13 shows the functional timing diagram for the frame repetition represented by the signals shown in FIG. 12. In the FIG. 12 example, only two ports in the system are shown. Obviously, the other ports also repeat the frame. The example also indicates the operation of the RICs' state machines insofar as can be seen by observing the Inter-RIC bus 18. For reference, the repeater's state transitions are shown in the terms of the states defined by the IEEE 802.3 specification. The location (i.e., which port it is) of PORT N is also shown.

The following describes the repeater and inter-RIC bus transitions shown in FIG. 13.

The repeater is stimulated into activity by the data signal received by PORT B1. The RICs 10 in the system are alerted to forthcoming repeater operation by the falling edges on the /ACKI/ACKO daisy chain and the /ACTN bus signal. Following a defined start-up delay, the repeater moves to the SEND PREAMBLE state. The RIC system utilizes the start-up delay to perform port arbitration. When packet transmission begins, the RIC system enters the REPEAT state. The expected sequence of repeater states for normal packet repetition, SEND PREAMBLE, SEND SFD and SEND DATA, is followed but is not visible upon the Inter-RIC bus 18. The states are merged together into a single REPEAT state. This is also true for the WAIT and IDLE states; they appear as combined Inter-RIC bus IDLE state.

Once a repeat operation has begun (i.e., the repeater leaves the IDLE state), it is required to transmit at least 96 bits of data or jam/preamble onto its network segments. If the duration of the receive signal from PORT N is smaller than 96 bits, then the repeater transitions to the RECEIVE COLLISION state (described below). This behavior is known as fragment extension.

After the packet data has been repeated, including the emptying of the RIC's elasticity buffer 32, the RIC 10 performs the TW1 transmit recovery operation. This is performed during the WAIT state shown in the FIG. 11 state diagram.

2. Receive Collisions

A receive collision is a collision which occurs on the network segment attached to PORT N. That is, the collision presence is recognized on the receive port in a similar manner as a data packet is received and then is propagated to the other network segments.

Receive collision propagation follows a similar sequence of operations as is followed for data repetition. An arbitration process is performed to find PORT N, and a preamble/jam pattern is transmitted by the repeater's other ports. When PORT N detects a collision on its segment, the /COLN signal of Inter-RIC bus 18 is asserted. This signal forces all the RICs 10 in the system to transmit a preamble/jam pattern to their segments. This is important, since these RICs 10 may be already transmitting data from their elasticity buffers 32. The repeater moves to the RECEIVE COLLISION state when the RICs 10 begin to transmit the jam pattern. The repeater remains in this state until both of the following conditions have been fulfilled: (1) at least 96 bits have been transmitted onto the network and (2) the activity has ended.

The actual end of activity has its own permutations of conditions: (1) collision and receive data signals may end simultaneously, (2) receive data may appear to end before collision signals, and (3) receive data may continue for some time after the end of the collision.

Network segments using coaxial media may experience spurious gaps in segment activity when the collision signal goes inactive. This arises from the interaction between the receive and collision signal squelch circuits, implemented in coaxial transceivers, and the properties of the coaxial cable itself. The 802.3 repeater specification avoids propagation of these activity gaps by extending collision activity by the TW2 wait time. The specification requires that jam pattern transmission must be sustained throughout this period. After this, the repeater will move to the WAIT state unless there is a data signal being received by PORT N. (FIGS. 10 and 11).

Figure 14:
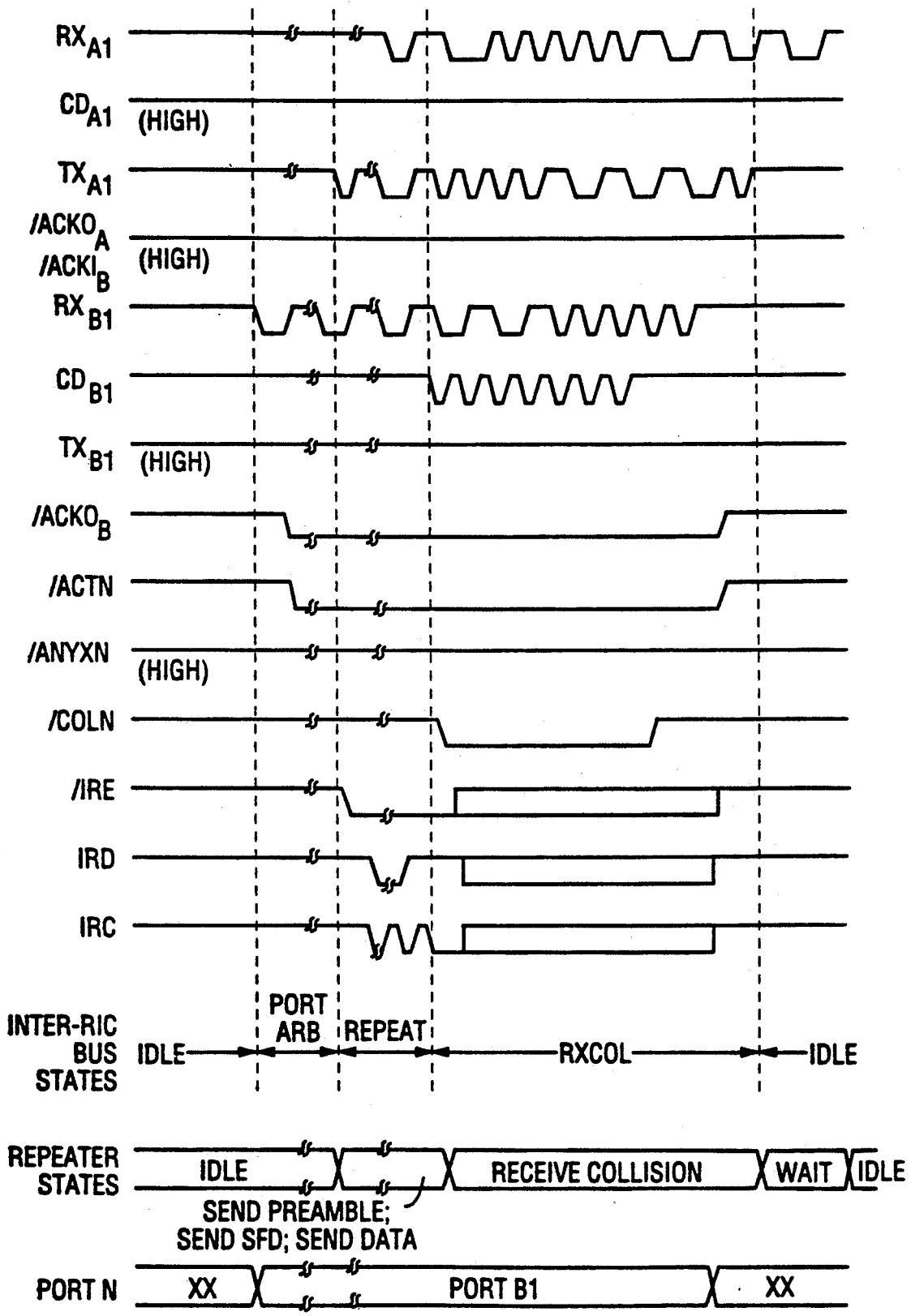
FIG. 14 is a timing diagram illustrating operation a RIC during a receive collision.

The functional timing diagram shown in FIG. 14 shows the operation of a repeater system during a receive collision. The repeater system configuration is the same as earlier described with reference to FIG. 12.

The RICs 10 perform the same PORT N arbitration and data repetition operations as previously described. The system is notified of the receive collision on PORT B1 by the following edge of the /COLN bus signal. This is the signal that informs the main state machines MSM 30 to output the jam pattern rather than the data held in the elasticity buffers 32. Once a collision has occurred, the IRC, IRD and /IRE bus signals may become undefined. When the collision has ended and the TW2 operation performed, the repeater moves to the WAIT state (FIGS. 10 and 11).

3. Transmit Collisions

A transmit collision is a collision that is detected upon a segment to which the repeater system is transmitting. The port state machine PSM monitoring the colliding segment asserts the /ANYXN bus signal. The assertion of the /ANYXN signal causes PORT M arbitration to begin. The repeater moves to the TRANSMIT COLLISION state when the port which had been PORT N starts to transmit a Manchester encoded 1 on a network segment. While in the TRANSMIT COLLISION state, all ports of the repeater must transmit the 1010 ... jam pattern and PORT M arbitration is performed.

Each RIC 10 is obliged, by the IEEE 802.3 specification, to insure that all of its ports transmit for at least 96 bits once the TRANSMIT COLLISION state has been entered. This transmit activity is enforced by the /ANYXN bus signal. While ANYXN is active, all ports of RIC 10 will transmit jam. To insure this situation lasts for at least 96 bits, the main state machines MSM 30 inside the RICs 10 assert the /ANYXN signal throughout this period. After this period has elapsed, the /ANYXN signal will only be asserted if there are multiple ports with active collisions on their network segments.

There are two possible ways for a repeater to leave the TRANSMIT COLLISION state. The most straight-forward way is when network activity (i.e., collisions and their TW2 extensions) ends before the 96 bit enforced period expires. Under these conditions, the repeater system may move directly to the WAIT state when 96 bits have been transmitted to all ports. If the main state machines MSM 30 enforced period ends and there is still one port experiencing a collision, then the ONE PORT LEFT state is entered. This may be seen on the Inter-RIC bus 18 when the /ANYXN signal is de-asserted and PORT M stops transmitting to its network segment. In this circumstance, the Inter-RIC bus 18 transitions to the RECEIVE COLLISION state. The repeater will remain in this state while PORT M's collision, TW2 collision extension and any receive signals are present. When these conditions are not true, packet repetition finishes and the repeater enters the WAIT state.

Figure 15:
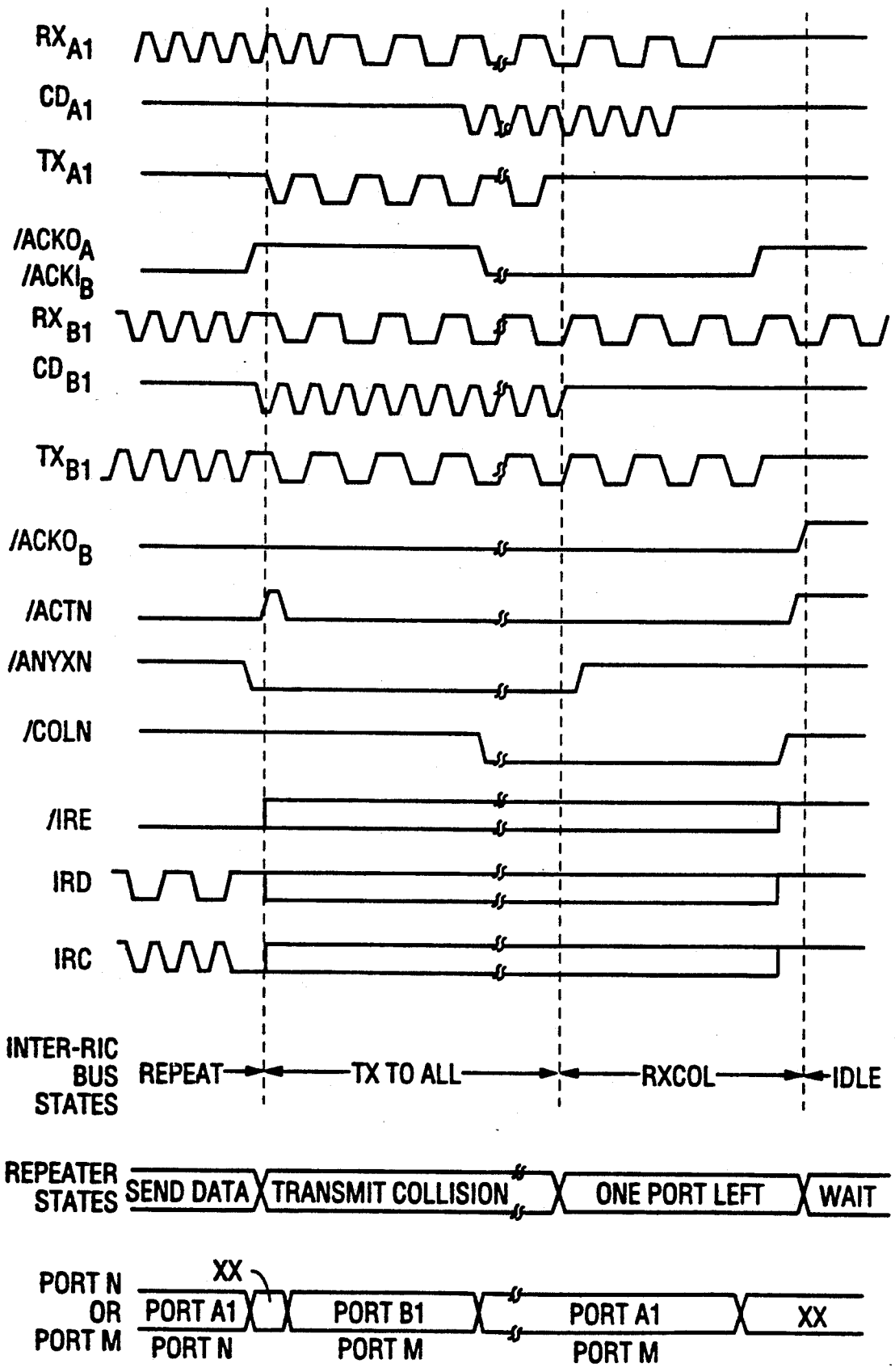
FIG. 15 is a timing diagram illustrating operation of a RIC during a transmit collision.

FIG. 15 shows a multi-RIC system operating under transmit collision conditions. There are many different scenarios which may occur during a transmit collision. FIG. 15 illustrates one of these.

FIG. 15 begins with packet reception by PORT A1. PORT B1 experiences a collision. Since it is not PORT N, it asserts the /ANYXN signal. This signal alerts the main state machines MSM 30 in the system to switch from data to jam pattern transmission.

PORT A1 is also monitoring the /ANYXN bus line. /ANYXN assertion forces PORT A1 to relinquish its PORT N status, start transmitting, stop asserting /ACTN and release its hold on the port state machine PSM arbitration signals (/ACKOA and /ACKIB).

The first bit it transmits will be a Manchester encoded "1" in the jam pattern. Since PORT B1 is the only port with a collision, it obtains PORT M status and stops asserting the /ANYXN signal. It does, however, assert /ACTN and exerts its presence upon the port state machine PSM arbitration chain, forcing /ACKOB low. The main state machines MSM 30 insure that the /ANYXN signal stays active and, thus, forces all of the ports, including PORT M, to transmit to their segments.

After some time, PORT A1 experiences a collision. This arises from the presence of the packet being received from PORT A1's segment and the jam signal the repeater is now transmitting onto the segment. Two packets on one segment results in a collision. PORT M now moves from PORT B1 to PORT A1. PORT A1 fulfills the same criteria as PORT B1, i.e., it has an active collision on its segment, but, in addition, it is higher on the arbitration chain. This priority yields no benefits for PORT A1, since the /ANYXN signal is still active. There are now two collision sources driving the /ANYXN signal: the main state machines MSM 30 and the collision on PORT B1.

Eventually, the collision on PORT B1 ends and the /ANYXN extension by the main state machines 30 expires. Since there is now only one collision on the network (this may be deduced since /ANYXN is inactive), the repeater moves to the ONE PORT LEFT state. The RIC system treats this state in a similar manner to a receive collision with PORT M fulfilling the role of the receiving port. The difference from a true receive collision is that the switch from packet data to the jam pattern has already been made, controlled by the /ANYXN signal. Thus, the state of the /COLN signal has no effect upon repeater operations. In common with the operation of the RECEIVE COLLISION state, the repeater remains in this condition until a collision and receive activity on PORT M subside. The packet repetition operation completes when the TW1 recovery time and the WAIT state has been performed.

In transmit collision conditions, the /COLN signal will only go active if the RIC 10 which contained PORT N at the start of packet repetition contains PORT M during the TRANSMIT COLLISION and ONE PORT LFFT states.

4. Jabber Protection

A repeater is required to disable transmit activity if the length of its current transmission reaches the jabber protect limit. This is defined by the TW3 time of the 802.3 specification. The repeater disables output for a time period defined by the TW4 time of the 802.3 specification. After this period, normal operation may resume.

Figure 16:
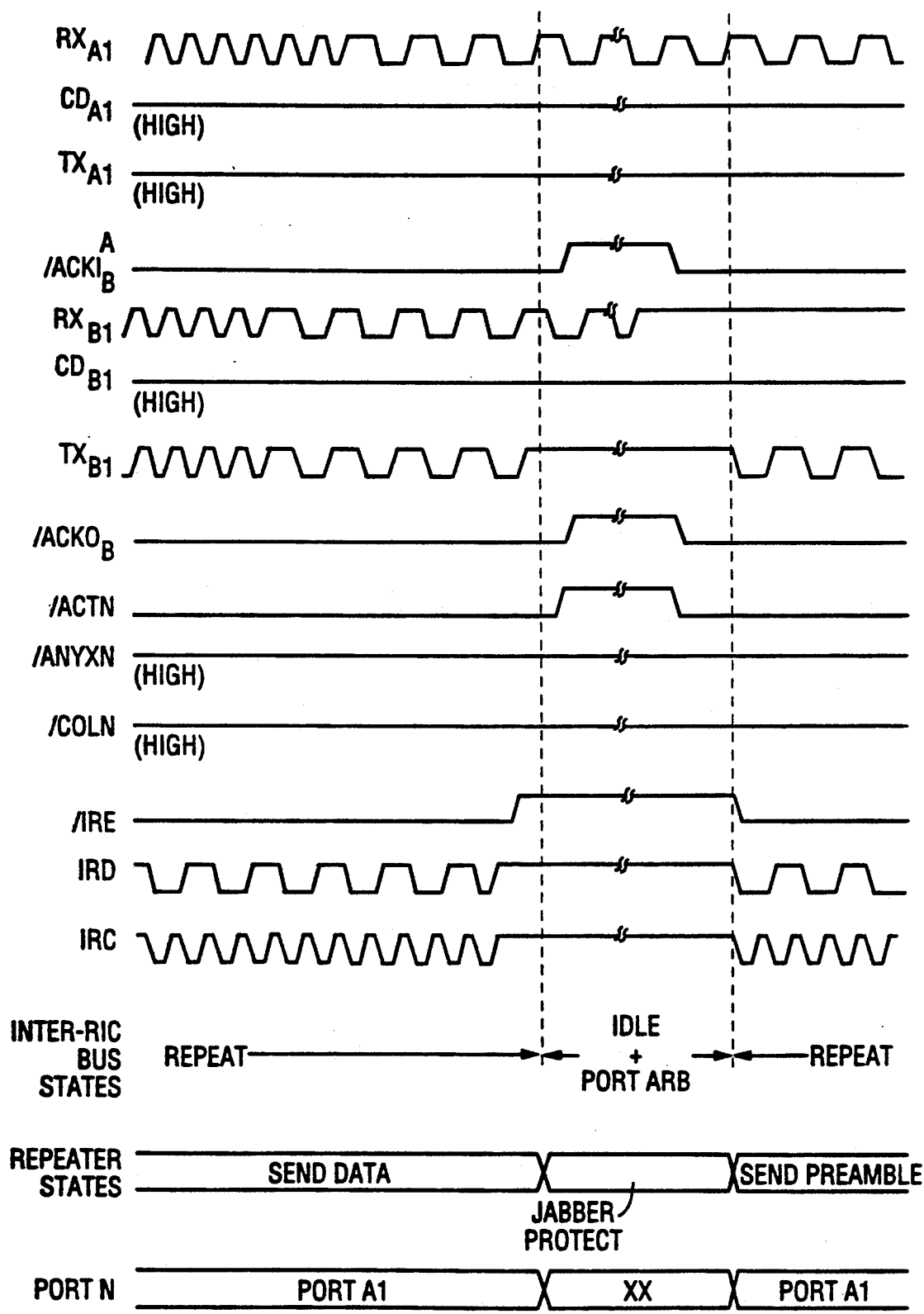
FIG. 16 is a timing diagram illustrating the effect of a jabber length frame on a RIC-based repeater system.

FIG. 16 shows the effect of a jabber length frame upon a RIC-based repeater system. In this scenario, the JABBER PROTECT state is entered from the SEND DATA state. While the TW4 time period is observed, the Inter-RIC bus displays the IDLE state. In order to be specification compliant, new packet activity or continuous activity may occur on the network, but does not result in packet repetition. As shown in FIG. 16, this may only occur when the TW4 time requirement has been satisfied.

HARDWARE CONNECTION FOR INTER-RIC BUS

When considering the hardware interface, the Inter-RIC bus 18 may be viewed as consisting of three groups of signals: (1) a port arbitration chain, namely signals /ACKI and /ACKO, (2) simultaneous drive and sense signals, i.e., /ACTN and /ANYXN (potentially these signals may be driven by multiple devices), and (3) drive or sense signals, i.e., /IRE, IRD, IRC and /COLN (only one device asserts these signals at any instant in time).

The first set of signals is either used as a point-to-point link or with external arbitration logic. In both cases, the load on these signals will not be large. Therefore, the on-chip drivers are adequate. This may not be true for signal classes (2) and (3) identified in the previous paragraph.

The Inter-RIC bus can connect RICs together directly or via external bus transceivers. The latter is advantageous in large repeaters. In the second application, the backplane is often heavily loaded and is beyond the drive capabilities of the on-chip bus drivers. The need for simultaneous sense and drive capabilities on the /ACTN and /ANYXN signals, and the desire to allow operation with external bus transceivers, make it necessary for these bus signals to each have a pair of pins on the RIC 10; one pin drives the bus and the other senses the bus signal. When the external bus transceivers are used, they must be open collector/open drain to allow wire-ORing of the signals. Additionally, the drive and sense enables of the bus transceiver should be tied in the active state.

The uni-directional nature of information transfers on the /IRE, IRD, IRC and /COLN signals, means that a RIC 10 is either driving these signals or receiving them from the bus, but not both at the same time. Thus, a single bi-directional input/output pin is adequate for each of these signals. If an external bus transceiver is used with these signals, then the packet enable "PKEN" output pin of RIC 10 performs the function of a drive enable and sense disable.

Figure 17:
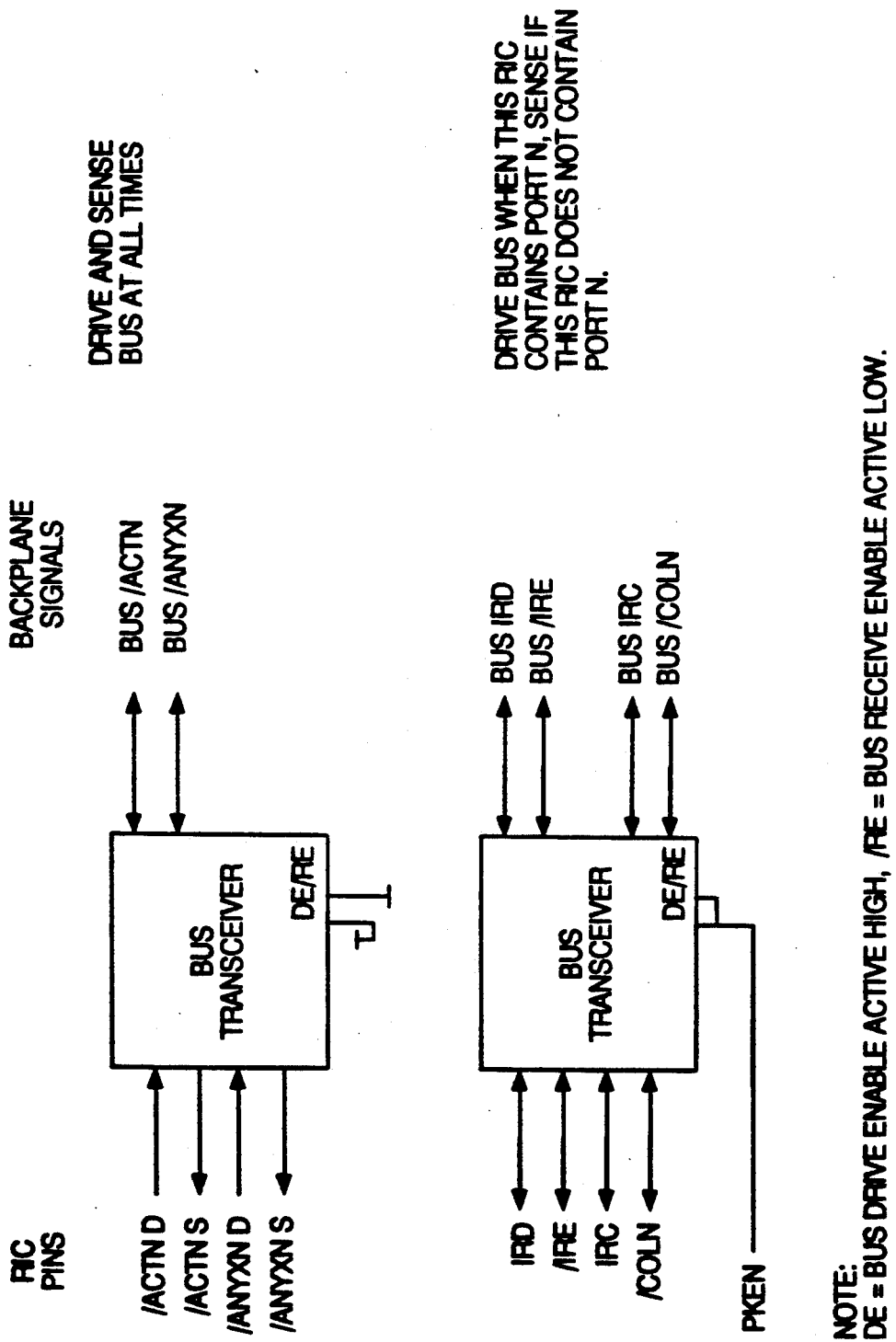
FIG. 17 is a simple block diagram illustrating a RIC connected to the Inter-RIC bus via external transceivers.

FIG. 17 shows the RIC 10 connected to the InterRIC bus 18 via external bus transceivers, such as for example, National Semiconductor Corporation's DS3893A bus transceivers.

Some bus transceivers are of the inverting type. To allow the Inter-RIC bus 18 to utilize these transceivers, the RIC 10 may be configured to invert the active states of the /ACTN, /ANYXN, /COLN and /IRE signals. Instead of being active low, they are active high. Thus, they become active low once more when passed through an inverting bus driver. This is particularly important for the /ACTN and /ANYXN bus lines, since these signals must be used in a wired-OR configuration. Incorrect signal polarity would make the bus unusable.

PROCESSOR AND DISPLAY INTERFACE

The processor and interface pins, which include the data bus, address bus and control signals, actually perform three operations which are multiplexed on these pins. These operations are: (1) the mode load operation, which performs a power-up initialization cycle upon the RIC 10, (2) display update cycles, which are refresh operations for updating the display LEDs, and (3) processor access cycles which allows microprocessors to communicate with the RIC's registers.

1. Mode Load Operation

The mode load operation is a hardware initialization procedure performed at power-on. It loads vital device configuration information into on-chip configuration registers. In addition to its configuration function, the /MLOAD pin is the RIC's reset input. When /MLOAD is low, all of the RIC's repeater timers, state machines, segment partition logic and hub management logic are reset.

Figure 18:
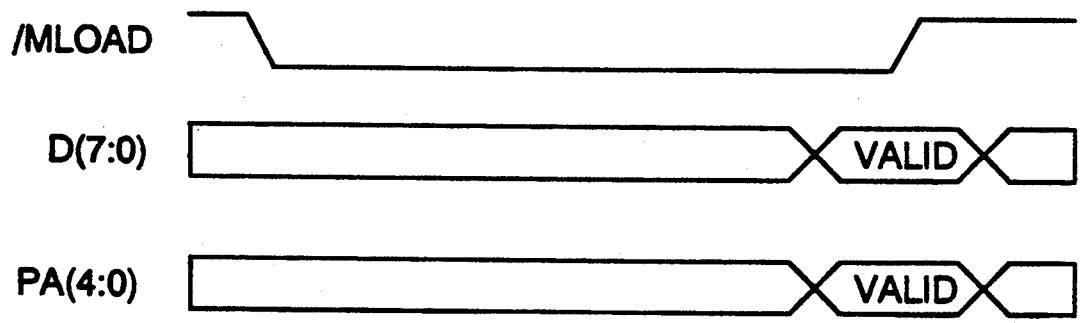
FIG. 18 is a timing diagram illustrating a RIC's mode load operation.
Figure 20B:
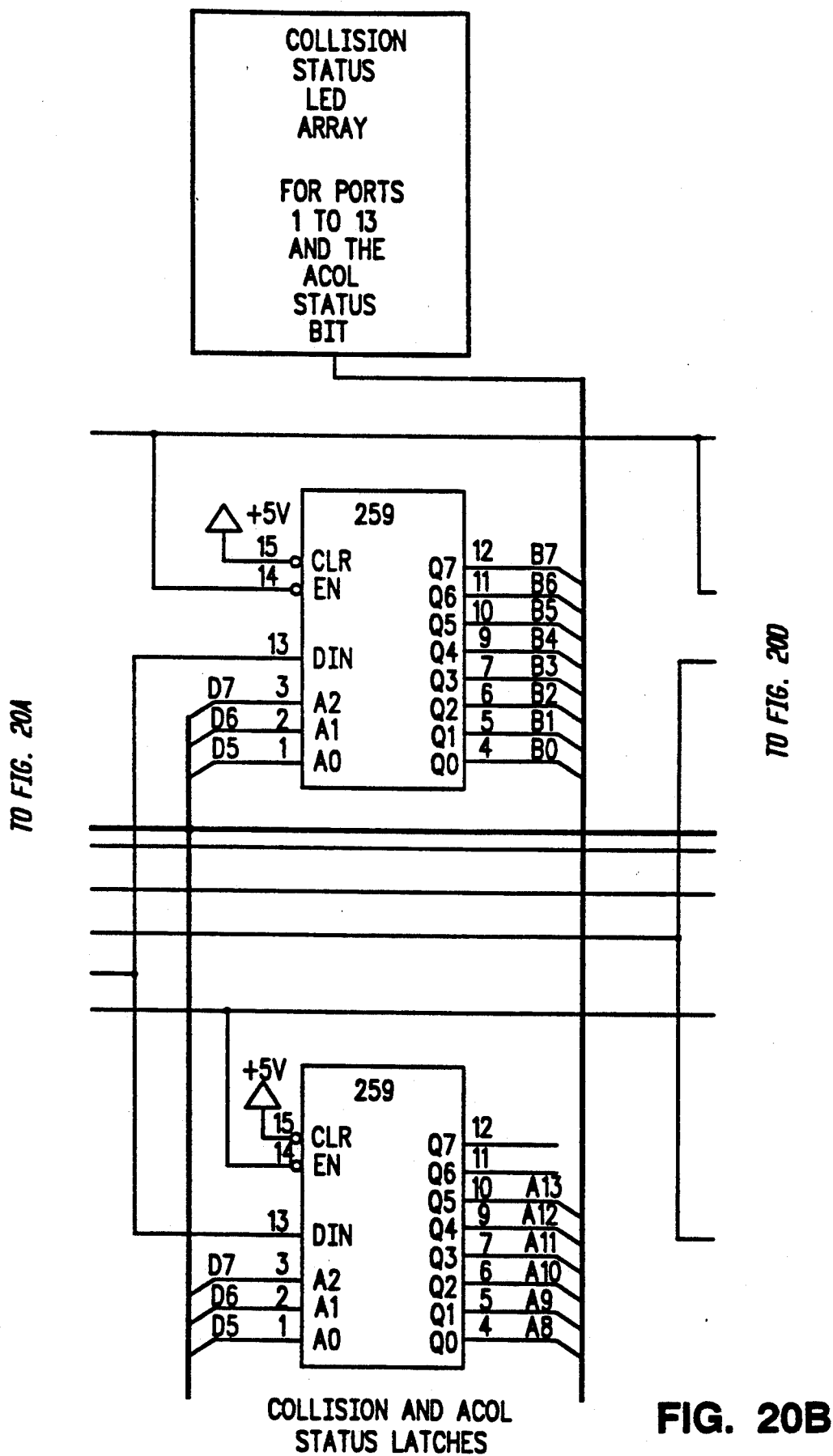
Figure 20C:
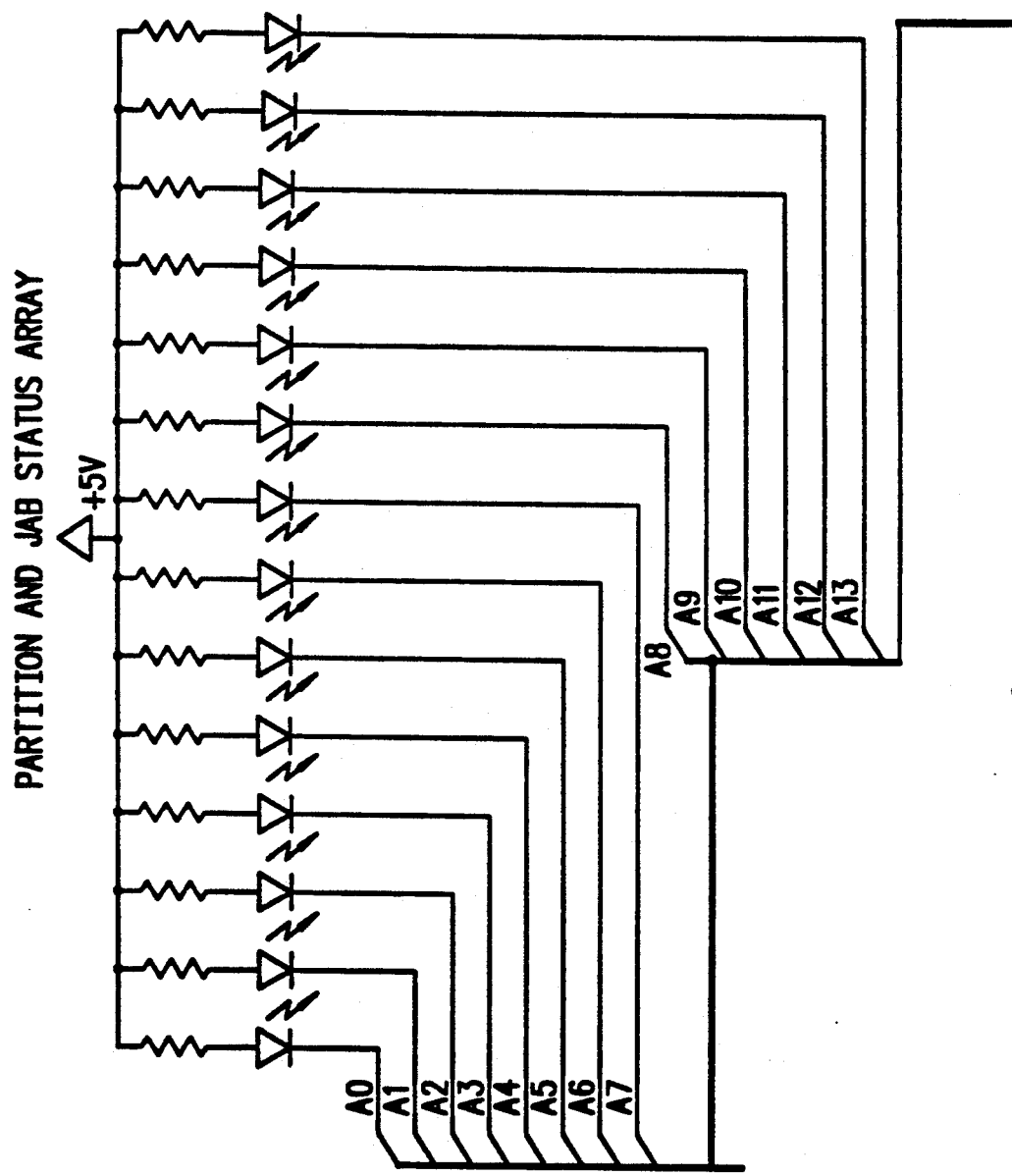
Figure 20E:
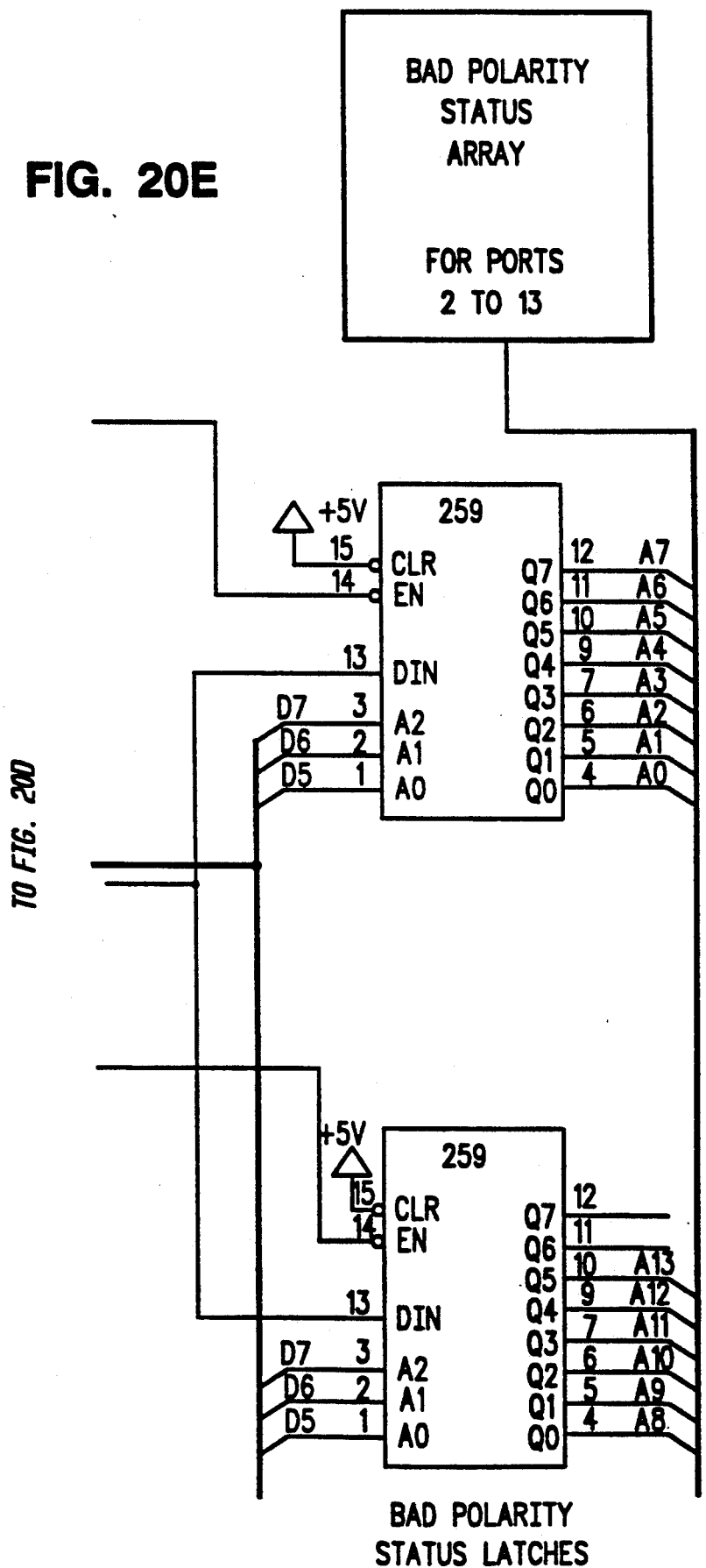

The mode load operation may be accomplished by attaching the appropriate set of pull-up and pull-down resistors to the data and register address pins to assert logic high or low signals onto these pins, and then providing the rising edge on the /MLOAD pin, as shown in FIG. 18. The mapping of RIC functions to the configuration inputs is shown in Table III below. Such an arrangement may be performed using a simple resistor, capacitor, diode network. Performing the mode load operation in this way enables the configuration of a RIC that is in a simple repeater system, i.e. one without a processor.

TABLE III

| Pin Name | Programming Function | Effect when bit is 0 | Effect when bit is 1 | Function |
|---|---|---|---|---|
| D0 | resv | not permitted | required | To ensure correct device operation, this bit must be written with a logic one during the mode load operation. |
| D1 | TW2 | 5 bits | 3 bits | This allows the user to select one of two values for the repeater specification TW2 time. The lower limit (3 bits) meets the I.E.E.E. specification. The upper limit (5 bits) is not specification compliant but may provide users with higher network throughput by avoiding spurious network activity gaps when using coaxial (10BASE2, 10BASE5) network segments. |
| D2 | /CCLIM | 63 | 31 | The partition specification requires a port to be partitioned after a certain number of consecutive collisions. The RIC has two values available to allow users to customize the partitioning algorithm to their environment. Please refer to the Partition State Machine, in data sheet section 7.3. |
| D3 | /LPPART | selected | not selected | The RIC may be confiqured to partition a port if the segement transceiver does not loopback data to the port when the port is transmitting to it, as described in the Partition State Machine |
| D4 | /OWCE | selected | not selected | This configuration bit allows the on-chip partition algorithm to in- |

TABLE III-continued

| | | | | |
|---|---|---|---|---|
| D5 | /TXONLY | selected | not selected | clude out of window collisions into the collisions it monitors, as decribed in the Partition State Machine. This configuration bit allows the on-chip partition algorithm to restrict segement reconnection, as described in the Partition State Machine. |
| D6 | /DPART | selected | not selected | The Partition state machines for all ports may be disabled by writing a logic zero to this bit during the mode load operation. |
| D7 | MIN/MAX | Minimum mode | Maximum mode | The operation of the display update block is controlled by the value of this configuration bit, as described in the Sisplay Update Cycles section. |
| RA0 | BYPAS1 | | | These configuration bits select which of the repeater ports (numbers 2 to 13) are configured to use the on-chip internal 10BASE-T transceivers or the external transceiver interface operates using A.U.I. compatible signal levels. |
| RA1 | BYPAS2 | | | |

| BYPAS2 | BYPAS1 | Information |
|---|---|---|
| 0 | 0 | All ports (2 to 13) use the external Transceiver Interface |
| 0 | 1 | Ports 2 to 5 use the external interface, 6 to 13 use the internal 10BASE-T transceivers |
| 1 | 0 | Ports 2 to 7 use the external interface, 8 to 13 use the internal 10BASE-T transceivers |
| 1 | 1 | All ports (2 to 13) use the internal 10BASE-T transceivers |

| Pin Name | Programming Function | Effect when bit is 0 | Effect when bit is 1 | Function |
|---|---|---|---|---|
| RA2 | BINV | active high signals | active low signals | This selection determines whether the Inter-RIC signals: IRE, ACTN, ANYXN, COLN and Management bus signal MCRS are active high or low. |
| RA3 | EXPLL | External PLL | Internal PLL | If desired, the RIC may be used with an external decoder, this configuration bit performs the selection. |
| RA4 | resv | not permitted | required | To insure correct device operation, this bit must be written with a logic one during the mode load operation. |

Alternatively, in a complex repeater system, the mode load operation may be performed using a processor write cycle. This would require the /MLOAD pin to be connected to the CPU's write strobe via some decoding logic and include it in the processor's memory map.

HARDWARE CONNECTION FOR PROCESSOR AND DISPLAY INTERFACE

1. Display Update Cycles

The RIC 10 possesses control logic and interface pins which may be used to provide status information concerning activity on the attached network segments and the current status of repeater functions. These status cycles are completely autonomous and require only simple support circuitry to produce the data in a form suitable for a light emitting diode (LED) display. The display may be used in one of two modes: (1) minimum mode, general repeater status LEDs and (2) maximum mode, individual port status LEDs.

The minimum mode, intended for simple LED displays, makes available four status indicators. The first LED denotes whether the RIC 10 has been forced to activate its jabber protect functions. The remaining three LEDs indicate if any of the RIC's network segments are: (1) experiencing a collision, (2) receiving data (3) currently partitioned. When the minimum display mode is selected, the only external components required are a 73×374 type latch, the LEDs, and their current limiting resistors.

The maximum mode differs from minimum mode by providing display information specific to individual network segments. This information denotes the collision activity, packet reception and partition status of each segment.

In the case of 10BASE-T segments, the link integrity status and polarity of the received data are also made available. The wide variety of information available in maximum mode may be used in its entirety or in part, thus allowing a choice of the appropriate complexity of status display commensurate with the specification of the end equipment.

The signals provided and their timing relationships have been designed to interface directly with 74×259 type addressable latches, the number of latches used being dependent upon the complexity of the display. Since the latches are octal, a pair of latches is needed to display each type of segment specific data (13 ports means 13 latch bits).

Tables VI and V below show the function of the interface pins and minimum and maximum modes, respectively.

TABLE IV

| Signal Pin Name | Function in MINIMUM MODE |
|---|---|
| D0 | No operation |
| D1 | Provides status information indicating if there is a collision occurring on one of the segments attached to this RIC |
| D2 | Provides status information indicating if one of this RIC's ports is receiving a data or collision packet from a segment attached to this RIC |
| D3 | Provides status information indicating that the RIC has experienced a jabber protect condition |
| D4 | Provides Status information indicating if one of the RIC's segments is partitioned |
| D(7:5) | No operation |
| /STR0 | This signal is the latch enable for the 374 type latch. |
| /STR1 | This signal is held at a logic one. |

TABLE V

| Signal Pin Name | Function in MINIMUM MODE |
|---|---|
| D0 | Provides status information concerning the Link Integrity status of 10BASE-T segments. This signal should be connected to the data inputs of the chosen pair of 74×259 latches. |
| D1 | Provides status information indicating if there is a collision occurring on one of the segments attached to this RIC. This signal should be connected to the data inputs of the chosen pair of 74×259 latches. |
| D2 | Provides status information indicating if one of this RIC's ports is receiving a data or a collision packet from its segment. This signal should be connected to the data inputs of the chosen pair of 74×259 latches. |
| D3 | Provides Status information indicating that the RIC has experienced a jabber protect condition. Additionally it denotes which which of its ports are partitioned. This signal should be connected to the data inputs of the chosen pair of 74×259 latches. |
| D4 | Provides status information indicating if one of this RIC's ports is receiving data of inverse polarity. This status output is only valid if the port is configured to use its internal 10BASE-T transceiver. The signal should be connected to the data inputs of the chosen pair of 74×259 latches. |
| D(7:5) | These signals provide the repeater port address corresponding to the data available on D(3:0). |
| /STR0 | This signal is the latch enable for the lower byte latches, that is the 74LS259s which display information concerning ports 1-7. |
| /STR1 | This signal is the latch enable for the upper byte latches, that is the 74LS259s which display information concerning ports 8-13. |

FIG. 19 shows the location of each port's status information when maximum mode is selected. This may be compared with the connection diagram shown in FIGS. 20A-20E.

Immediately following the mode load operation (when the /MLOAD pin transitions to a high logic state), the display logic performs an LED test operation. This operation lasts one second and, while it is in effect, all of the utilized LEDs blink on. Thus, the operation of the display may be tested by forcing the RIC 10 into a reset cycle (/MLOAD forced low). The rising edge on the /MLOAD pin starts the LED test cycle. During the LED test cycle, the RIC 10 does not perform packet repetition operations.

The status display possesses a capability to stretch the time an LED is active. At the end of the repetition of a packet, the display is frozen, showing the current activity. This freezing lasts for 30 milliseconds or until a subsequent packet is repeated. Thus, at low levels of packet activity, the display stretches activity information to make it discernable to the human eye. At high traffic rates, the relative brightness of the LEDs indicates those segments with high or low activity.

2. Processor Access Cycles

Access to the internal registers of the RIC 10 is made via its processor interface 22. This interface utilizes conventional non-multiplex address (5 bit) and data (8 bit) busses. The data buss is also used to provide data and address information to external display latches during display update cycles. While performing these cycles, the RIC 10 behaves as a master of its data bus. Consequently, a TRISTATE™ bi-directional bus transceiver, for example a 74LS245 transceiver, must be placed between the RIC 10 and any processor bus.

The processor requests a register access by asserting the read "/RD" or write "/WR" input strobes. The RIC 10 responds by finishing any current display update cycle and asserts the TRISTATE™ buffer enable signal "/BUFEN". If the processor cycle is a write cycle, then the RIC's data buffers are disabled to prevent contention.

Thus, in accordance with an aspect of the present invention, the Data Bus of the RIC 10 is utilized for two functions: status LED updates (with RIC 10 being master of the bus) and processor read/write accesses of the internal RIC registers.

The mastership of the Data Bus is decided by a bus arbiter. During the state of the RIC 10 being the owner of the bus, internal read cycles are run. The Data Bus carries the information tapped from the port real time registers as well as the addresses of the ports being polled. The data format is such that the status bits could be logged by 74LS259 or equivalent addressable latches. The LED updates are synchronized with the help of strobe signals (STR0–STR1). The internal arbiter resolves a simultaneous access by the processor by holding on to the bus while the update is in progress. Thus, the arbiter induces wait states for the processor access.

As stated above, the signal acknowledging the processor as the master of the bus is BUFFEN, which allows connecting the system with the shared Data Bus.

Figure 21:
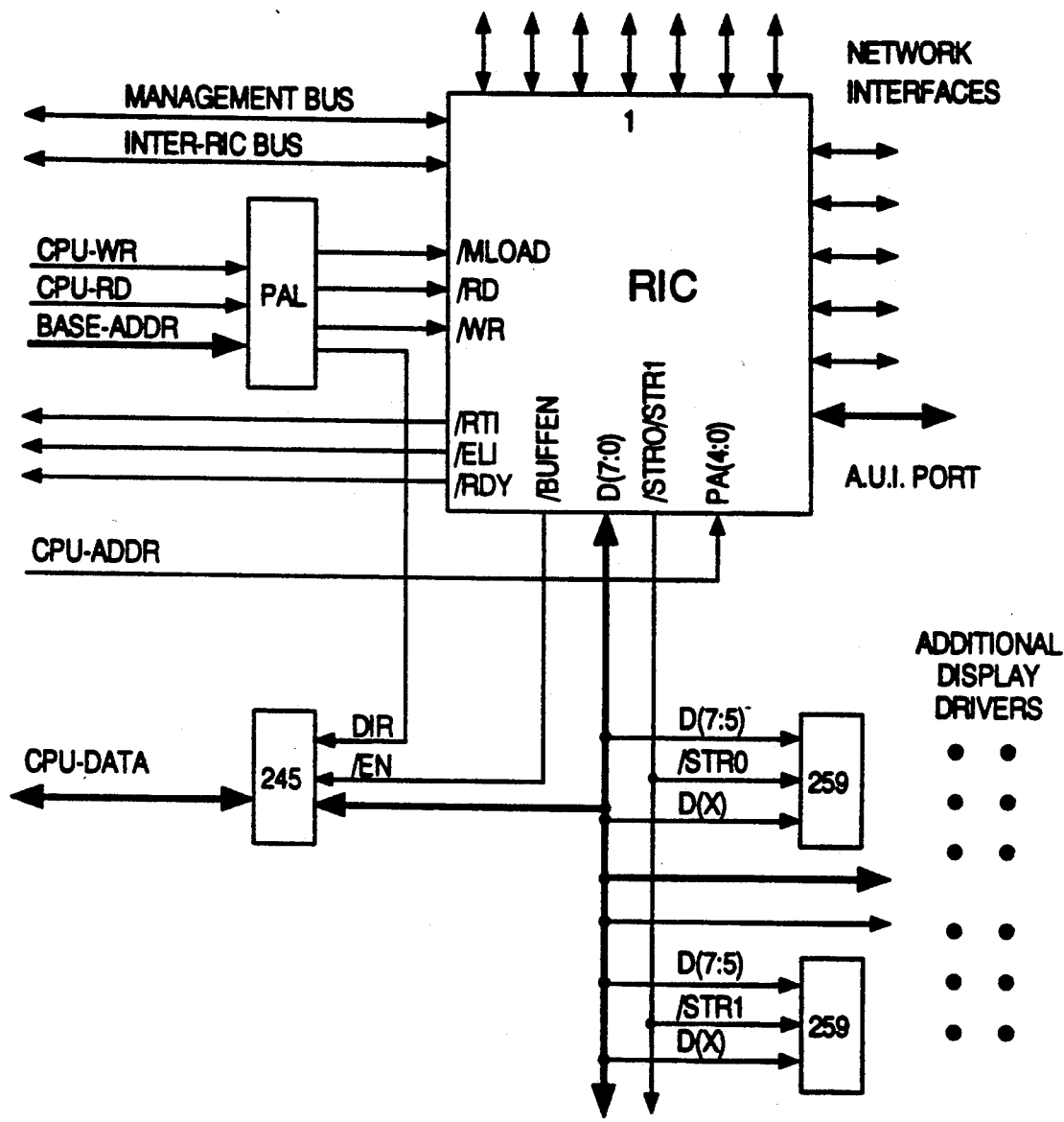
FIG. 21 is a block diagram illustrating a RIC's processor and display interfaces.

In order to interface to the RIC 10 in a processor control system, it is likely a PAL device will be used to perform the following operations: (1) locate the RIC 10 in the processor's memory map (address decode), (2) generate the RIC's read and write strobes, and (3) control the direction signal for the 74LS245 tristate buffer. An example of the processor and display interfaces is provided in FIG. 21.

HUB MANAGEMENT SUPPORT

As stated above, and in accordance with an aspect of the present invention, the RIC 10 provides hub management support in the form of information regarding the status of its ports and the packets it is repeating. This data is available in three forms: (1) counted events, i.e., network events accumulated into the RIC's 16 bit event counter registers, (2) recorded events, i.e., network events that set bits in the event record registers, and (3) hub management status packets, i.e., information sent over the management bus in a serial function to be decoded by an Ethernet controller board.

The counted and recorded event information is available through the processor interface 22. This data is port-specific and may be used to generate interrupts via the event logging interrupt "/ELI" pin. Since the information is specific to each port, each RIC port has its own event record register and event counter.

In accordance with an aspect of the present invention, the counters and event record registers have user-definable masks which enable them to be configured to count and record a variety of events. The counters and record registers are designed to be used together so that detailed information (e.g., a count value) can be held internally for a specific network condition and more general information (e.g., certain types of events have occurred) may be retained in internal latches. Thus, the counters may be configured to increment upon a rapidly occurring event (most likely to be used to count collisions) and the record registers may log the occurrence of less frequent error conditions such as jabber protect packets.

The RIC architecture supports statistics gathering at maximum network bandwidth. The statistics are logged while a packet repetition is in process and are furnished to the counter and flag arrays after transmission of the same packet has ended. The independent operations of logging and furnishing the information allows management statistics gathering of successive packets with even, very small interframe gaps.

For simultaneous occurrence of a count up operation of a logged event and a decrement operation requested for rate gauging, count data integrity is maintained.

For a simultaneous occurrence of a processor access of a flag/counter register and a count operation, the flag status/count value could be either (i) one before the update or (ii) one after the update. In essence, the contention between processor access and count update is avoided.

A temporary holding register allows the generation of a 16-bit virtual data bus from an 8-bit physical data bus during counter register accesses. A processor read to one of the counter registers causes the contents of this register and its companion register, either the upper or lower byte, in the port counter to be loaded to the temporary holding register. When the processor wishes to read this companion register, data is accessed from the holding register rather than from the counter itself. In this way, if an update occurs, to the counter, the value read by the processor is not corrupted.

In accordance with an aspect of the present invention, the RIC 10 includes a four signal hub management bus for transmitting data and statistics to a standard network controller (e.g. National Semiconductor Corporation's DP8390 (NIC) controller or DP83932 (SONIC) controller). The data that is transmitted to the controller includes the received packet with seven bytes of network statistics appended; these statistics include: CRC error status, frame alignment status, out of window collision status, collision start time information, packet length, length of the preceding interframe gap, jabber protect event status, elasticity buffer error status, phase lock decode error status, pygmy packet status, address of the receiving port, address of the receiving RIC 10 and bus performance indicators, i.e., utilization of packet compression.

The RIC's hub management architecture is designed to support a bus environment with multiple RICs. This allows large repeater systems to repeat information to a single network controller. Additionally each RIC 10 can be given its own "address" which is reported with the network statistics. Therefore, the management system can determine which specific port which RIC 10 in the hub received the network data.

A packet compress feature provided by the hub management interface allows minimal use of system memory. This causes suppression (non-transmission on the management bus) of unwanted segments of the received packet. The amount of compression is programmable. The decision to compress is made via a packet compress input pin. This is a separate RIC input pin that is compatible with a packet compress output pin provided by the DP83932 SONIC controller. The SONIC controller is capable of detecting 16 Ethernet addresses (found at the start of the Ethernet packet). Thus, the SONIC-RIC combination can be used to compress network data based upon the Ethernet address found in the network data stream. This supports efficient memory usage in both managed hub and managed bridge applications.

The hub management architecture also includes a programmable feature that allows it to compensate for interframe processing delays of the controller/memory employed in the management system. This feature is provided to prevent the RIC 10 from supplying management data when the controller is unable to monitor that data, which could cause the controller to miss a portion of that data packet without knowing that it was "missed." This is achieved by forcing all RICs on the bus to abide by a programmed interframe gap time supplied by the controller. This interframe gap time is user selectable, being dependent upon the speed of the controller and its associated memory. Every RIC 10 monitors its own and other RIC's utilization of the management bus to ensure that the interframe gap requirements are not violated.

1. Event Counting Function

The counters may increment upon the occurrence of one of the following categories of events:

(1) Jabber Protection (JAB): the port counter increments if the length of a received packet from its associated port causes the repeater state machine to enter the jabber protect state.

(2) Elasticity Buffer Error (ELBER): the port counter increments if an elasticity buffer underflow or overflow occurs during packet reception. The flag is held inactive if a collision occurs during packet reception or if a phase lock error (described below) has already occurred during the repetition of the packet.

(3) Phase Lock Error (PLER): a phase lock error is caused if the phase lock loop decoder loses lock during packet reception. Phase lock onto the receive data stream may or may not be recovered later in the packet and data errors may have occurred. This flag is held inactive if a collision occurs.

(4) Non-SFD Packet (NSFD): if a packet is received, and the start of frame delimiter is not found, then the port counter will increment. Counting is inhibited if the packet suffers a collision.

(5) Out of Window Collision (OWC): the out of window collision flag for a port goes active when a collision is experienced outside of a network slot time.

(6) Transmit Collision (TXCOL): the transmit collision flag for a port is enabled when a transmit collision is experienced by the repeater. Each port experiencing a collision under these conditions is said to have suffered a transmit collision.

(7) Receive Collision (RXCOL): the receive collision flag for a port goes active when a port is the receive source of network activity and suffers a collision; if no other network segments experience collisions, then the receive collision flag for the receiving port will be set.

(8) Partition (PART): the port counter increments when a port becomes partitioned.

(9) Bad Link (BDLNK): the port counter increments when a port is configured for 10BASE-T operation and has entered the link lost state.

(10) Pygmy Packet Reception (PGPK): the port counter increments if the received packet is less than 74 bits long and no collision occurs during reception.

(11) Packet Reception (REC): when a packet is received, the port counter increments.

For the counters to be used, the desired statistic must be selected from the above list. This counter mask information must then be written to the appropriate event count mask register There are two of these registers, the upper and lower event count registers. The exact bit pattern of these registers is discussed below.

For example, if the counters are configured to count network collisions and the appropriate masks have been set, then whenever collision occurs on a segment, this information is latched by the hub management support logic. At the end of repetition of the packet, the collision status respective to each port is loaded into that port's counter. This operation is completely autonomous and requires no processor intervention.

Each counter is 16 bits long and may be directly read by the processor. Additionally, each counter has a number of decodes to indicate the current value of the count. There are three decodes: (1) low count (a value of 00FF Hex and under), (2) high count (a value of C000 Hex and above), and (3) full count (a value of FFFF Hex).

The decodes from each counter are logically ORed together and may be used as interrupt sources for the /ELI interrupt pin. Additionally, the status of these bits may be observed by reading the page select register PSR, which is described in greater detail below. In order to enable any of these threshold interrupts, the appropriate interrupt mask bit must be written to the management interrupt configuration register, which is also described below.

In addition to the event masking functions, the upper event counting mask register (UECMR) possesses two bits which control the operation of the counters. When written to a logic 1, the reset on read bit "ROR" resets the counter after a processor read cycle is performed. If this operation is not selected, then, in order to zero the counters, they must either be written with all zeros by the processor or allowed to roll over to all zeros. The freeze when full bit "FWF" prevents counter roll over by inhibiting count up-cycles (these happen when chosen events occur), thus freezing the particular counter at FFFF hex.

The port event counters may also be controlled by the counter decrement (/CDEC) 10. As its name suggests, a logic low on this pin will decrement all the counters by a single value. The pulses on the counter decrement pin are internally synchronized and scheduled so as not to conflict with any "up-counting" activity. If an up-count and a down-count occur simultaneously, then the down-count is delayed until the up-count has completed. This combination of up and down counting capability enables the RIC's internal counters to provide a simple rolling average or be used as extensions of larger external counters.

If the FWF option is enabled, then the count down operation is disabled for those registers which have reached FFFF Hex and, consequently, have been frozen. Thus, if FWF is set and /CDEC has been employed to provide a rate indication, a frozen counter indicates that a rate has been detected which has gone out of bounds, i.e., too fast increment or too slow increment. If the low count and high count decodes are employed as either interrupt sources or in a polling cycle, then the direction of rate excursion may be determined.

The RIC's external data bus is 8 bits wide. Since the event counters are 16 bits wide, two processor read cycles are required to yield the counter value. In order to insure that the read value is correct, and to allow simultaneous event counts with processor access, a temporary holding register is employed. The read cycle to either the lower or upper byte of a counter causes both bytes to be latched into the holding register. Thus, when the other byte of the counter is obtained, the holding register is accessed and not the actual counter register. This insures that the upper and lower bytes contain the value sampled at the same instant in time, that is, when the first read cycle to that counter occurred.

There is no restriction concerning whether the upper or lower byte is read first. However, to insure that the "same instant value" is obtained, the reads of the upper and then the lower byte (or vice versa) should be performed as consecutive reads of the counter array. Other non-counter registers may be read in between these read cycles and also write cycles may be performed. If another counter is read, or the same byte of the original counter is read, then the holding register is updated from the counter array and the unread byte is lost.

If the reset on read option is employed, then the counter is reset after the transfer to the holding register is performed. Processor read and write cycles are scheduled in such a manner that they do not conflict with count-up or count-down operations. That is, in the case of a processor read, the count value is stable when it is loaded into the holding register. In the case of a processor write, the newly written value is stable; therefore, it may be incremented or decremented by any subsequent count operation. During the period the /MLOAD pin is low (power on reset), all counters are reset to zero and all counter masks are forced into a disabled state. Details regarding the address location of the port event counters are provided below.

2. Event Record Function

As stated above, each repeater port has its own event recording register. This is an 8 bit status register. Each bit is dedicated to logging the occurrence of a particular event. The logging of these events is controlled by the event recording mask register. For an event to be recorded, the particular corresponding mask bit must be set. Similar to the scheme employed for the event counters, the recorded events are latched during the repetition of a frame and then automatically loaded into the recording registers at the end of the transmission of a frame. When one of the unmasked events occurs, the particular port register bit is set. The status is visible to the user. All of the registered bits for all of the ports are logically ORed together to provide a Flag Found "FF" signal. This indicator may be found by reading the page select register. Additionally, an interrupt may be generated if the appropriate mask bit is enabled in the management and interrupt configuration register.

A processor read cycle to an event record register resets any of the bits set in that register. Read operations are scheduled to guarantee non-changing data during a read cycle. Any interval bit setting event which immediately follows a processor read will be successful.

The following events may be recorded:

(1) Jabber Protection (JAB): this flag goes active if the length of a received packet from the relevant port causes the repeater state machine to enter the jabber protect state.

(2) Elasticity Buffer Error (ELBER): this condition occurs if an elasticity buffer underflow or overflow occurs during frame reception. The flag is held inactive if the collision occurs during packet reception or if a phase lock error has already occurred during the repetition of the packet.

(3) Phase Lock Error (PLER): a phase lock error is caused if the phase lock loop decoder loses lock during packet reception. Phase lock onto the receive data stream may or may not be recovered later in the frame and data errors may have occurred. This flag is held inactive if a collision occurs.

(4) Non SFD Packet (NSFD): if the packet is received and the starter frame delimiter is not found, the flag will go active. The flag is held inactive is a collision occurs during packet repetition.

(5) Out of Window Collision (OWC): the out of window collision flag for a port goes active when a collision is experienced outside of the network slot time.

(6) Partition (PART): this flag goes active when a port become partitioned.

(7) Bad Link (BDLNK): the flag goes active when a port which is configured for 10BASE-T operation has entered the link lost state.

(8) Pygmy Packet Reception (PGPK): this flag goes active if the received packet is less than 74 bits long and no collision occurs during reception.

3. Management Interface Operation

The hub management interface provides a mechanism for combining repeater status information with packet information to form a hub management status packet. The interface, a serial bus consisting of carrier sense, receive clock and receive data is designed to connect to one or multiple RICs over a back-plane bus to a National Semiconductor Corporation DP83932 SONIC TM Network Controller. The SONIC TM network controller and the RICs 10 form a powerful entity for network statistics gathering.

The interface consists of four pins: (1) MRXC, management receive clock (10 Mhz enters the clock output), (2) /MCRS, management carrier sense (input/output indicating a valid data stream), (3) MRXD, management receive data (NRZ data outputs synchronous to MRXC), and (4) /PCOMP, packet compress (input to truncate the packet's data field).

The first three signals mimic the interface between an Ethernet controller and a phase lock loop decoder (specifically, DP83932 SONIC TM Network Controller and a National Semiconductor Corporation DP83910 SNI). These signals are driven by the RIC 10 receiving the frame. MRXC and MRXD compose an NRZ serial data stream compatible with the SONIC TM network controller. The /PCOMP signal is driven by logic on the processor board or directly by the SONIC controller. The actual data stream transferred over MXRD is derived from data transferred over the IRD Inter-RIC bus 18.

These two data streams differ in two important characteristics.

First, at the end of frame repetition, a hub management status field is attended to the data stream. This status field, consisting of seven bytes, is shown in Table VI below and corresponding FIG. 22.

TABLE VI

| Packet Status Register PSR | D7 | D6 | D5 | D4 | D3 | D2 | D1 | D0 |
|---|---|---|---|---|---|---|---|---|
| PSR(0) | A5 | A4 | A3 | A2 | A1 | A0 | PCOMPD | resv |
| PSR(1) | CRCER | FAE | COL | CLN | PA3 | PA2 | PA1 | PA0 |
| PSR(2) | PGPK | OCW | NSFD | PLER | ELBER | JAB | CBT9 | CBT8 |
| PSR(3) Collision Bit Timer | CBT7 | CBT6 | CBT5 | CBT4 | CBT3 | CBT2 | CBT1 | CBT8 |
| PSR(4) Lower Repeat Byte Count | RBY7 | RBY6 | RBY5 | RBY4 | RBY3 | RBY2 | RBY1 | RBY0 |
| PSR(5) Upper Repeat Byte Count | RBY15 | RBY14 | RBY13 | RBY12 | RBY11 | RBY10 | RBY9 | RBY8 |

TABLE VI-continued

| Packet Status Register PSR | D7 | D6 | D5 | D4 | D3 | D2 | D1 | D0 |
|---|---|---|---|---|---|---|---|---|
| PSR(6) Inter Frame Gap Bit Timer | IBT7 | IBT6 | IBT5 | IBT4 | IBT3 | IBT2 | IBT1 | IBT0 |

The information field is obtained from a number of frame status registers described below. Consistent with the IEEE 802.3 protocol, the least significant bit of a byte is transmitted first. Second, while the data field of the repeated packet is being transferred over the management bus, received clock signals on the MRXC pin may be inhibited. This operation is under the control of the packet compress pin /PCOMP. If /PCOMP is asserted during repetition of the packet, then MRXC signals are inhibited when the number of bytes (after SFD) transferred over the management bus equals the number indicated in the frame compress decode register. This register provides a means for delaying the effect of the /PCOMP signal, which may be generated early in the frame's repetition, until the desired moment. Packet compression may be used to reduce the amount of memory required to buffer packets when they are received and are waiting to be processed by hub management software. In this kind of application, an address decoder, which forms part of the packet compress logic, monitors the address fields as they are received over the management bus. If the destination address is not the address of the management node inside the hub, then packet compression can be employed. In this manner, only the portion of the packet meaningful for hub management interrogation, i.e., the address fields plus the management status fields, is transferred to the SONIC network controller and is buffered in memory. (Note: The SONIC controller implements the packet compression logic internally.)

If the repeated packet ends before /PCOMP is asserted, or before the required number of bytes have been transferred, then the hub management status field is directly appended to the receive data at a byte boundary. If the repeated packet is significantly longer than the value than the decode register requires, and /PCOMP is asserted, then the status fields will be delayed until the end of packet repetition. During this delay period, MRXC clocks are inhibited, but the /MCRS signal remains asserted.

If /PCOMP is asserted late in the packet, i.e., after the number of bytes defined by the packet compression register, then packet compression will not occur.

The management interface may be fine-tuned to meet the timing considerations of the SONIC network controller and the access time of its associated packet memory. This refinement may be performed in two ways.

First, the default mode of operation of the management interface is to only transfer packets over the bus which have a start of frame delimiter. Thus, "packets" that are only preamble/jam and do not convey any source or destination address information are inhibited. This filtering may be disabled by writing a logic zero to the management interface configuration or "MIFCON" bit in the management and interrupt configuration register, as described in greater detail below.

Second, the management bus is designed to accommodate situations of maximum network utilization (for example, when collision generated fragments occur, these collision fragments may violate the IEEE 802.3 IFG specification). The IFG required by the SONIC network controller is function of the time taken to release space in the receive FIFO and to perform end of packet processing (write status information in the memory). These functions are primarily memory operations and, consequently, depend upon the bus latency in the memory access time of the system. In order to allow discretion in choosing the speed of this memory, the RIC 10 may be configured to protect the SONIC network controller from potential FIFO overflow. This is performed by utilizing the inter-frame gap threshold select register.

The value held in this register, plus one, defines, in network bit times, the minimum allowed gap between packets on the management bus. If the gap is smaller than this number, then /MCRS is asserted, but MRXC clocks are inhibited. Consequently, no data transfer is performed.

Thus, the system designer may make the decision whether to gather statistics on all packets, even if they occur with very small IFGs or to monitor a subset.

The status field, shown in Table VI above, contains information which may be conveniently analyzed by considering it as providing information of the following six different types, which are held in three packet status registers PSRs shown in FIGS. 24-26.

(1) The RIC 10 and port address fields [PSR(0) and (1)] can uniquely identify the repeater port receiving the packet out of a potential maximum of 832 ports sharing the same management bus (64 ICs each with 13 ports). Thus, all of the other status fields can be correctly attributed to the relevant port.

(2) The status flags the RIC 10 produces for the event counters or recording latches are supplied with each packet [PSR(2)]. Additionally, the clean receive CLN status is supplied to allow determination of the reliability of the address fields in the frame. The CLN status bit [PSR(1)] is set if no collisions are experienced during the repetition of the address fields.

(3) The RIC 10 has an internal timer to indicate when, relative to the start of packet repetition, a collision, if any occurred [PSR(3)]. There is also a timer which indicates how many bit times of IFG was seen on the network between repetition of this packet and the proceeding one. This is provided by [PSR(6)].

(4) If packet compression is employed, then the received byte count contained in the SONIC network controller's packet descriptor will indicate the number of bytes transferred over the management bus rather than the number of bytes in the packet. For this reason, the RIC 10 which receives the packet counts the number of received bytes and transfers this over the management bus [PSR(4)(5)].

(5) Appending a status field to a data packet will obviously result in a cyclic redundancy check (CRC) error being flagged by the SONIC network controller. For this reason, the RIC 10 monitors the repeated data stream to check for CRC and FAE errors. In the case of FAE errors, the RIC 10 provides additional dummy data bits so that the status fields are always byte aligned.

(6) As a final check upon the effectiveness of the management interface, the RIC 10 transfers a bus specific status bit to the SONIC network controller. This flag Packet Compress Done PCOMPD [PSR(0)], may be monitored by hub management software to check if the packet compression operation is enabled.

Figure 23:
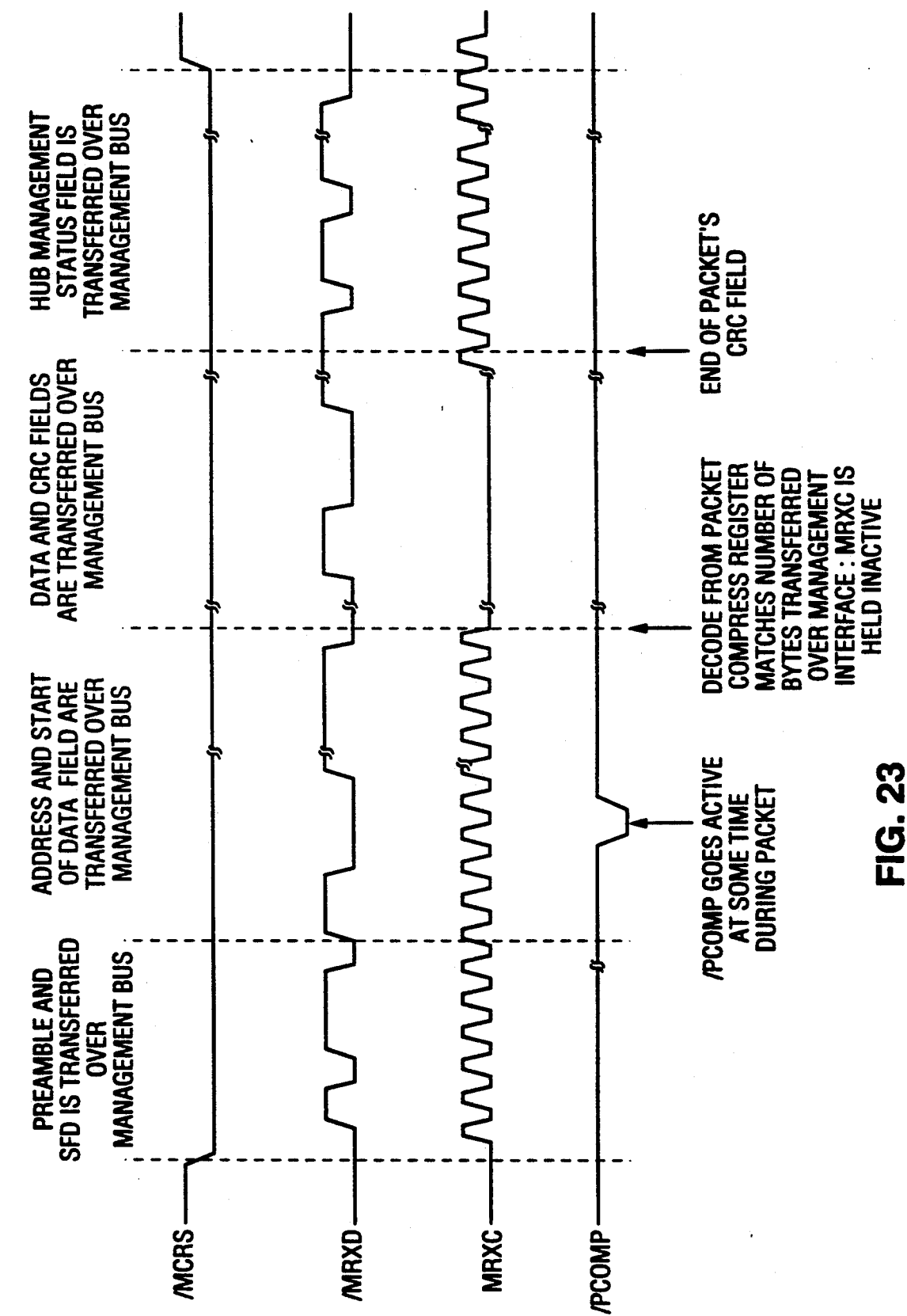
FIG. 23 is a timing diagram illustrating operation of a RIC's management bus.

FIG. 23 shows an example of a packet being transmitted over the management bus. The first section of FIG. 23 (moving from left to right) shows a short preamble and SFD pattern. The second section contains the packet's address and the start of the data fields. During this time, the SONIC controller determines if packet compression should be used in this packet. The /PCOMP signal is asserted and packet transfer stops when the number of bytes transmitted equals the value defined in the decode register. Therefore, the MRXC signal is idle for the remainder of the packet's data and CRC fields. The final region shows the transfer of the RIC's seven bytes of packet status.

The others registers comprise the remainder of the collision time register [PSR(3)], the repeat byte count registers [PSR(4), (5)], and the interframe gap counter idle register [PSR(6)].

A collision timer counts in bit times the time of between the start of repetition of the packet and the detection of the packet's first collision. The collision counter increments as the packet is repeated and freezes when the collision occurs. The value in the counter is only valid when the collision bit COL in [PSR(1)] is set.

The repeat byte counter is a 16 bit counter which can perform two functions. In cases where the transmitted packet possesses an SFD, the byte counter yields the number of received bytes after the SFD field. Alternatively, if no SFD is repeated, the counter reflects the length of the packet, counted in bytes, starting at the beginning of the preamble field. When performing the latter function, the counter is shortened to 8 bits. Thus, the maximum count value is 255 bytes. The mode of counting is indicated by the NSFD bit in [PSR(2)]. In order to check if the receive a packet was genuinely a non-SFD frame, the status of the COL bit should be checked. During collisions, SFD fields may be lost or created and management software should be sensitive to this kind of behavior.

The IFG counter counts in bit times the period in between repeater transmissions. The IFG counter increments whenever the RIC 10 is not transmitting a packet. If the IFG is long, i.e., greater than 255 bits, the counter sticks at this value. Thus, an apparent count value of 255 should be interpreted as 255 or more bit times.

4. Hardware Connection for Management Interface

The RIC 10 may be connected to the management bus directly or via external bus transceivers. The latter has advantages in large repeaters. In this application, the system backplane is often heavily loaded beyond the drive capabilities of the on-chip bus drivers.

The uni-directional nature of information transfers on the /MCRS, MRXD and MRXC signals means a single tri-stateable output pin is adequate for each of these signals. The management enable MEN RIC output pin performs the function of a drive enable for an external bus transceiver if one is required.

In common with the Inter-RIC bus signals /ACTN, /ANYXN, /COLN and /IRE, the /MCRS active level asserted by the /MCRS output is determined the by the state of the /BINV mode load configuration bit.

PORT BLOCK FUNCTIONS

As stated above, the RIC 10 has 13 port logic blocks, one for each network connection. In addition to the packet repetition operations already described, the port block performs two other functions: (1) the physical connection to the network segment (transceiver function) and (2) it provides a means for protecting the network from malfunctioning segments (segment partition).

Each port has its own status register. This register allows the user to determine the current status of the port and configure a number of port specific functions.

1. Transceiver Functions

In accordance with an aspect of the present invention, the RIC 10 is connectable to network segments in three ways: (1) over AUI cable to transceiver boxes, (2) directly to board mounted transceivers, and (3) to twisted pair cable via a simple interface.

As stated above, the first method is supported by RIC Port 1 (the AUI port). Options (2) and (3) are available on Ports 2 to 13. The selection of one of the options is made at the device initialization during the mode load operation. The transceiver bypass XBYPAS configuration bits are used to determine whether the ports will utilize the on-chip 10BASE-T transceivers or bypass these in favor of external transceivers.

Four possible combinations of port utilization are supported: (1) all Ports (2-13) use the external transceiver interface, (2) Ports 2-5 use the external interface and Ports 6-13 use the internal T-BASE10 transceivers, (3) Ports 2-7 use the external interface and Ports 8-13 use the internal T-BASE10 transceivers, and (4) all Ports 2-13 use the internal T-BASE10 transceivers.

The RIC 10 contains virtually all of the digital and analog circuits required for connection to 10BASE-T network segments. The only additional active component is an external driver package.

Figure 27A:
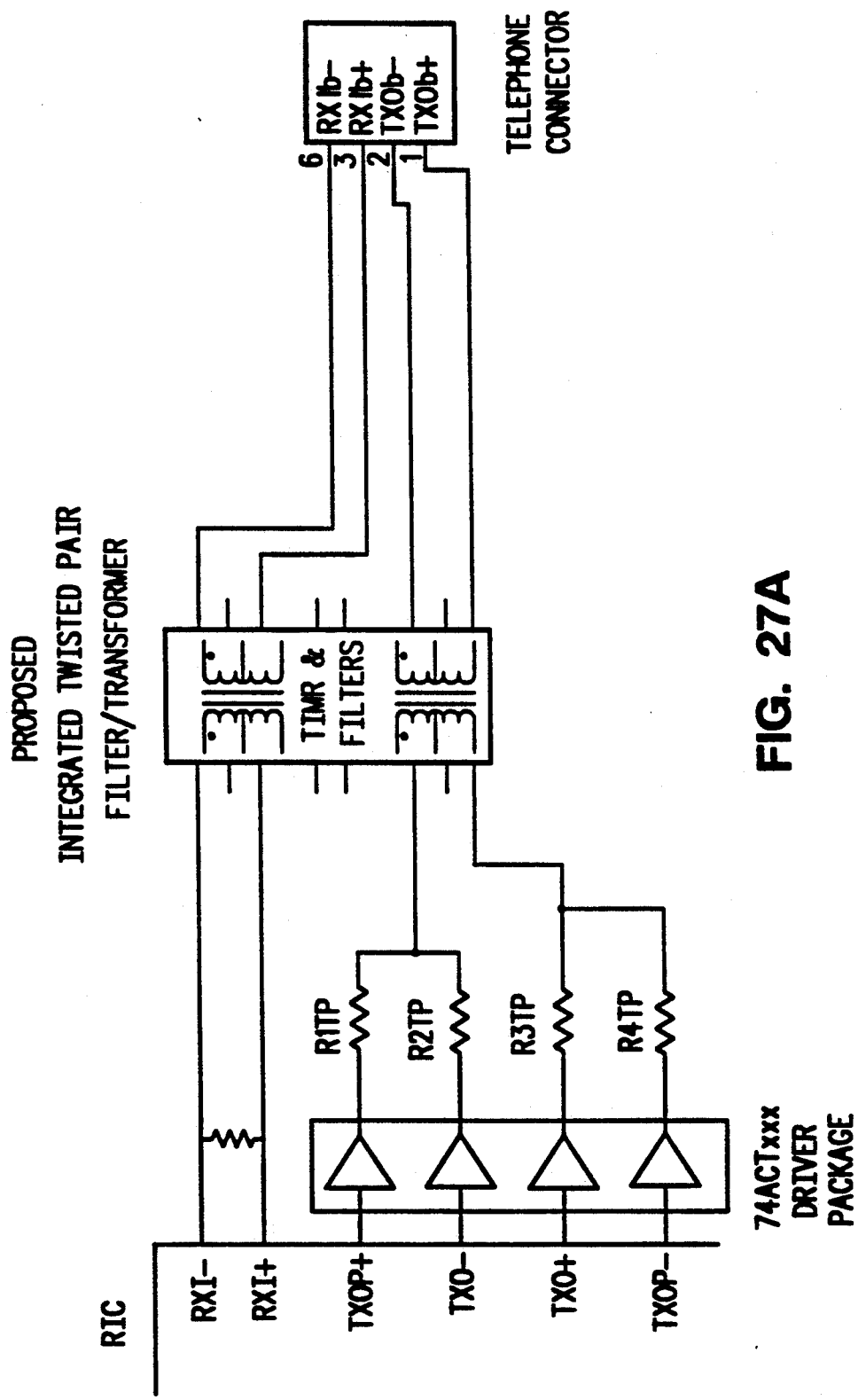
FIG. 27A is a schematic diagram illustrating the connection for a RIC port to a 10BASE-T segment.

The connection for a RIC port to a 10BASE-T segment is shown in FIG. 27A. FIG. 27A shows the components required to connect one of the RIC's ports to a 10BASE-T segment. The major components are the driver package, a member of the 74ACT family, and an integrated filter/choke network.

The operation of the 10BASE-T transceiver logical functions may be modified by software control. The default mode of operations for the transceivers to transmit and expect reception of link pulses. This may be modified if a logic 1 is written to the /GDLNK bit of a port's status register. The port's transceiver will operate normally, but will not transmit link pulses nor monitor their reception. Thus, the entry to a link fail state and the associated modification of transceiver operation will not occur.

In accordance with an aspect of the present invention, the on-chip 10BASE-T transceivers automatically detect and correct the polarity of the receive data stream. This polarity detection scheme relies upon the polarity of the receive link pulses of the end of packet waveform. Polarity detection and correction may be disabled under software control.

Figure 27B:
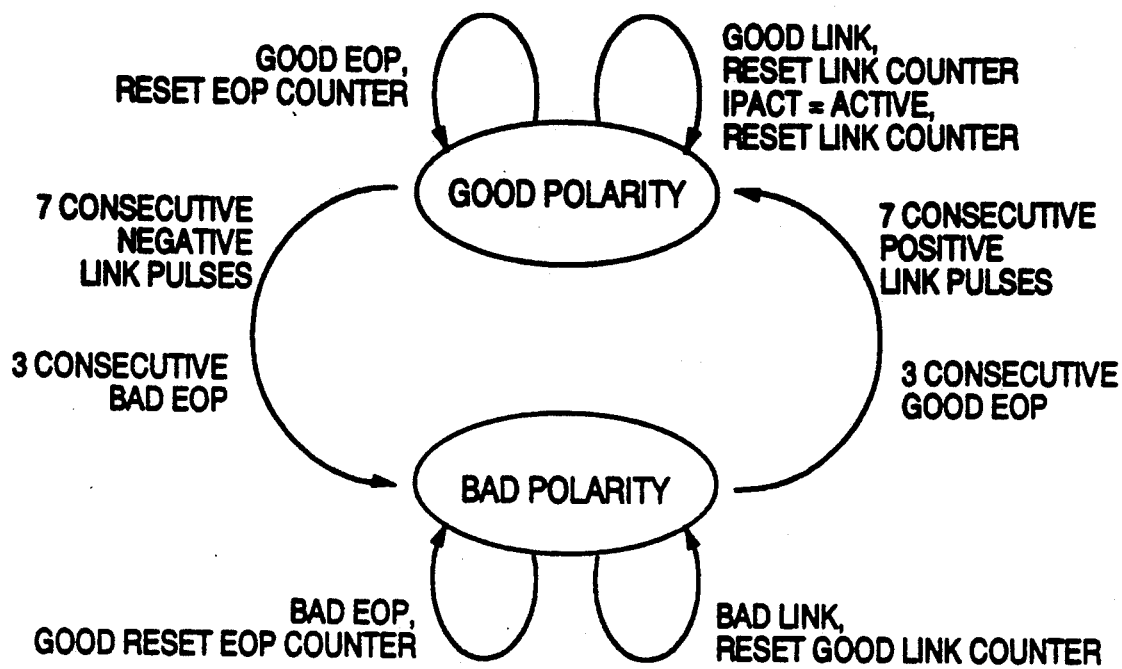
FIG. 27B is a state diagram illustrating a polarity state machine and a RIC 10BASE-T transceiver.

Referring to FIG. 27B polarity state machine for the 10BASE-T twisted pair transceiver, the receive squelch in the twisted pair transceiver contains a mechanism for detecting reverse polarity signals.

Figure 27C:
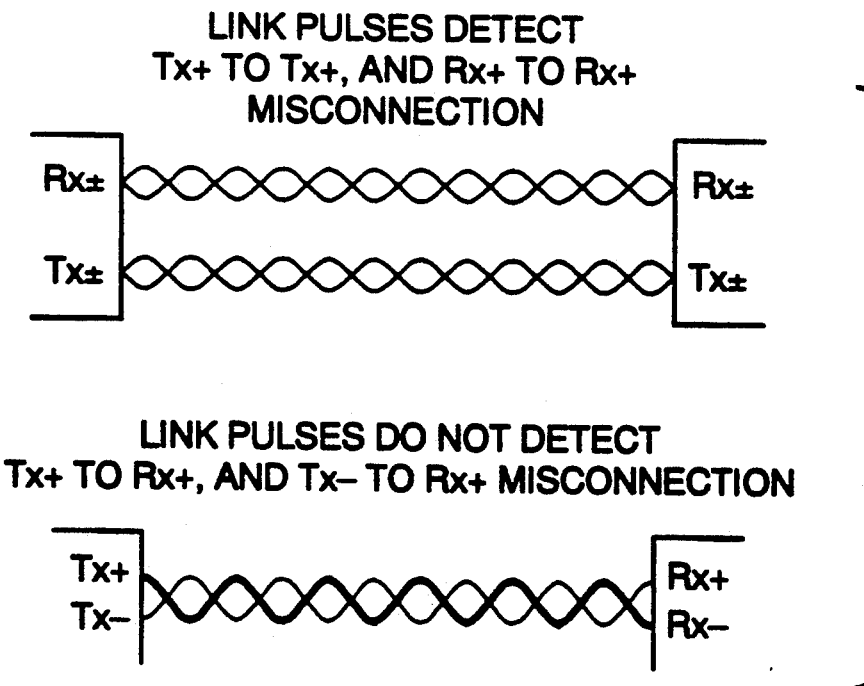
FIG. 27C illustrates polarity detection and correction in a 10BASE-T transceiver.

As shown in FIG. 27C, polarity inversion occurs when the 10BASE-T transceiver inputs are switched. Normally, packets with good polarities are received. As shown in FIG. 27B, when the transceiver detects three consecutive packets with inverted polarities, i.e., packets end with negative signals, the polarity of received packets is switched internally. This switching function is disabled upon the reception of three consecutive packets with goods polarities, i.e., packets end with positive signals.

Internal polarity switches also occurs when seven consecutive link pulses with reverse polarities are detected. Likewise, seven consecutive link pulses with good polarities disable the switching function.

The requirement for a consecutive number of link pulses or packets received prevents false polarity switching due to noise on the twisted pair cable. The user is allowed, through software, to disable the polarity switching mechanism.

RIC Ports 2–13 may be connected to media other than twisted-pair by opting to bypass the on-chip transceivers. When using external transceivers, the user must insure that the external transceivers perform collision detection and the other functions associated with an IEEE 802.3 Media Access Unit. FIG. 28 shows the connection between a repeater port and a coaxial transceiver using the AUI type interface.

Thus, in accordance with an aspect of the present invention, the RIC 10 implements multifunction input squelch and output drivers on the same device pins, to support both of the IEEE AUI and twisted pair standards. The multifunction squelch utilizes a simple dc threshold squelch when receiving differential AUI signals. However, when receiving differential twisted pair signals, it utilizes an intelligent squelch based on input signal's pulse width and dc level. When in the twisted pair mode, the squelch implements dc hysteresis for receiver turn off.

The RIC's output drivers are configured as current drivers to transmit AUI level differential signals when in AUI mode and CMOS differential voltage drivers when in twisted pair mode.

Conventional repeaters implement either the AUI function or the twisted pair function, but not both using the same output pins, due to the dissimilar nature of signal level and squelch function required by the IEEE standard.

2. Segment Partition

Figure 29A:
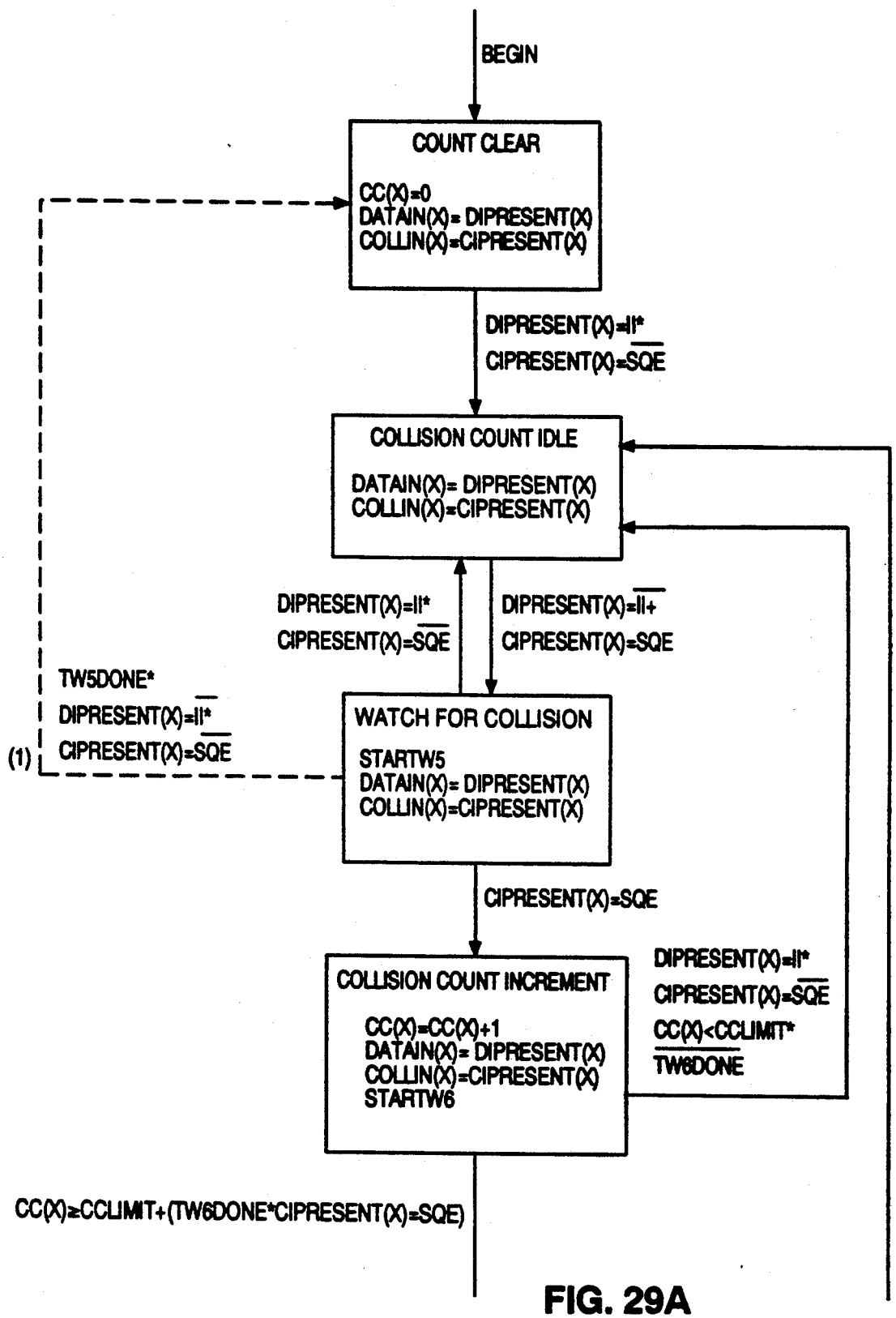
FIGS. 29A-29B are a state diagram illustrating the IEEE 802.3 standard port partitioning algorithm.
Figure 29B:
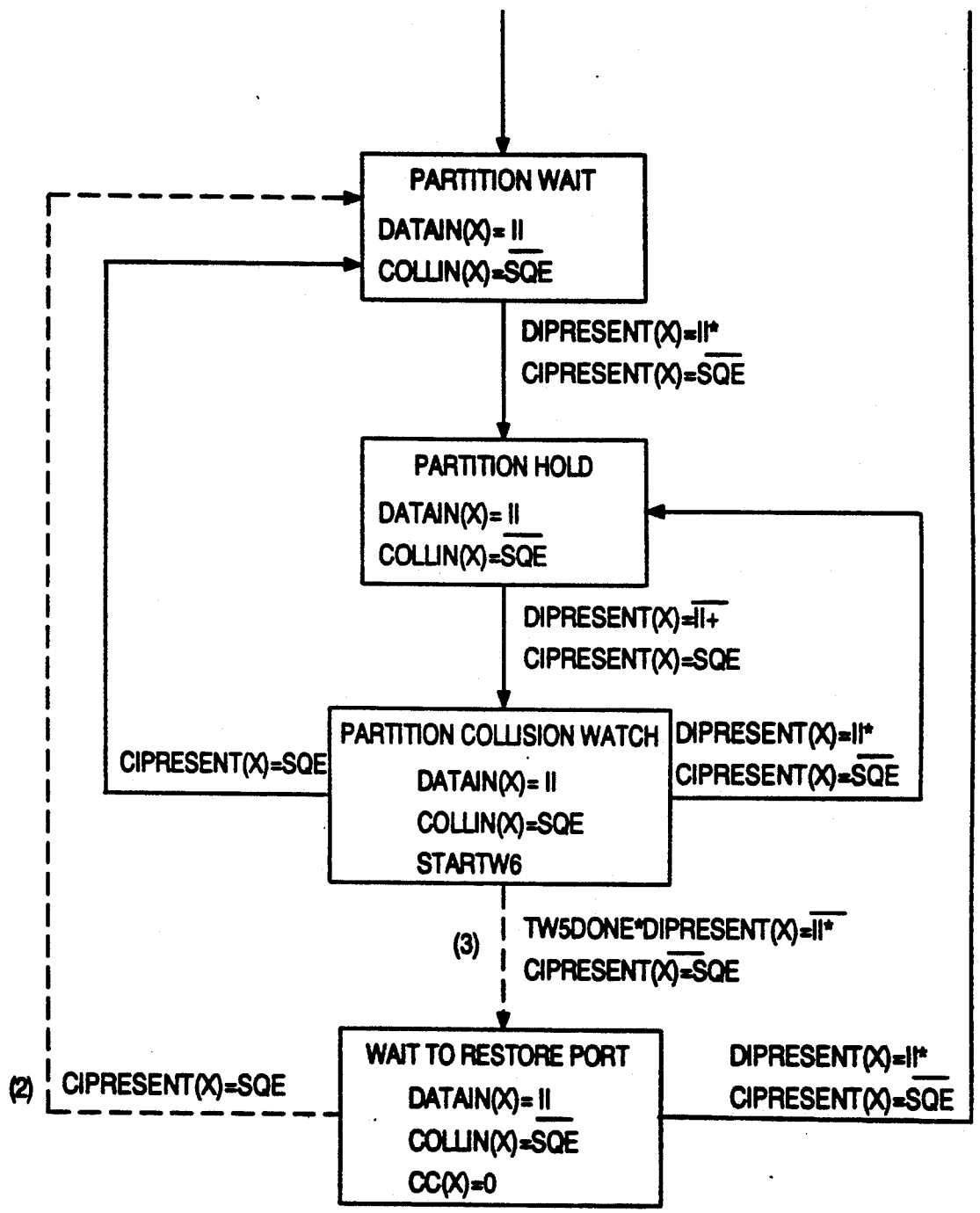
Figure 30:
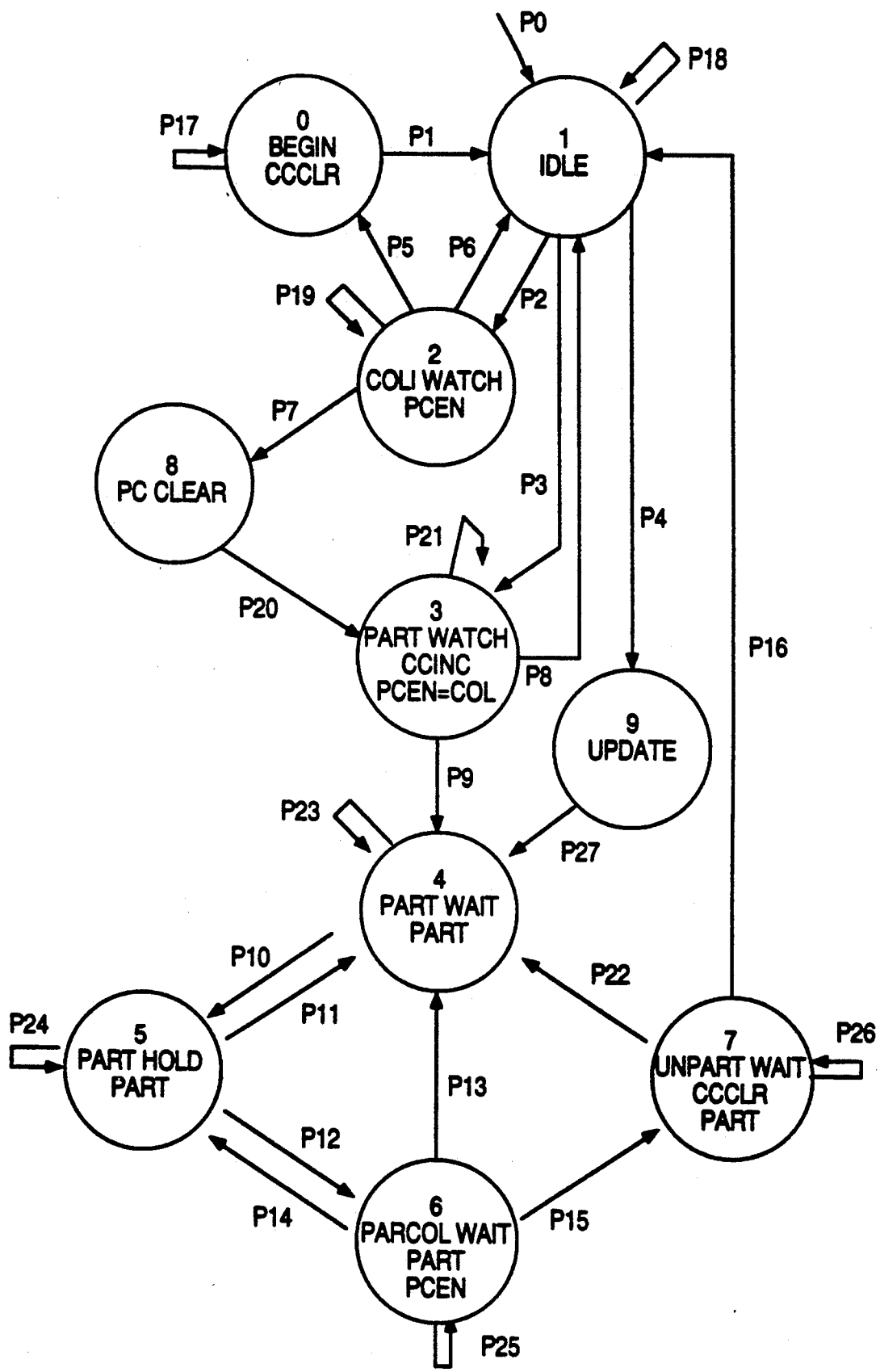
FIG. 30 is a state diagram illustrating the port partitioning algorithm of a RIC in accordance with the present invention.

In accordance with another aspect of the invention, each of the RIC's ports has a dedicated port state machine to perform the functions defined by the IEEE partition algorithm shown in FIGS. 29A and 29B. The port partition algorithm of RIC is shown in FIG. 30. To allow customization of this algorithm for different applications, a number of options are available during device configuration at power-up (the mode load cycle).

The five different options are as follows:

(1) Operation of the 13 partition state machines may be disabled via the disable partition /DPART configuration bit (pin D6).

(2) The value of consecutive counts required to partition a segment (the CC limit specification) may be set at either 31 or 63 consecutive collisions.

(3) The use of the TW5 specification in the partition algorithm differentiates between collisions which occur only in the packet (before TW5 has elapsed) and those which occur late in the packet. (After TW5 has elapsed). These late or "out of window" collisions can be regarded in the same manner as early collisions if the Out of Window Collision Enable/OWCE option is selection. This configuration bit is applied to the D4 pin during the mode load operation. Use of the /OWCE delays until the end of the packet operation of the stage diagram branch marked (1) and enables the branch mark to (2) in FIG. 20

(4) The operation of the port state machines when reconnecting a segment may also be modified. The transmit only /TXONLY configuration bit allows segment reconnection to be prevented unless the reconnecting packet is being sourced by the repeater. In this case, the repeater is transmitting onto the segment, rather than the segment transmitting when the repeater is idle. The normal mode of reconnection does not differentiate between such packet. The /TXONLY configuration bit is input on pin D5 during the mode load cycle. This option is selected, then the operation of the state machine branch marked (3) in FIG. 20 is affected.

(5) The RIC may be configured to use an additional criterion for segment partition. This is referred to as loop-back partition. This operation is selected, and the partition state machine monitors the receive and collision inputs from a network segment to discover if they are active when the port is transmitting, thus determining if the network transceiver is looping back the data pattern from the cable. A port may be partitioned if no data or collision signals are seen by the partition logic in the following window: 61-96 network bit times after the start of transmission. A segment partitioned in this operation may be reconnected in the normal manner. In addition to the autonomous operation of the partition state machines, the user may reset these state machines. This is done individually to each port by writing a logic 1 to the /part bit in its status register. The port's partition state machine and associated counters are reset and the port is reconnected to the network. The reason why a port became partitioned may be discovered by the user by reading the port's status register. Referring to the FIG. 30 state diagram, the minterms of the partition state machine are as follows:

| | |
|---|---|
| P0 | RESET OR UNPART |
| | reset=nrst or grst |
| P1 | NOT CRS AND NOT COL |
| | this port has no carrier active |
| | this port has no collision |
| | the port partition state machine is in |
| | the begin state |
| P2 | CRS AND NOT COL |
| | this port has carrier active |
| | this port has no collision |
| | the port partition state machine is in |
| | the idle state |
| P3 | COL |
| | this port has a collision |
| | the port partition state machine is in |
| | the idle state |
| P4 | NOT CRS AND NOT COL AND TXEL AND TW99B AND LPPART |
| | this port has no carrier, no |
| | collision, and this port is |
| | transmitting |
| | this port has already transmitted 99 bits |
| | this port is configured for checking loopback |
| | the port partition state machine is in |
| | the idle state |
| P5 | (CRS AND NOT COL AND TW5 AND NOT CBOWCE) OR (NOT CRS AND NOT COL AND TW5 AND CBOWCE) |
| | this port has carrier |
| | this port has no collision |

-continued

|   | |
|---|---|
|   | this port has already received 456-532 bits<br>the port partition state machine is in<br>the coli watch state<br>(ignore out of window collisions)<br>in state coli watch or the packet has<br>ended watch of owc and 456-532<br>bits in packet |
| P6 | (NOT CRS AND NOT COL AND NOT CBOWCE) OR<br>(NOT CRS AND NOT COL AND NOT TW5 AND<br>CBOWCE)<br>this port has no carrier<br>this port has no collision and (ignore<br>owc) or (watch owc and not 456-532 bits)<br>the port partition state machine is in<br>the coli watch state |
| P7 | COL<br>this port has a collision<br>the port partition state machine is in<br>the coli watch state |
| P8 | NOT CRS AND NOT COL AND NOT CCLIM AND<br>NOT TW6<br>this port has no carrier<br>this port has no collision<br>this port has not had either 32 or 64<br>(depending on how the port was<br>configured) consecutive<br>collisions<br>this port has not had a collision of<br>1064-1140 bits in length<br>the port partition state machine is in<br>the part watch state |
| P9 | CCLIM OR TW6<br>the port partition state machine is in<br>the part watch state<br>and<br>this port has had either 32 or 64<br>(depending on how the port was<br>configured) consecutive<br>collisions<br>or<br>this port has had a collision of 1064-1140<br>bits in length |
| P10 | NOT CRS AND NOT COL<br>this port has no carrier<br>this port has no collision<br>the port partition state machine is in<br>the part wait state |
| P11 | COL<br>this port has a collision<br>the port partition state machine is in<br>the part hold state |
| P12 | CRS AND NOT COL<br>this port has carrier active<br>this port has no collision<br>the port partition state machine is in<br>the part hold state |
| P13 | COL<br>this port has a collision<br>the port partition state machine is in<br>the parcol wait state |
| P14 | NOT CRS AND NOT COL<br>this port has no carrier<br>this port has no collision<br>the port partition state machine is in<br>the parcol wait state |
| P15 | (CRS AND NOT COL AND TW5 AND NOT<br>CBTRUP) OR (CRS AND NOT COL AND TW5 AND<br>TXEL AND CBTRUP)<br>this port has carrier active<br>this port has no collision and not<br>transmit only or transmitted and<br>transmit only<br>this port has transmitted or received<br>456-532 bits<br>the port partition state machine is in<br>the parcol wait state |
| P16 | NOT CRS AND NOT COL<br>this port has no carrier<br>this port has no collision<br>the port partition state machine is in<br>the unpart wait state |
| P17 | CRS OR COL<br>this port has carrier active or<br>this port has collision<br>the port partition state machine is in<br>the begin state |
| P18 | NOT COL AND NOT CRS AND (CRS OR COL<br>OR NOT TW99b OR NOT TXEL OR NOT LPPART)<br>in idle state, this port has no<br>collision and no crs or<br>this port has seen crs or has seen col<br>or hasn't transmitted 99 bits or<br>is not transmitting or is not<br>configured for lppart |
| P19 | CRS AND NOT COL AND (NOT TW5 OR<br>CBOWCE) this port has carrier<br>this port has no collision<br>and is either configured for watch of<br>owc or hasn't had 456-532 bits in<br>coli watch state |
| P20 | FLOW THROUGH<br>in partition state machine is in the<br>pc clear state |
| P21 | NOT CCLIM AND NOT TW6 AND (CRS OR COL)<br>this port hasn't had 32 or 64<br>consecutive collisions depending<br>on config and<br>the col has not had 1064-1140 bits in<br>it and crs or col is active in<br>part watch |
| P22 | CBOWCE AND COL<br>this ric is configured for use of out<br>of window collisions |
| P23 | CRS OR COL<br>this port has carrier active or<br>this port has collision in part wait<br>state |
| P24 | NOT CRS AND NOT COL<br>this port has no carrier<br>this port has no collision in part<br>hold state |
| P25 | CRS AND NOT COL AND {[NOT TW5 AND<br>NOT CBTRUP] OR [CBTRUP AND (NOT TW5<br>OR NOT TXL)]}<br>in parcol wait<br>crs active<br>(not configured for transmit only<br>and not received or<br>transmitted 456-532 bits) or<br>(configured for transmit only and<br>either not transmitting or<br>not transmitted 456-532<br>bits) |
| P26 | (CRS AND NOT COL) OR [NOT CBOWCE AND<br>(CRS OR COL)]<br>in unpart wait and (crs is active and<br>no col) or<br>(not configured for watch of owc and<br>crs or col is active) |
| P27 | FLOW THROUGH<br>in update state |

3. Port Status Register Functions

Each RIC port has its own status register. In addition to providing status concerning the port and its network segment, the register allows two operations to be performed upon the port: (I) port disable and (2) externally generated packet test.

When a port is disabled, packet transmission and reception between the port segment and the network is prevented.

In accordance with an aspect of the present invention, externally generated packet tests (EGP test) allows the user to perform a test upon the repeater in its installation. Such a test would most likely be performed at system installation.

When a port is placed in EGP mode, its operations are modified as follows: When a port receives a packet and the RIC 10 transmits it over the network, the receiving port also transmits the packet back onto the same segment. In addition, collision detection is disabled in the receiving port. Thus, collision will not be recorded even though reception and transmission occur at the same time at the receiving port. This is important since otherwise the RIC 10 would transmit the jam pattern and not the packet. This is contrary to normal operation where the receiving port (PORT N) will not transmit its own packet.

This capability to loop back a packet transmitted by a node up to and then back from the repeater provides a means to verify the data and integrity of a segment. It is a user selectable mode on a per port basis. Therefore, ports that are not in EGP mode execute normal RIC operations regardless of which mode the other ports are in. EGP test mode 10 should not be activated on a live network, otherwise unpredictable repeater operation could occur.

RIC REGISTERS

The registers of the RIC 10 may be accessed by applying the required address to the five Register Address (RA(4:0)) input pins. Pin RA4 makes the selection between the upper and lower halves of the register array.

The lower half of the register map consists of sixteen registers: 1 RIC Real Time Status and Configuration Register, 13 Port Real Time Status Registers, 1 RIC Configuration Register and 1 Real Time Interrupt Status Register.

These registers may be directly accessed at any time via the RA(4:0) pins, (RA4=0). The upper half of the register map, (RA4=1), is organized as four pages of registers: Event Count Configuration page (0), Event Record page (1), Lower Event Count page (2), and Upper Event Count page (3).

Register access within these pages is also performed using the RA(4:0) pins, (RA4=1). Page switching is performed by writing to the Page Selection bits (PSEL2, 1 and 0). These bits are found in the Page Select Register, located at address 10 Hex on each page of the upper half of the register array. At power on, these bits default to 0 Hex, i.e., page zero.

The RIC Status and Configuration Register is shown in FIG. 31. The lower portion of this register contains real time information concerning the operation and the RIC 10. The upper three bits represent the chosen configuration of the transceiver interface employed.

The organization of a Port Real Time Status Register is shown in FIGS. 32A-32B

The RIC Configuration Register is shown in FIGS. 33A-33B. This register displays the state of a number of RIC configuration bits loaded during the Mode Load operation.

The Real Time Interrupt Register (RTI), shown in FIG. 34, contains information which may change on a frame-by-frame basis. Any remaining interrupts which have not been serviced before the following frame is transmitted or within 30 milliseconds of the end of the packet are cleared. Since multiple interrupt sources may be displayed by the RTI, a priority scheme is implemented. A read cycle to the RTI gives the interrupt source and an address vector indicating the RIC port that generated the interrupt. The order of priority for the display of interrupt information is as follows: (1) the receive source of the network activity (Port N), (2) the first RIC port showing a collision, and (3) a port partitioned or reconnected.

During the repetition of a single packet, it is possible that multiple ports may be partitioned or, alternatively, reconnected. The ports have equal priority in displaying partition/reconnection information. This data is derived from the ports by the RTI register as it polls consecutively around the ports.

Reading the RTI register clears the particular interrupt. If no interrupt sources are active, then the RTI register returns a no valid interrupt status.

FIG. 35 shows the mapping of interrupt sources onto the D3 to D0 pins of the RTI register. Essentially, each of the three interrupt sources has a dedicated bit in this field. If a read to the RTI register produces a low logic level on one of these bits, then the interrupt source may be directly decoded. Associated with the source of the interrupt is the port where the event is occurring. If no unmasked events (receive, collision, etc.) have occurred when the RTI register is read, then an all ones pattern is driven by the RIC 10 onto the data pins.

The Page Select Register, shown in FIG. 36, performs two functions. First, it enables switches to be made between register pages. Second, it provides status information regarding the Event Logging Interrupts.

The lower and upper Event Count Mask Registers are shown in FIGS. 37 and 38, respectively.

The Event Record Mask Register is shown in FIG. 39.

The Interrupt and Management Configuration Register is shown in FIGS. 40A-40B. This register powers up with all bits set to one and must be initialized by a processor write cycle before any events will generate interrupts.

The RIC Address Register, shown in FIG. 41, may be used to differentiate between RICs in a multi-RIC repeater system. The contents of this register form part of the information available through the management bus.

The Packet Compress Decode Register, shown in FIG. 42, is used to determine the number of bytes in the data field of a frame which are transferred over the management bus when the packet compress option is employed. The register bits perform the function at a direct binary decoder. Thus, up to 255 bytes of data may be transferred over the management bus if packet compression is selected.

The Inter Frame Gap Threshold Register, shown in FIG. 43, is used to configure the hub management interface to provide a certain minimum inter-frame gap between packets transmitted over the management bus. The value written to this register, plus six, is the magnitude, in bit times, of the minimum inter-frame gap (IFG) allowed on the management bus.

The Port Event Record Registers, shown in FIG. 44, hold the recorded events for the specified RIC port. The flags are cleared when the register is read.

The Port Event Count Register, shown in FIG. 45, shows the instantaneous value of the specified port's 16-bit counter. The counter increments when an enabled event occurs. The counter may be cleared when it is read and prevented from rolling over when the maximum count is reached by setting the appropriate control bits in the Upper Event Count Mask register. Since the RIC's processor port is octal and the counters are 16-bits long, a temporary holding register is employed for register reads. When one of the counters is read, either high or low byte first, all 16 bits of the counter are transferred to a holding register. Provided the next read cycle to the counter array accesses the same counter's other byte, then the read cycle accesses the holding register. This avoids the problem of events occurring in between the processor read and indicating a false count value. In order to enter a new value to the holding register, a different counter must be accessed or the same counter byte must be re-read.

It should be understood that various alternatives to the embodiments of the invention described herein may be employed in practicing the invention. It is intended that the following claims define the scope of the invention and that the methods and apparatus within the scope of these claims and their equivalents be covered thereby.

What is claimed is:

1. A repeater interface controller for connecting a plurality of segments of a local area network, the repeater interface controller comprising:
   (a) a central node that includes:
      receiver means for receiving data packets,
      repeater means responsive to receipt of the data packets by the receiver means for repeating each of the data packets to form repeated data packets, and
      transmitter means for transmitting the repeated data packets; and
   (b) a plurality of port nodes connected to the central node, each port node being connectable to a corresponding one of the plurality of segments, each port node including:
      (i) means for receiving one or more data packets from said corresponding segment of the local area network,
      (ii) a partitioning port state machine including:
         means for detecting collisions from the beginning to the end of each of the one or more received data packets,
         means for partitioning said port node from said corresponding segment when collisions are detected in a predetermined number of consecutive received data packets,
      (iii) means for transmitting each of the one or more received data packets to the central node,
      (iv) means for identifying the port node that first received one or more data packets as a source port node such that other of the plurality of port nodes cannot transmit data packets received from their corresponding segments to the central node while said port node is identified as the source port node,
      (v) means for receiving the repeated data packets from the central node, and
      (vi) means for transmitting the repeated data packets received from the central node to said corresponding segment when said port node is not identified as the source port node.

2. The repeater interface controller of claim 1 and further comprising means for disabling the partitioning port state machine means.

3. The repeater interface controller of claim 1 wherein the predetermined number comprises 31 or 63 consecutive collisions.

4. The repeater interface controller of claim 1 wherein the partition port state machine further comprises means for reconnecting said partitioned port node to said corresponding segment s when the partitioning port state machine fails to detect a collision from the beginning to the end of a data packet received from said corresponding segment.

5. The repeater interface controller of claim 1 wherein the partitioning port state machine further comprises:
   means for detecting collisions from the beginning to the end of each repeated data packet transmitted to said corresponding segment,
   means for reconnecting said partitioned port node to said corresponding segment only when the partitioned port node transmits a repeated data packet to said corresponding segment without detecting a collision.

6. A repeater interface controller for connecting a plurality of segments of a local area network, the repeater interface controller comprising:
   (a) a central node that includes:
      receiver means for receiving data packets,
      repeater means responsive to receipt of the data packets by the receiver means for repeating each of the data packets to form repeated data packets, and
      transmitter means for transmitting the repeated data packets; and
   (b) a plurality of port nodes connected to the central node, each port node being connectable to a corresponding one of the plurality of segments, each port node including:
      (i) means for receiving one or more data packets from said corresponding segment of the local area network,
      (ii) partitioning port state machine including:
         means for detecting collisions for more than 560 bit times from the beginning of each received data packet,
         means for partitioning said port node from said corresponding segment when collisions are detected in a predetermined number of consecutive received data packets,
      (iii) means for transmitting each of the one or more received data packets to the central node,
      (iv) means for identifying the port node that first received one or more data packets as a source port node such that other of the plurality of port node cannot transmit data packets received from their corresponding segments to the central node while said port node is identified as the source port node,
      (v) means for receiving the repeated data packets from the central node, and
      (vi) means for transmitting the repeated data packets received from the central node to said corresponding segment when said port node is not identified as the source port node.

7. The repeater interface controller of claim 6 wherein the partition port state machine further comprises means for reconnecting said partitioned port node to said corresponding segment when the partitioning port state machine fails to detect a collision for more than 560 bit times from the beginning of a data packet received from said corresponding segment.

8. The repeater interface controller of claim 7 wherein the partitioning port state machine further comprises:
   means for detecting collisions for more than 560 bit times from the beginning of each transmitted repeated data packet,
   means for reconnecting a port node to said corresponding segment only when the partitioned port node transmits a repeated data packet to said corresponding segment without detecting a collision.

* * * * *

UNITED STATES PATENT AND TRADEMARK OFFICE
CERTIFICATE OF CORRECTION

PATENT NO. : 5,293,375
DATED : March 8, 1994
INVENTOR(S) : Charles A. Moorwood et al.

It is certified that error appears in the above-indentified patent and that said Letters Patent is hereby corrected as shown below:

In Col. 43, line 65, please delete "s" after the word "segment".

Signed and Sealed this

Sixth Day of December, 1994

*Attest:*

BRUCE LEHMAN

*Attesting Officer*     *Commissioner of Patents and Trademarks*